US010793165B2

(12) United States Patent
Watanabe et al.

(10) Patent No.: US 10,793,165 B2
(45) Date of Patent: Oct. 6, 2020

(54) DRIVING ASSISTANCE METHOD, AND DRIVING ASSISTANCE DEVICE, DRIVING CONTROL DEVICE, VEHICLE, DRIVING ASSISTANCE PROGRAM, AND RECORDING MEDIUM USING SAID METHOD

(71) Applicant: Panasonic Intellectual Property Management Co., Ltd., Osaka (JP)

(72) Inventors: Kazuya Watanabe, Kanagawa (JP); Koichi Emura, Kanagawa (JP); Masanaga Tsuji, Osaka (JP); Toshiya Mori, Osaka (JP); Wataru Nakai, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 376 days.

(21) Appl. No.: 15/565,884

(22) PCT Filed: Apr. 19, 2016

(86) PCT No.: PCT/JP2016/002084
§ 371 (c)(1),
(2) Date: Oct. 11, 2017

(87) PCT Pub. No.: WO2016/170773
PCT Pub. Date: Oct. 27, 2016

(65) Prior Publication Data
US 2018/0105185 A1 Apr. 19, 2018

(30) Foreign Application Priority Data

Apr. 21, 2015 (JP) ................................ 2015-087069
May 14, 2015 (JP) ................................ 2015-099474
(Continued)

(51) Int. Cl.
*B60W 50/10* (2012.01)
*B60W 50/14* (2020.01)
(Continued)

(52) U.S. Cl.
CPC ............. *B60W 50/10* (2013.01); *B60K 35/00* (2013.01); *B60K 37/06* (2013.01); *B60R 16/02* (2013.01);
(Continued)

(58) Field of Classification Search
CPC .. B60W 50/10; B60W 50/085; B60W 30/182; B60W 30/09; B60W 30/18163;
(Continued)

(56) References Cited

U.S. PATENT DOCUMENTS 6,707,421 B1 * 3/2004 Drury ................ G01C 21/3415
342/357.31
8,880,289 B2 * 11/2014 Uehara ................... G06F 9/445
701/36
(Continued)

FOREIGN PATENT DOCUMENTS

CN 103171439 A 6/2013
CN 103221665 A 7/2013
(Continued)

OTHER PUBLICATIONS

Extended European Search Report, dated Mar. 6, 2018, for the related European Patent Application No. 16782788.0.
(Continued)

*Primary Examiner* — Mary Cheung
(74) *Attorney, Agent, or Firm* — Seed IP Law Group LLP

(57) ABSTRACT

During autonomous driving of a vehicle, useful Information is presented to an occupant. An image generator in driving assistance device generates a first image representing an action the vehicle is capable of executing depending on a
(Continued)

travel environment during autonomous driving and a second image representing a basis of the action. Image output unit outputs the first image and the second image generated by the image generator to notification device in the vehicle in association with each other. The action vehicle is capable of executing may be selected from among action candidates by a driver.

13 Claims, 65 Drawing Sheets

(30) Foreign Application Priority Data

Jun. 12, 2015 (JP) .................................. 2015-119139
Dec. 24, 2015 (JP) .................................. 2015-252675

(51) Int. Cl.

| | | |
|---|---|---|
| *B60K 35/00* | (2006.01) | |
| *B60K 37/06* | (2006.01) | |
| *B60R 16/02* | (2006.01) | |
| *G01C 21/36* | (2006.01) | |
| *B60W 40/09* | (2012.01) | |
| *B60W 50/08* | (2020.01) | |
| *G06K 9/00* | (2006.01) | |
| *G08G 1/0962* | (2006.01) | |
| *G01C 21/34* | (2006.01) | |
| *G05D 1/00* | (2006.01) | |
| *G05D 1/02* | (2020.01) | |
| *G08G 1/0968* | (2006.01) | |
| *B60W 30/18* | (2012.01) | |
| *B60W 30/09* | (2012.01) | |
| *B60W 30/182* | (2020.01) | |
| *G06F 3/048* | (2013.01) | |
| *B60W 50/00* | (2006.01) | |

(52) U.S. Cl.
CPC .......... *B60W 30/09* (2013.01); *B60W 30/182* (2013.01); *B60W 30/18163* (2013.01); *B60W 40/09* (2013.01); *B60W 50/08* (2013.01); *B60W 50/085* (2013.01); *B60W 50/14* (2013.01); *G01C 21/3484* (2013.01); *G01C 21/3605* (2013.01); *G01C 21/3617* (2013.01); *G05D 1/0061* (2013.01); *G05D 1/0088* (2013.01); *G05D 1/0223* (2013.01); *G05D 1/0257* (2013.01); *G06F 3/048* (2013.01); *G06K 9/00288* (2013.01); *G06K 9/00671* (2013.01); *G06K 9/00791* (2013.01); *G06K 9/00832* (2013.01); *G08G 1/0962* (2013.01); *G08G 1/096888* (2013.01); *B60K 2370/166* (2019.05); *B60K 2370/167* (2019.05); *B60K 2370/175* (2019.05); *B60K 2370/179* (2019.05); *B60K 2370/193* (2019.05); *B60W 2050/0079* (2013.01); *B60W 2050/0089* (2013.01); *B60W 2050/146* (2013.01); *B60W 2520/10* (2013.01); *B60W 2540/10* (2013.01); *B60W 2540/12* (2013.01); *B60W 2540/18* (2013.01); *B60W 2540/20* (2013.01); *B60W 2540/215* (2020.02); *B60W 2554/00* (2020.02); *B60W 2720/10* (2013.01); *G05D 2201/0213* (2013.01)

(58) Field of Classification Search
CPC ...... B60W 50/08; B60W 40/09; B60W 50/14; B60W 2720/10; B60W 2550/10; B60W 2540/04; B60W 2050/146; B60W 2540/20; B60W 2540/18; B60W 2540/12; B60W 2540/10; B60W 2520/10; B60W 2050/0089; B60W 2050/0079; B60R 16/02; B60K 37/06; B60K 35/00; B60K 2370/175; B60K 2370/166; B60K 2370/167; B60K 2370/193; B60K 2370/179; G06K 9/00832; G06K 9/00671; G06K 9/00288; G06K 9/00791; G08G 1/0962; G08G 1/096888; G06F 3/048; G05D 1/0257; G05D 1/0223; G05D 1/0088; G05D 1/0061; G05D 2201/0213; G01C 21/3484; G01C 21/3617; G01C 21/3605
See application file for complete search history.

(56) References Cited

U.S. PATENT DOCUMENTS

| | | | |
|---|---|---|---|
| 9,188,985 B1 * | 11/2015 | Hobbs ................ | G01C 21/3682 |
| 9,335,178 B2 * | 5/2016 | Nickolaou ............ | G01C 21/34 |
| 2005/0015203 A1 | 1/2005 | Nishira | |
| 2009/0174540 A1 | 7/2009 | Smith | |
| 2009/0234552 A1 | 9/2009 | Takeda et al. | |
| 2009/0287367 A1 * | 11/2009 | Salinger ............... | G05D 1/0246 |
| | | | 701/23 |
| 2012/0022716 A1 | 1/2012 | Kitahama et al. | |
| 2012/0166033 A1 * | 6/2012 | Byun ..................... | G08G 1/167 |
| | | | 701/23 |
| 2013/0179023 A1 | 7/2013 | Schmidt | |
| 2013/0302756 A1 | 11/2013 | Takeuchi et al. | |
| 2013/0304513 A1 * | 11/2013 | Hyde ..................... | G06Q 40/08 |
| | | | 705/4 |
| 2016/0231743 A1 | 8/2016 | Bendewald et al. | |
| 2018/0093676 A1 | 4/2018 | Emura et al. | |
| 2018/0105186 A1 | 4/2018 | Motomura et al. | |

FOREIGN PATENT DOCUMENTS

| | | | |
|---|---|---|---|
| DE | 102011121948 A1 | 6/2013 | |
| EP | 1997705 A1 | 12/2008 | |
| EP | 2669109 A1 | 12/2013 | |
| EP | 2806411 A1 | 11/2014 | |
| EP | 3130516 A1 | 2/2017 | |
| JP | 4-011524 A | 1/1992 | |
| JP | 2004-034917 A | 2/2004 | |
| JP | 3583873 B2 | 11/2004 | |
| JP | 2005-038325 A | 2/2005 | |
| JP | 2005-067483 A | 3/2005 | |
| JP | 2006-243856 A | 9/2006 | |
| JP | 2007-176396 A | 7/2007 | |
| JP | 2007-198853 A | 8/2007 | |
| JP | 2009-110184 A | 5/2009 | |
| JP | 2009-237937 A | 10/2009 | |
| JP | 2009-245149 A | 10/2009 | |
| JP | 2010-198578 A | 9/2010 | |
| JP | 2010-211380 A | 9/2010 | |
| JP | 2012-113631 A | 6/2012 | |
| JP | 2013-117809 A | 6/2013 | |
| JP | 2014-081947 A | 5/2014 | |
| JP | 2015-011458 A | 1/2015 | |
| JP | 2015-022499 A | 2/2015 | |
| JP | 2015-199439 A | 11/2015 | |
| JP | 2016-216027 A | 12/2016 | |
| JP | 2016-216028 A | 12/2016 | |
| WO | 2015/049231 A1 | 4/2015 | |
| WO | 2016/170786 A1 | 10/2016 | |

OTHER PUBLICATIONS

Extended European Search Report, dated May 9, 2018, for the related European Patent Application No. 16782797.1.
The Extended European Search Report dated May 28, 2018 for the related European Patent Application No. 16782787.2.
English Translation of Chinese Search Report dated Jun. 4, 2019 for the related Chinese Patent Application No. 201680021986.8.

(56) References Cited

OTHER PUBLICATIONS

English Translation of the First Office Action dated Jun. 4, 2019 for the related Chinese Patent Application No. 201680021986.8.
International Search Report of PCT application No. PCT/JP2016/002084 dated Jul. 26, 2016.
English Translation of Chinese Search Report dated Oct. 9, 2019 for the related Chinese Patent Application No. 201680034900.5.
English Translation of the First Office Action dated Oct. 9, 2019 for the related Chinese Patent Application No. 201680034900.5.
Japanese Office Action dated Jan. 7, 2020 for the related Japanese Patent Application No. 2015-252667.
Notice of Reasons for Refusal in Japan dated Aug. 4, 2020 for the related Japanese Patent Application No. 2019-169443.
Notice of Reasons for Refusal in Japan dated Aug. 4, 2020 for the related Japanese Patent Application No. 2016-229586.

* cited by examiner

FIG. 2B
FIG. 2C
FIG. 2A
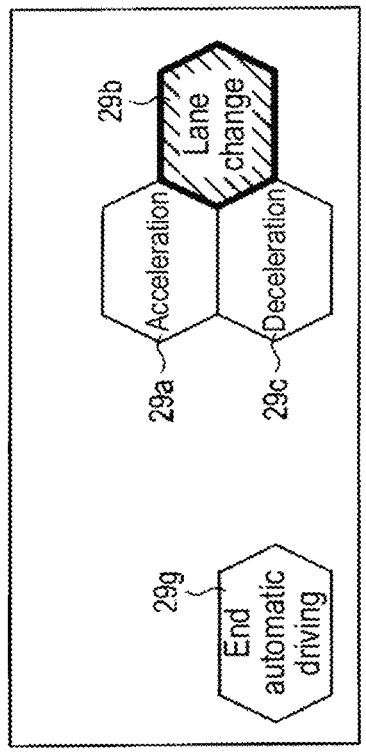
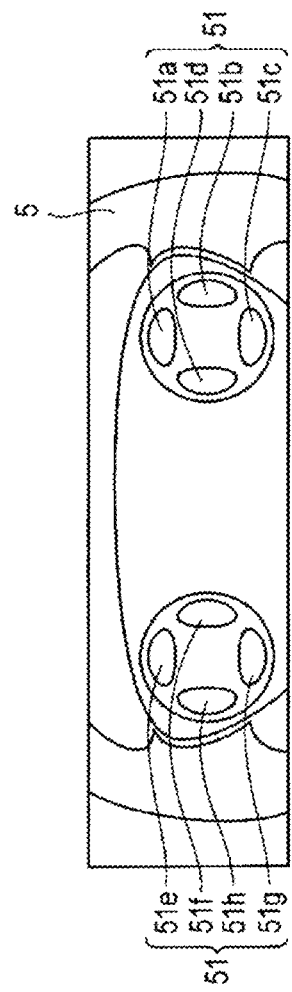
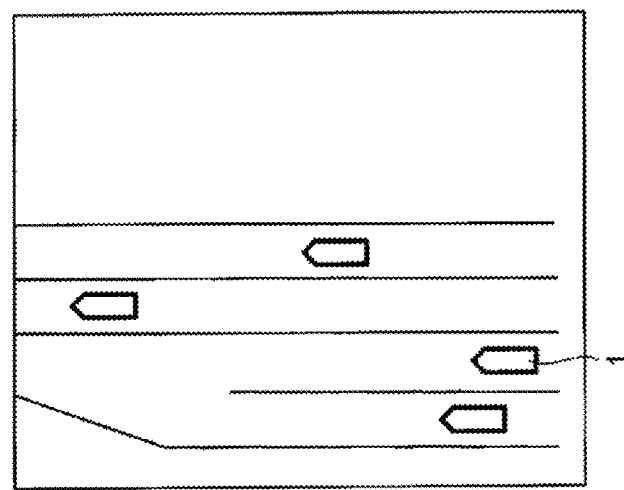

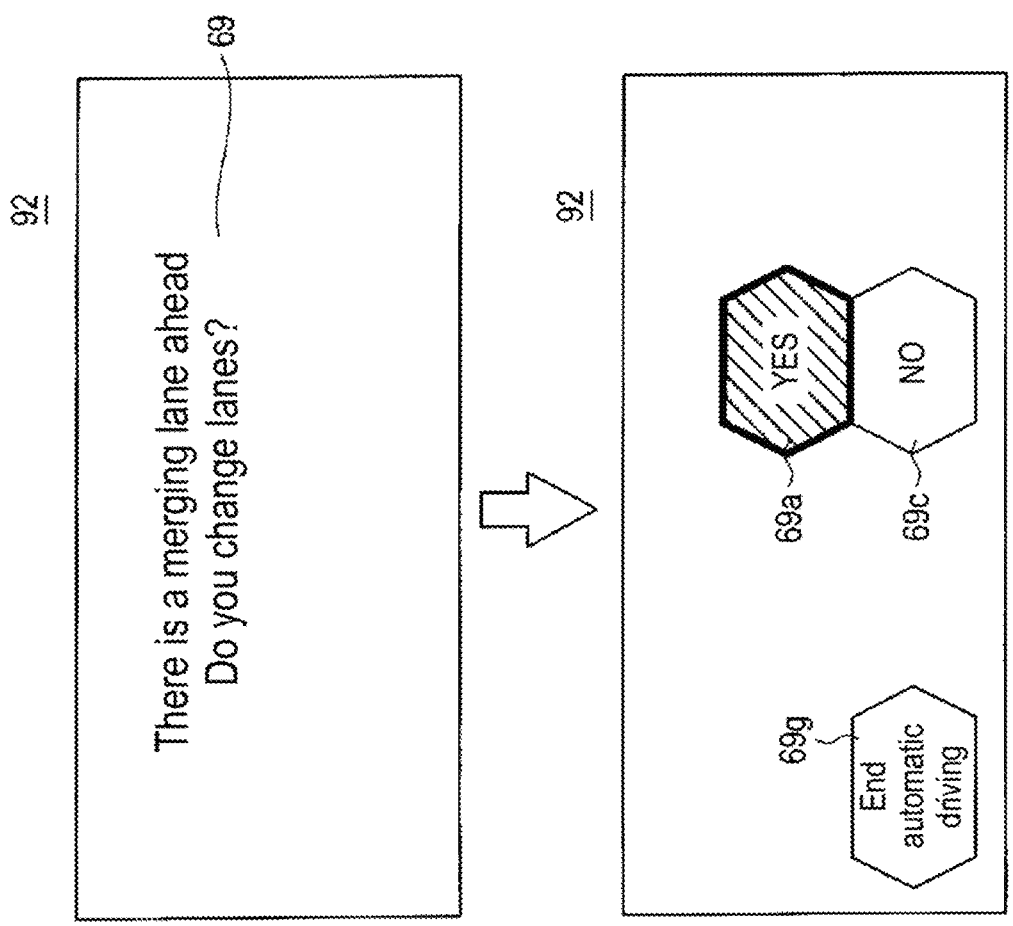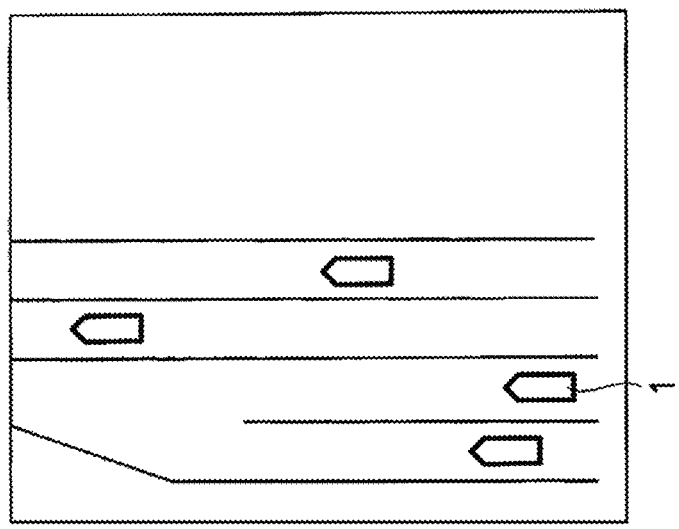

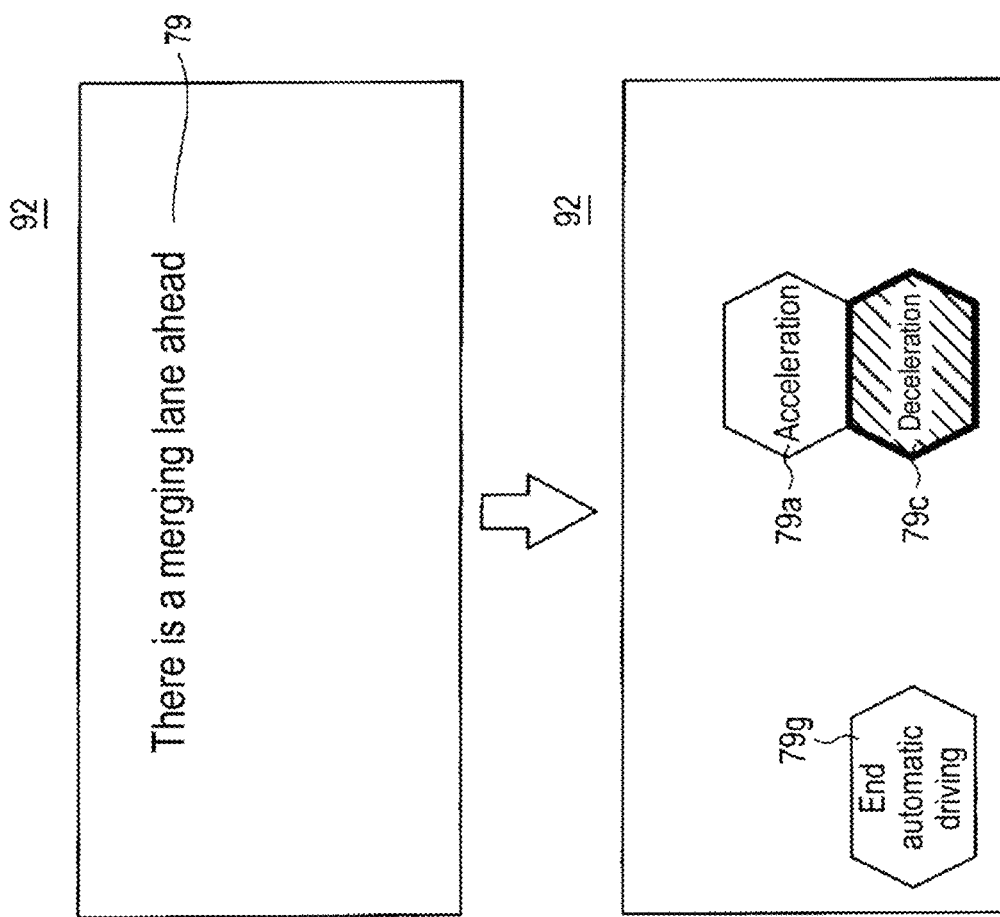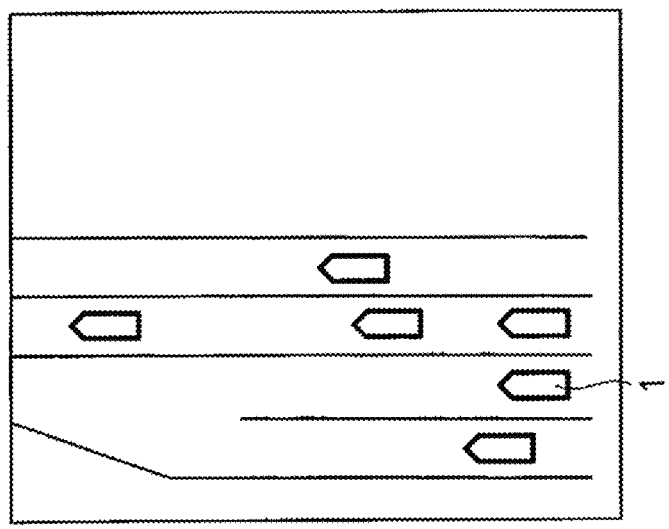

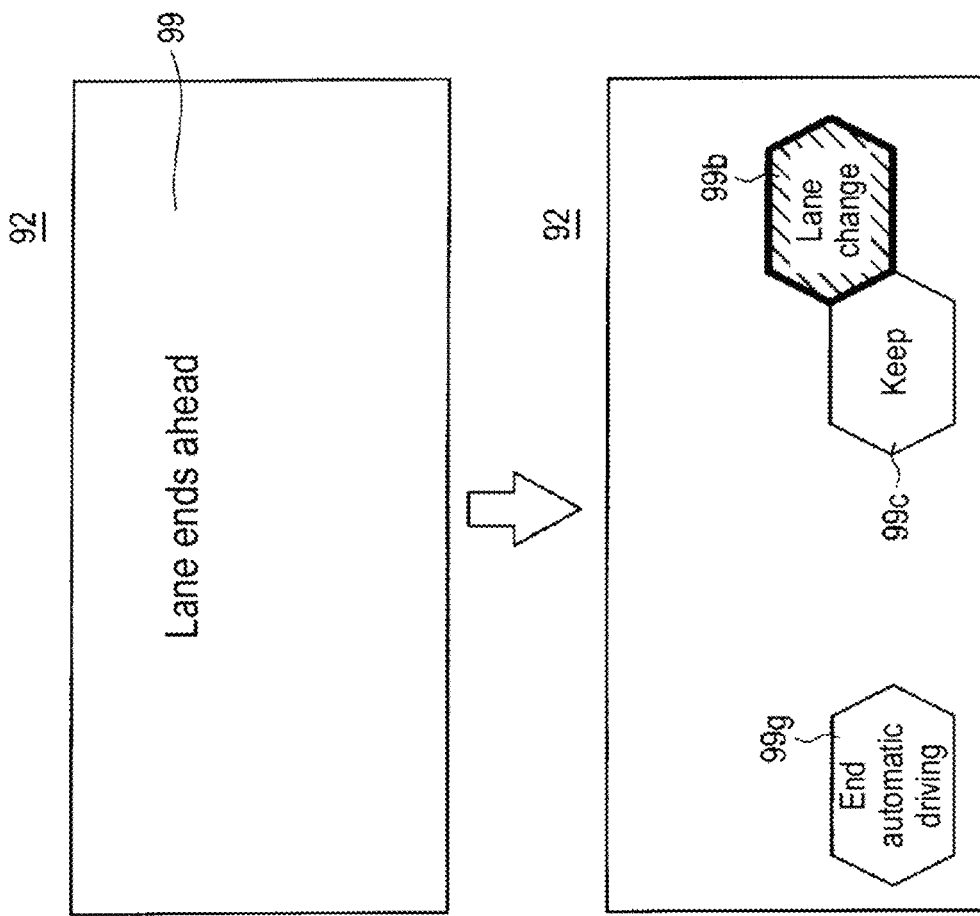
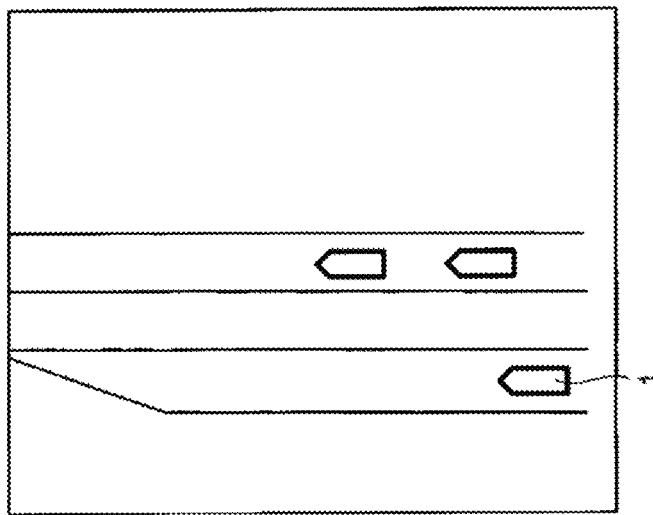

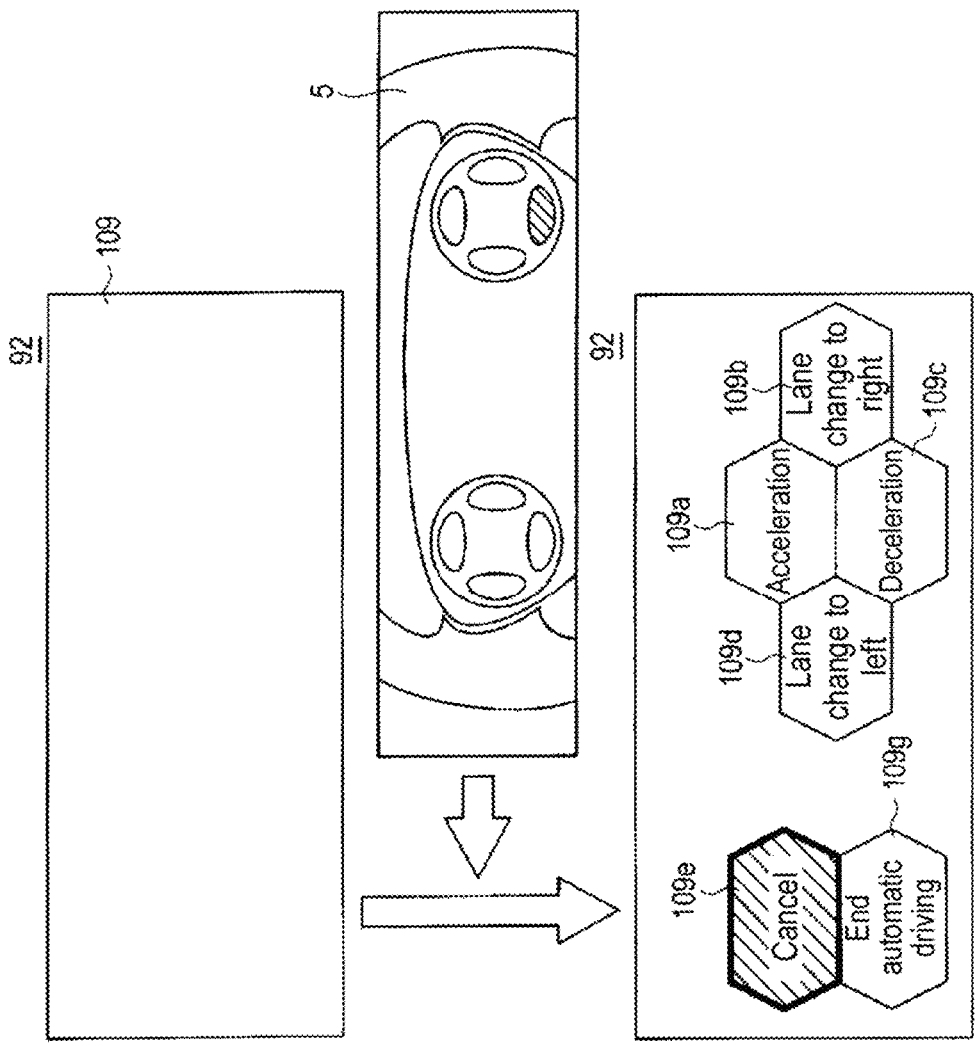
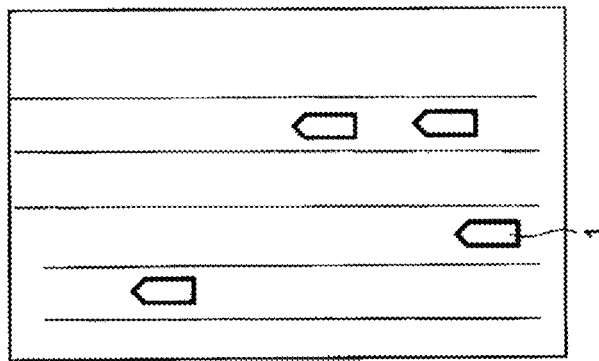

FIG. 16

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Driver x | 3 | 1 | 5 | 2 | 2 | 1 | ... |
| Driver y | 9 | 1 | 2 | 0 | 0 | 0 | ... |

FIG. 17

| | Travel environment | Approaching to merging lane | | | There is low-speed vehicle ahead | | | ... |
|---|---|---|---|---|---|---|---|---|
| | Behavior | Deceleration | Acceleration | Lane change | Follow | Overtake | Lane change | ... |
| Model A | Driver a | 3 | 1 | 5 | 1 | 1 | 5 | ... |
| Model A | Driver b | 4 | 2 | 7 | 2 | 0 | 3 | ... |
| Model A | Driver c | 3 | 2 | 2 | 1 | 2 | 8 | ... |
| Model B | Driver d | 5 | 2 | 2 | 5 | 2 | 2 | ... |
| Model B | Driver e | 7 | 2 | 2 | 5 | 0 | 3 | ... |
| Model B | Driver f | 5 | 2 | 5 | 4 | 1 | 1 | ... |
| | ... | ... | ... | ... | ... | ... | ... | ... |

FIG. 18

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Model A | 3.3 | 1.7 | 4.6 | 1.3 | 1 | 5.3 | ... |
| Model B | 5.7 | 2 | 3 | 4.7 | 1 | 2 | ... |

FIG. 19

| Travel environment | Approaching to merging lane | There is low-speed vehicle ahead | ... |
|---|---|---|---|
| Model A | Lane change | Lane change | ... |
| Model B | Deceleration | Follow | ... |

FIG. 20

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Driver a | 3 | 1 | 5 | 1 | 1 | 5 | ... |
| Driver b | 4 | 2 | 7 | 2 | 0 | 3 | ... |
| Driver c | 3 | 2 | 2 | 1 | 2 | 8 | ... |
| Driver d | 5 | 2 | 2 | 5 | 2 | 2 | ... |
| Driver e | 7 | 2 | 2 | 5 | 0 | 3 | ... |
| Driver f | 5 | 2 | 5 | 4 | 1 | 1 | ... |
| ... | ... | ... | ... | ... | ... | ... | ... |

Model of driver y ⇐ Driver c, Driver d, Driver e

FIG. 21

| Travel environment | Approaching to merging lane | | | There is low-speed vehicle ahead | | | ... |
|---|---|---|---|---|---|---|---|
| Behavior | Deceleration | Acceleration | Lane change | Follow | Overtake | Lane change | ... |
| Model of driver y | 5 | 2 | 2 | 3.7 | 1.3 | 4.3 | ... |

FIG. 22

| | Behavior | Fellow passenger | Speed | Steering | Brake | Accelerator | ... | Number of times |
|---|---|---|---|---|---|---|---|---|
| Driver x | Lane change | None | 8 | 4 | 6 | 8 | ... | 80 |
| | | 1 adult and 2 children | 3 | 3 | 4 | 3 | ... | 40 |
| | | 1 adult | 5 | 7 | 5 | 5 | ... | 60 |
| | Overtake | ... | ... | ... | ... | ... | ... | ... |
| | ... | ... | ... | ... | ... | ... | ... | ... |
| Driver y | Lane change | ... | ... | ... | ... | ... | ... | ... |
| | Overtake | ... | ... | ... | ... | ... | ... | ... |
| | ... | ... | ... | ... | ... | ... | ... | ... |
| ... | ... | ... | ... | ... | ... | ... | ... | ... |

FIG. 27

Driver x

| History | Behavior | Host vehicle information | Leading vehicle information | | | Environmental parameters - Adjacent lane information | | | | | | | Merging lane information | | | Location information | | ... |
|---|---|---|---|---|---|---|---|---|---|---|---|---|---|---|---|---|---|---|
| | | | | | | Adjacent following vehicle | | | Adjacent leading vehicle | | | | | | | | | |
| | | Va | Vba | DRba | RSb | Vca | Dca | Rca | Vda | Dda | Rda | DRda | Vma | Dma | Rma | Travel lane | Distance to merging point | |
| (a) | Deceleration | 4 | 1 | 2 | 5 | 4 | 2 | 2 | 3 | 3 | 1 | 3 | 0 | 0 | 0 | 2 | 0 | ... |
| (b) | Lane change | 3 | 2 | 5 | 4 | 2 | 2 | 1 | 0 | 0 | 0 | 10 | 1 | 2 | 3 | 1 | 4 | ... |
| (c) | Deceleration | 3 | 2 | 5 | 4 | 3 | 1 | 3 | 3 | 1 | 3 | 2 | 2 | 2 | 2 | 1 | 4 | ... |
| ... | ... | ... | ... | ... | ... | ... | ... | ... | ... | ... | ... | ... | ... | ... | ... | ... | ... | ... |

FIG. 28A

| Behavior | Environmental parameters | | | | | | | | | | | | | | | | |
|---|---|---|---|---|---|---|---|---|---|---|---|---|---|---|---|---|---|
| | Host vehicle information | Leading vehicle information | | | Adjacent lane information | | | | | | | | Merging lane information | | | Location information | |
| | | | | | Adjacent following vehicle | | | Adjacent leading vehicle | | | | | | | | | |
| | Va | Vba | DRba | RSb | Vca | Dca | Rca | Vda | Dda | Rda | DRda | Vma | Dma | Rma | Travel lane | Distance to merging point | ... |
| ??? | 3 | 3 | 5 | 4 | 1 | 2 | 1 | 0 | 0 | 0 | 9 | 1 | 2 | 3 | 1 | 4 | ... |

FIG. 28B

| History | Behavior | Environmental parameters | | | | | | | | | | | | | | | | |
|---|---|---|---|---|---|---|---|---|---|---|---|---|---|---|---|---|---|---|
| | | Host vehicle information | Leading vehicle information | | | Adjacent lane information | | | | | | | Merging lane information | | | Location information | |
| | | | | | | Adjacent following vehicle | | | Adjacent leading vehicle | | | | | | | | |
| | | Va | Vba | DRba | RSb | Vca | Dca | Rca | Vda | Dda | Rda | DRda | Vma | Dma | Rma | Travel lane | Distance to merging point | ... |
| (d) | Deceleration | 4 | 1 | 2 | 5 | 4 | 2 | 2 | 3 | 3 | 1 | 3 | 0 | 0 | 0 | 1 | 0 | ... |
| (e) | Lane change | 3 | 2 | 5 | 4 | 2 | 2 | 1 | 0 | 0 | 0 | 10 | 1 | 2 | 3 | 1 | 4 | ... |
| (f) | Deceleration | 3 | 2 | 5 | 4 | 3 | 1 | 3 | 3 | 1 | 3 | 2 | 2 | 2 | 2 | 1 | 4 | ... |
| ... | ... | ... | ... | ... | ... | ... | ... | ... | ... | ... | ... | ... | ... | ... | ... | ... | ... | ... |

|  | ① | ② | ③ | ④ | ⑤ | ⑥ | ⑦ | ⑧ | ⑨ | ... |
|---|---|---|---|---|---|---|---|---|---|---|
| Acceleration | 0 | 0 | 3 | 1 | 5 | 1 | 2 | 1 | 1 | 1 |
| Deceleration | 2 | 1 | 0 | 1 | 3 | 5 | 3 | 1 | 0 | 0 |
| Lane change | 0 | 0 | 0 | 2 | 3 | 2 | 0 | 0 | 0 | 0 |
| Overtake | 0 | 0 | 0 | 0 | 0 | 0 | 2 | 3 | 5 | 3 |

FIG. 36

| History | Action | Host vehicle information | Leading vehicle information | | | Environmental parameters | | | | | | | |
|---|---|---|---|---|---|---|---|---|---|---|---|---|---|
| | | | | | | Presence or absence of lanes | Adjacent lane information | | | | | | |
| | | | | | | | Adjacent following vehicle | | Adjacent leading vehicle | | | | |
| | | Va | Vba | DRba | RSb | | Vca | Dca | Rca | Vda | Dda | Rda | DRda |
| 1 | Deceleration | 4 | 1 | 2 | 5 | 1 | | 2 | 2 | 3 | 3 | 1 | 3 |
| 2 | Lane change | 3 | 2 | 5 | 4 | 0 | | 2 | 1 | 0 | 0 | 0 | 10 |
| 3 | Deceleration | 3 | 2 | 5 | 4 | 0 | | 1 | 3 | 3 | 1 | 3 | 2 |
| 4 | ... | | | | | | | | | | | | |
| ... | ... | ... | ... | ... | ... | ... | ... | ... | ... | ... | ... | ... | ... |

Parameter aggregate table

FIG. 40A

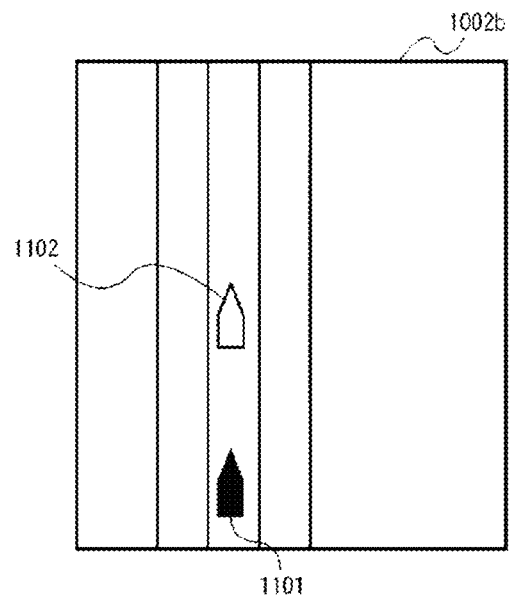

FIG. 40B

| (Current) detection information | Environmental parameters | | | | | | | | | | | | |
|---|---|---|---|---|---|---|---|---|---|---|---|---|
| | Host vehicle information | Leading vehicle information | | | Adjacent lane information | | | | | | | ... |
| | | | | | Presence or absence of lanes | Adjacent following vehicle | | | Adjacent leading vehicle | | | ... |
| | Va | Vba | DRba | RSb | | Vca | Dca | Rca | Vda | Dda | Rda | DRda | ... |
| | 4 | 1 | 2 | 4 | 1 | 0 | 0 | 0 | 0 | 0 | 0 | 0 | ... |

FIG. 40C

| Action | | Host vehicle information | | | | | Leading vehicle information | | | | | | | | | | | | | |
|---|---|---|---|---|---|---|---|---|---|---|---|---|---|---|---|---|---|---|---|---|---|
| | | Va | | | | | Vba | | | | | DRba | | | | | RSb | | | | |
| | Level | 1 | 2 | 3 | 4 | ... | 1 | 2 | 3 | 4 | ... | 1 | 2 | 3 | 4 | ... | 1 | 2 | 3 | 4 | ... |
| Acceleration | Number of times | 4 | 2 | 2 | 1 | ... | 1 | 1 | 3 | 5 | ... | 0 | 1 | 2 | 3 | ... | | | | | ... |
| Deceleration | | 3 | 4 | 4 | 5 | ... | 4 | 2 | 2 | 3 | ... | 6 | 3 | 2 | 2 | ... | | | | | ... |
| Lane change | | 5 | 2 | 3 | 2 | ... | 6 | 2 | 2 | 1 | ... | 4 | 2 | 1 | 1 | ... | | | | | ... |
| ... | | | | | | | | | | | | | | | | | | | | | |

Parameter aggregate table

FIG. 45A

| (Current) detection information | Environmental parameters ||||||||||
|---|---|---|---|---|---|---|---|---|---|---|
| | Host vehicle information | Adjacent lane information |||||||| Merging lane information |||
| | | Presence or absence of lanes | Adjacent following vehicle ||| Adjacent leading vehicle ||| | | |
| | Va | | Vca | Dca | Rca | Vda | Dda | Rda | ORda | Vma | Dma | Rma | Rmga |
| | 4 | 1 | 2 | 1 | 2 | 0 | 0 | 0 | 0 | 2 | 1 | 2 | 2 |

FIG. 45B

Parameter aggregate table

| Action | | Host vehicle information | Presence or absence of lanes | Adjacent vehicle information ||||||| Merging lane information ||||
|---|---|---|---|---|---|---|---|---|---|---|---|---|---|---|
| | | | | Adjacent following vehicle |||| | | | | | | |
| | | Va | | Vca | Dca | Rca | ... | Vma | Dma | Rma | Rga |
| | Level | 1 2 3 4 | 0 1 | 1 2 3 4 | 1 2 3 4 | 1 2 3 4 | ... | 1 2 3 4 | 1 2 3 4 | 1 2 3 4 | 1 2 3 4 |
| Acceleration | Number of times | 4 2 2 1 | 4 5 | 3 2 1 0 | 2 2 1 0 | 2 1 0 0 | ... | 3 2 1 0 | 2 2 0 0 | 2 1 0 0 | 2 1 0 0 |
| Deceleration | | 3 4 4 5 | 2 3 | 4 3 2 1 | 2 1 2 3 | 2 2 3 4 | ... | 1 2 2 5 | 2 1 4 4 | 1 2 3 4 | 1 5 4 3 |
| Lane change | | 5 2 3 2 | 0 4 | 3 1 1 0 | 2 1 1 0 | 2 1 0 0 | ... | 3 1 0 0 | 2 1 1 0 | 2 1 0 0 | 2 6 3 2 |
| ... | | | | | | | | | | | |

FIG. 48A

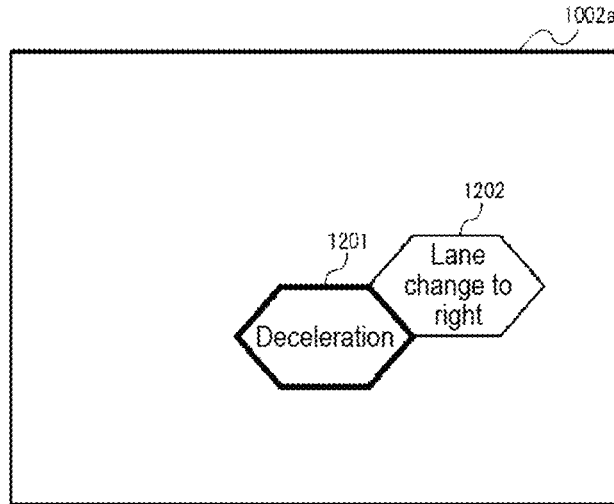

FIG. 48B

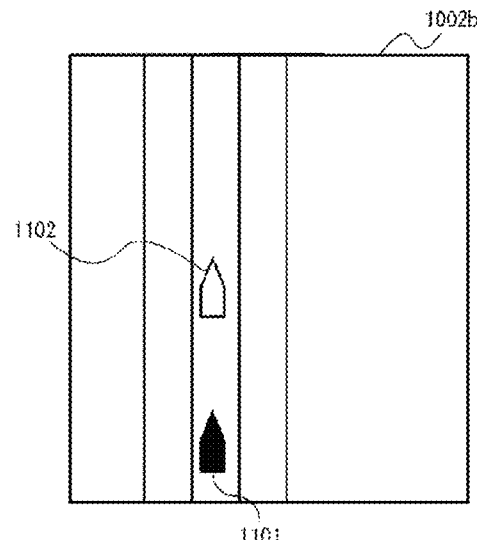

FIG. 48C

| (Current) detection information | Environmental parameters | | | | | | | | | | | |
|---|---|---|---|---|---|---|---|---|---|---|---|---|
| | Host vehicle information | Leading vehicle information | | | Adjacent lane information | | | | | | | ... |
| | | | | | Presence or absence of lanes | Adjacent following vehicle | | | Adjacent leading vehicle | | | ... |
| | Va | Vba | DRba | RSb | | Vca | Dca | Rca | Vda | Dda | Rda | DRda | ... |
| | 4 | 1 | 1 | 4 | 1 | 0 | 0 | 0 | 0 | 0 | 0 | 0 | ... |

FIG. 48D

| Action | | Host vehicle information | | | | | Leading vehicle information | | | | | | | | | | | | | | | | | ... |
|---|---|---|---|---|---|---|---|---|---|---|---|---|---|---|---|---|---|---|---|---|---|---|---|---|---|
| | | Va | | | | | Vba | | | | | DRba | | | | | RSb | | | | | | | | |
| | Level | 1 | 2 | 3 | 4 | ... | 1 | 2 | 3 | 4 | ... | 1 | 2 | 3 | 4 | ... | 1 | 2 | 3 | 4 | ... | | | | ... |
| Acceleration | | 4 | 2 | 2 | 1 | ... | 1 | 1 | 3 | 5 | ... | 0 | 1 | 2 | 3 | ... | | | | | ... | | | | |
| Deceleration | | 3 | 4 | 4 | 5 | ... | 4 | 2 | 2 | 3 | ... | 6 | 3 | 2 | 2 | ... | | | | | ... | | | | |
| Lane change | Number of times | 5 | 2 | 3 | 2 | ... | 6 | 2 | 2 | 1 | ... | 4 | 2 | 1 | 1 | ... | | | | | ... | | | | |
| ... | | | | | | | | | | | | | | | | | | | | | | | | | |

Parameter aggregate table

FIG. 53A

| (Current) detection information | Environmental parameters | | | | | | | | | | |
|---|---|---|---|---|---|---|---|---|---|---|---|
| | Host vehicle information | Adjacent lane information | | | | | | | Merging lane information | | |
| | | Presence or absence of lanes | Adjacent following vehicle | | | Adjacent leading vehicle | | | | | Distance to merging point |
| | Va | | Vca | Dca | Rca | Vda | Dda | Rda | DRda | Vma | Dma | Rma | Rga |
| | 4 | 1 | 2 | 1 | 2 | 0 | 0 | 0 | 0 | 2 | 1 | 2 | 2 |

FIG. 53B

| Action | | Host vehicle information | | Adjacent vehicle information | | | | Merging lane information | | | |
|---|---|---|---|---|---|---|---|---|---|---|---|
| | | | Presence or absence of lanes | Adjacent following vehicle | | | | | | | Distance to merging point |
| | Level | Va | | Vca | Dca | Rca | | Vma | Dma | Rma | Rga |
| | | 1 2 3 4 ⋯ | 0 1 ⋯ | 1 2 3 4 ⋯ | 1 2 3 4 ⋯ | 1 2 3 4 ⋯ | ⋯ | 1 2 3 4 ⋯ | 1 2 3 4 ⋯ | 1 2 3 4 ⋯ | 1 2 3 4 ⋯ |
| Acceleration | 4 | 4 2 2 1 ⋯ | 5 4 | 2 4 2 1 ⋯ | 1 2 2 1 ⋯ | 2 4 2 1 ⋯ | ⋯ | 2 2 2 1 ⋯ | 2 2 0 0 ⋯ | 2 1 0 0 ⋯ | 2 0 1 2 ⋯ |
| Deceleration | 3 | 4 4 5 2 ⋯ | 2 3 | 2 1 2 3 ⋯ | 2 1 2 3 ⋯ | 1 2 3 4 ⋯ | ⋯ | 1 2 2 5 ⋯ | 2 1 4 4 ⋯ | 1 2 3 4 ⋯ | 1 5 4 3 0 |
| Lane change | 5 | 2 3 2 ⋯ | 0 4 | 1 3 1 ⋯ | 0 2 1 1 ⋯ | 1 0 0 ⋯ | ⋯ | 3 1 0 0 ⋯ | 2 1 1 0 ⋯ | 0 0 ⋯ | 6 5 3 2 |
| ⋯ | | | | | | | | | | | |

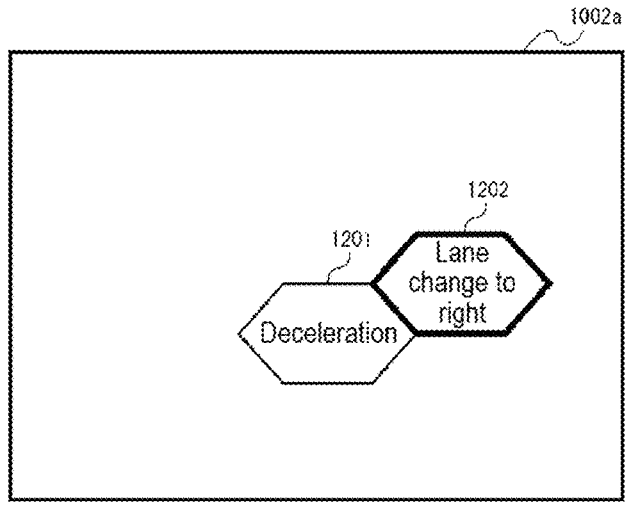
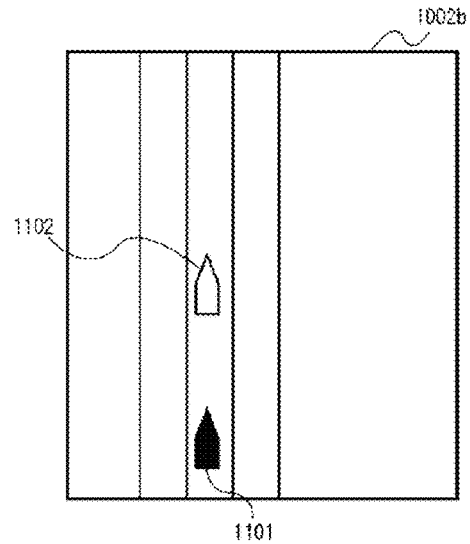

FIG. 55C

| (Current) detection information | Environmental parameters ||||||||||||| |
|---|---|---|---|---|---|---|---|---|---|---|---|---|---|
| | Host vehicle information | Leading vehicle information ||| Presence or absence of lanes | Adjacent lane information |||||| ... |
| | | | | | | Adjacent following vehicle ||| Adjacent leading vehicle ||| DRda | ... |
| | Va | Vba | DRba | RSb | | Vca | Dca | Rca | Vda | Dda | Rda | | ... |
| | 4 | 1 | 1 | 4 | 1 | 0 | 0 | 0 | 0 | 0 | 0 | 0 | ... |

FIG. 55D

| Action | | Host vehicle information |||| Leading vehicle information |||||||||||||| Adjacent lane information |||||| ... |
|---|---|---|---|---|---|---|---|---|---|---|---|---|---|---|---|---|---|---|---|---|---|---|---|---|---|
| | | Va |||| Vba |||| DRba |||| RSb |||| Presence or absence of lanes | Adjacent following vehicle ||||| |
| | | | | | | | | | | | | | | | | | | | | Vca ||||| |
| | Level | 1 | 2 | 3 | 4 | 1 | 2 | 3 | 4 | 1 | 2 | 3 | 4 | 1 | 2 | 3 | 4 | 1 | 0 | 1 | 2 | 3 | 4 | ... |
| Acceleration | | 4 | 2 | 2 | 1 | 1 | 1 | 3 | 5 | 0 | 1 | 2 | 3 | | | | | 2 | 3 | | | | | ... |
| Deceleration | | 3 | 4 | 4 | 5 | 4 | 2 | 2 | 3 | 6 | 3 | 2 | 2 | | | | | 1 | 2 | | | | | ... |
| Lane change | | 5 | 2 | 3 | 2 | 6 | 2 | 2 | 1 | 4 | 2 | 1 | 1 | | | | | 10 | 0 | | | | | ... |
| ... | Number of times | | | | | | | | | | | | | | | | | | | | | | | |

Parameter aggregate table

FIG. 56A
FIG. 56B
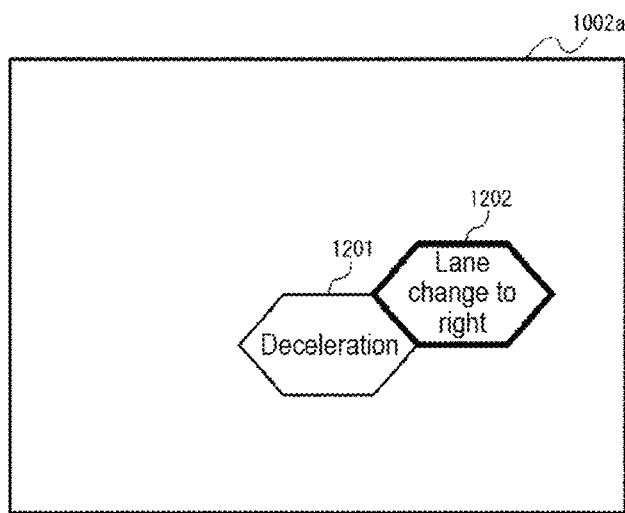
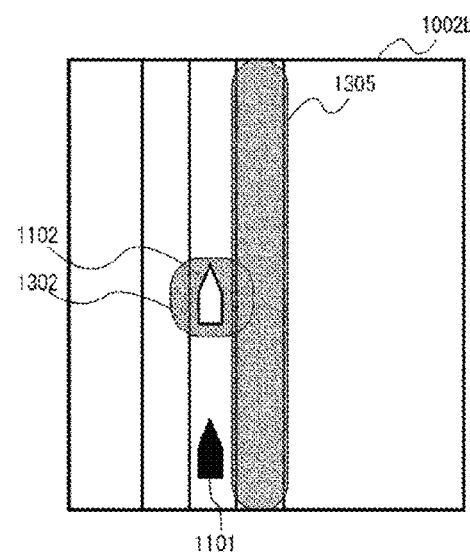

FIG. 58A

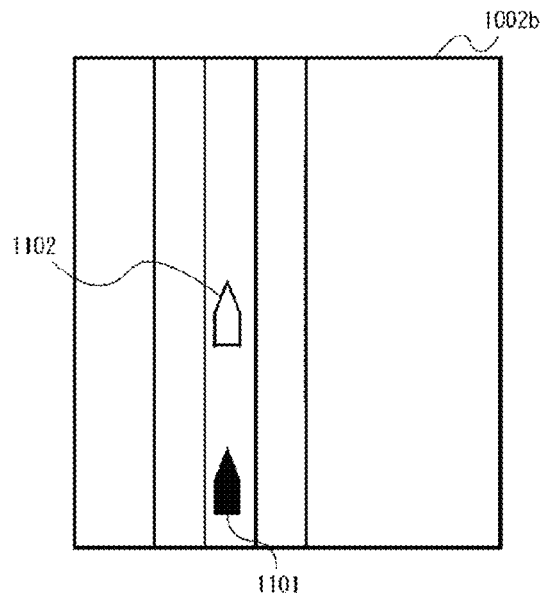

FIG. 58B

| (Current) detection information | Environmental parameters ||||||||||||| ... |
|---|---|---|---|---|---|---|---|---|---|---|---|---|---|
| | Host vehicle information | Leading vehicle information ||| Adjacent lane information ||||||| | ... |
| | | | | | Presence or absence of lanes | Adjacent following vehicle ||| Adjacent leading vehicle ||| DRda | ... |
| | Va | Vba | DRba | RSb | | Vca | Dca | Rca | Vda | Dda | Rda | | ... |
| | 4 | 1 | 1 | 4 | 1 | 0 | 0 | 0 | 0 | 0 | 0 | 0 | ... |

FIG. 58C

| Action | | Host vehicle information |||| Leading vehicle information |||||||||||||| ... |
|---|---|---|---|---|---|---|---|---|---|---|---|---|---|---|---|---|---|---|---|
| | | Va |||| Vba |||| DRba |||| RSb |||| |
| | Level | 1 | 2 | 3 | 4 | 1 | 2 | 3 | 4 | 1 | 2 | 3 | 4 | 1 | 2 | 3 | 4 | ... |
| Acceleration | Number of times | 4 | 2 | 2 | 1 | 1 | 1 | 3 | 5 | 0 | 1 | 2 | 3 | | | | | ... |
| Deceleration | | 3 | 4 | 4 | 5 | 4 | 2 | 2 | 3 | 6 | 3 | 2 | 2 | | | | | ... |
| Lane change | | 5 | 2 | 3 | 2 | 6 | 2 | 2 | 1 | 4 | 2 | 1 | 1 | | | | | ... |
| ... | | | | | | | | | | | | | | | | | | |

Parameter aggregate table

FIG. 62A
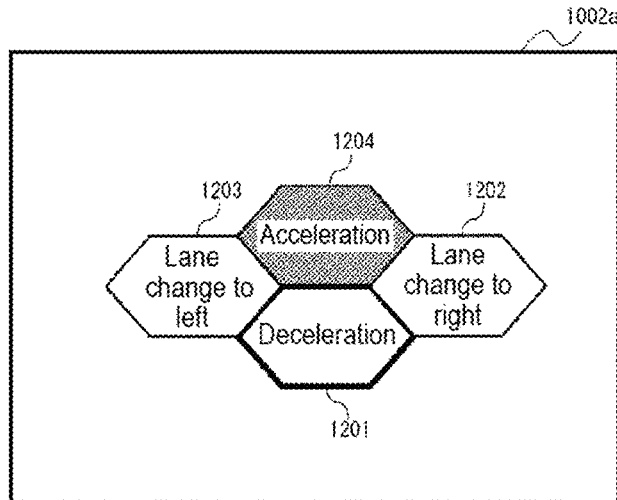

FIG. 62B
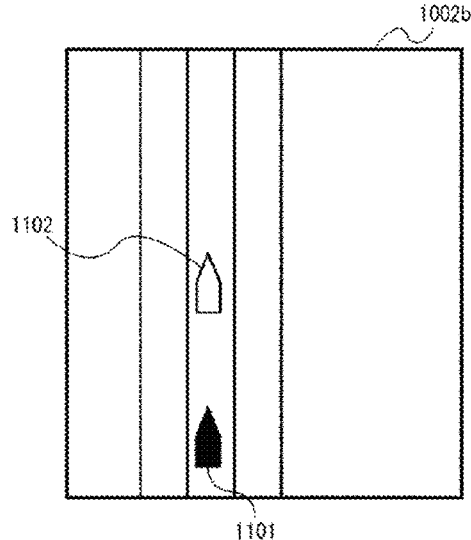

FIG. 62C

| (Current) detection information | Environmental parameters | | | | | | | | | | | ... |
|---|---|---|---|---|---|---|---|---|---|---|---|---|
| | Host vehicle information | Leading vehicle information | | | Adjacent lane information | | | | | | | ... |
| | | | | | Presence or absence of lanes | Adjacent following vehicle | | | Adjacent leading vehicle | | | ... |
| | | | | | | | | | | | DRda | |
| | Va | Vba | DRba | RSb | | Vca | Dca | Rca | Vda | Dda | Rda | ... |
| | 4 | 1 | 1 | 4 | 1 | 0 | 0 | 0 | 0 | 0 | 0 | 0 | ... |

FIG. 62D

| Action | | Host vehicle information | | | | | Leading vehicle information | | | | | | | | | | | | | | | |
|---|---|---|---|---|---|---|---|---|---|---|---|---|---|---|---|---|---|---|---|---|---|---|---|
| | | Va | | | | | Vba | | | | | DRba | | | | | RSb | | | | | |
| | Level | 1 | 2 | 3 | 4 | ... | 1 | 2 | 3 | 4 | ... | 1 | 2 | 3 | 4 | ... | 1 | 2 | 3 | 4 | ... | ... |
| Acceleration | | 4 | 2 | 2 | 1 | ... | 1 | 1 | 3 | 5 | ... | 0 | 1 | 2 | 3 | ... | | | | | ... | |
| Deceleration | | 3 | 4 | 4 | 5 | ... | 4 | 2 | 2 | 3 | ... | 6 | 3 | 2 | 2 | ... | | | | | ... | |
| Lane change | Number of times | 5 | 2 | 3 | 2 | ... | 6 | 2 | 2 | 1 | ... | 4 | 2 | 1 | 1 | ... | | | | | ... | |
| ... | | | | | | | | | | | | | | | | | | | | | | |

Parameter aggregate table

FIG. 64A

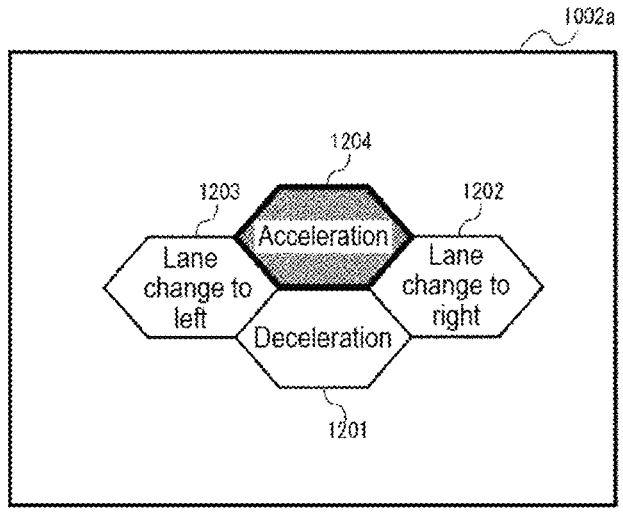

FIG. 64B

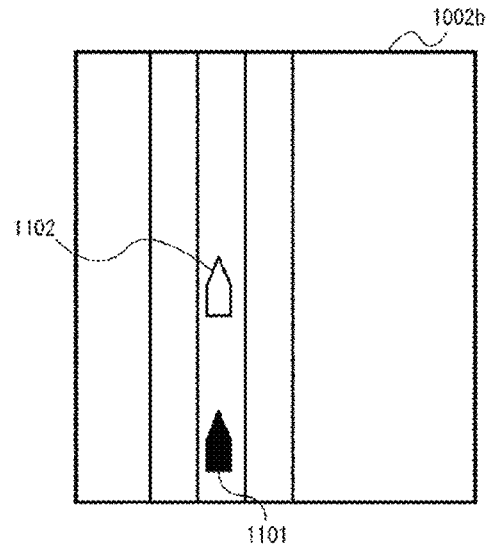

FIG. 64C

| (Current) detection information | Environmental parameters | | | | | | | | | | | | ... |
|---|---|---|---|---|---|---|---|---|---|---|---|---|---|
| | Host vehicle information | Leading vehicle information | | | Adjacent lane information | | | | | | | | ... |
| | | | | | Presence or absence of lanes | Adjacent following vehicle | | | Adjacent leading vehicle | | | DRda | ... |
| | Va | Vba | DRba | RSb | | Vca | Dca | Rca | Vda | Dda | Rda | | ... |
| | 4 | 1 | 1 | 4 | 1 | 0 | 0 | 0 | 0 | 0 | 0 | 0 | ... |

FIG. 64D

| Action | | Host vehicle information | | | | | Leading vehicle information | | | | | | | | | | | | | | | |
|---|---|---|---|---|---|---|---|---|---|---|---|---|---|---|---|---|---|---|---|---|---|---|---|
| | | Va | | | | | Vba | | | | | DRba | | | | | RSb | | | | | |
| | Level | 1 | 2 | 3 | 4 | ... | 1 | 2 | 3 | 4 | ... | 1 | 2 | 3 | 4 | ... | 1 | 2 | 3 | 4 | ... | ... |
| Acceleration | | 4 | 2 | 2 | 1 | ... | 1 | 1 | 3 | 5 | ... | 0 | 1 | 2 | 3 | ... | | | | | ... | |
| Deceleration | Number of times | 3 | 4 | 4 | 5 | ... | 4 | 2 | 2 | 3 | ... | 6 | 3 | 2 | 2 | ... | | | | | ... | |
| Lane change | | 5 | 2 | 3 | 2 | ... | 6 | 2 | 2 | 1 | ... | 4 | 2 | 1 | 1 | ... | | | | | ... | |
| ... | | | | | | | | | | | | | | | | | | | | | | | |

Parameter aggregate table

Distant ←——————→ Close

Person   Wall   Vehicle

Merging lane   Railroad crossing

DRIVING ASSISTANCE METHOD, AND DRIVING ASSISTANCE DEVICE, DRIVING CONTROL DEVICE, VEHICLE, DRIVING ASSISTANCE PROGRAM, AND RECORDING MEDIUM USING SAID METHOD

This application is a U.S. national stage application of the PCT International Application No. PCT/JP2016/002084 filed on Apr. 19, 2016, which claims the benefit of foreign priority of Japanese patent application No. 2015-087069, 2015-099474, 2015-119139, filed on, Apr. 21, 2015, May 14, 2015 and Jun. 12, 2015, and 2015-252675 filed on, Dec. 24, 2015, the contents all of which are incorporated herein by reference.

TECHNICAL FIELD

The present invention relates to a vehicle, a driving assistance method applied to the vehicle, and a driving assistance device, a driving control device, and a driving assistance program using the driving assistance method.

BACKGROUND ART

Recently, there have been proposed various technologies relating to a vehicle which can be driven in a manual driving mode in which a driver oneself drives the vehicle or in an autonomous driving mode in which a portion of or all of driving operations are autonomously performed, or technologies relating to a fully automated self-driving vehicle, based on a surrounding situation of the vehicle or a travel state (for example, the speed of the vehicle or control information such as steering, acceleration, braking, turn signal indicator, or actuator) of the vehicle, and these technologies have been put into practical use.

For example, PTL 1 discloses a travel control device configured to, when performing, on a host vehicle, autonomous steering control or autonomous acceleration/deceleration control, allow a driver to visually recognize the operating state of the autonomous steering control or the autonomous acceleration/deceleration control.

CITATION LIST

Patent Literature

PTL 1: Unexamined Japanese Patent Publication No. 2005-67483

SUMMARY OF THE INVENTION

The present invention provides a driving assistance method in full autonomous driving or limited autonomous driving, and a driving assistance device, a driving control device, a vehicle, and a driving assistance program using such a driving assistance method.

A driving assistance device according to one aspect of the present invention includes an image generator that generates a first image representing an action a vehicle is capable of executing depending on a travel environment during autonomous driving and a second image representing the basis of the action; and an image output unit that outputs the first image and the second image generated by the image generator to a notification device in the vehicle in association with each other.

Another aspect of the present invention is a driving control device. This device includes an autonomous driving controller that controls an action of a vehicle during autonomous driving of the vehicle; an image generator that generates a first image representing an action the vehicle is capable of executing depending on a travel environment during autonomous driving and a second image representing the basis of the action; and an image output unit that outputs the first image and the second image generated by the image generator to a notification device in the vehicle in association with each other.

Still another aspect of the present invention is a vehicle. This vehicle is provided with a driving assistance device, the driving assistance device including an image generator that generates a first image representing an action the vehicle is capable of executing depending on a travel environment during autonomous driving and a second image representing the basis of the action; and an image output unit that outputs the first image and the second image generated by the image generator to a notification device in the vehicle in association with each other.

Still another aspect of the present invention is a driving assistance method. This method includes generating a first image representing an action a vehicle is capable of executing depending on a travel environment during autonomous driving and a second image representing the basis of the action; outputting the first image and the second image which have been generated to a notification device in the vehicle in association with each other.

Any desired combinations of the above described components and modifications of the features of the present invention in devices, systems, methods, computer programs, a non-transitory computer-readable recording media containing the computer programs, a vehicle having mounted thereto the present device, or other entities are still effective as other aspects of the present invention.

According to the present invention, information can appropriately be transmitted to an occupant from a vehicle so as to enable comfortable autonomous driving in which a vehicle operation and a driver's operation are difficult to be incompatible with each other in full autonomous driving or limited autonomous driving.

BRIEF DESCRIPTION OF DRAWINGS

FIG. 2A is a view for describing a first example of a travel environment according to the first exemplary embodiment.

FIG. 2B is a view for describing a display on a notification unit relative to the first example of a travel environment according to the first exemplary embodiment.

FIG. 2C is a view for describing an operation on an operating unit relative to the first example of a travel environment according to the first exemplary embodiment.

FIG. 6A is a view for describing the first example of a travel environment according to the first exemplary embodiment.

FIG. 6B is a view for describing another display control for the first example of a travel environment according to the first exemplary embodiment.

FIG. 7A is a view for describing a second example of a travel environment according to the first exemplary embodiment.

FIG. 7B is a view for describing display control for the second example of a travel environment according to the first exemplary embodiment.

FIG. 9A is a view for describing a fourth example of a travel environment according to the first exemplary embodiment.

FIG. 9B is a view for describing display control for the fourth example of a travel environment according to the first exemplary embodiment.

FIG. 10A is a view for describing a fifth example of a travel environment according to the first exemplary embodiment.

FIG. 10B is a view for describing display control for the fifth example of a travel environment according to the first exemplary embodiment.

FIG. 16 is a diagram for describing one example of a travel history according to a fourth exemplary embodiment.

FIG. 17 is a diagram illustrating a method for constructing a clustering-type driver model according to the fourth exemplary embodiment.

FIG. 18 is a diagram illustrating one example of the constructed clustering-type driver model according to the fourth exemplary embodiment.

FIG. 19 is a diagram illustrating another example of the constructed clustering-type driver model according to the fourth exemplary embodiment.

FIG. 20 is a diagram illustrating a method for constructing an individually-adapted-type driver model according to the fourth exemplary embodiment.

FIG. 21 is a diagram illustrating one example of the constructed individually-adapted-type driver model according to the fourth exemplary embodiment.

FIG. 22 is a diagram for describing one example of a driving characteristic model according to the fourth exemplary embodiment.

FIG. 27 is a diagram for describing one example of a travel history according to the fourth exemplary embodiment.

FIG. 28A is a diagram illustrating a method for using a driver model in a modification of the driver model according to the fourth exemplary embodiment.

FIG. 28B is a diagram illustrating a method for using a driver model in the modification of the driver model according to the fourth exemplary embodiment.

FIG. 36 is a diagram illustrating one example of a travel history accumulated in a travel history retaining unit according to the fifth exemplary embodiment.

FIG. 40A is a view for describing one example of a process for determining an action candidate and a recommended action according to the fifth exemplary embodiment.

FIG. 40B is a diagram for describing one example of a process for determining an action candidate and a recommended action according to the fifth exemplary embodiment.

FIG. 40C is a diagram for describing one example of a process for determining an action candidate and a recommended action according to the fifth exemplary embodiment.

FIG. 45A is a diagram for describing another example of a process for determining an action candidate and a recommended action according to the fifth exemplary embodiment.

FIG. 45B is a diagram for describing another example of a process for determining an action candidate and a recommended action according to the fifth exemplary embodiment.

FIG. 48A is a view for describing one example of a process for determining an action basis according to the fifth exemplary embodiment.

FIG. 48B is a view for describing one example of a process for determining an action basis according to the fifth exemplary embodiment.

FIG. 48C is a diagram for describing one example of a process for determining an action basis according to the fifth exemplary embodiment.

FIG. 48D is a diagram for describing one example of a process for determining an action basis according to the fifth exemplary embodiment.

FIG. 53A is a diagram for describing another example of a process for determining an action basis according to the fifth exemplary embodiment.

FIG. 53B is a diagram for describing another example of a process for determining an action basis according to the fifth exemplary embodiment.

FIG. 55A is a view for describing still another example of a process for determining an action basis according to the fifth exemplary embodiment.

FIG. 55B is a view for describing still another example of a process for determining an action basis according to the fifth exemplary embodiment.

FIG. 55C is a diagram for describing still another example of a process for determining an action basis according to the fifth exemplary embodiment.

FIG. 55D is a diagram for describing still another example of a process for determining an action basis according to the fifth exemplary embodiment.

FIG. 56A is a view for describing yet another example of a process for determining an action basis according to the fifth exemplary embodiment.

FIG. 56B is a view for describing yet another example of a process for determining an action basis according to the fifth exemplary embodiment.

FIG. 58A is a view for describing one example of a process for determining an action candidate and a recommended action according to a sixth exemplary embodiment.

FIG. 58B is a diagram for describing one example of a process for determining an action candidate and a recommended action according to the sixth exemplary embodiment.

FIG. 58C is a diagram for describing one example of a process for determining an action candidate and a recommended action according to the sixth exemplary embodiment.

FIG. 62A is a view for describing one example of a process for determining an action basis according to the sixth exemplary embodiment.

FIG. 62B is a view for describing one example of a process for determining an action basis according to the sixth exemplary embodiment.

FIG. 62C is a diagram for describing one example of a process for determining an action basis according to the sixth exemplary embodiment.

FIG. 62D is a diagram for describing one example of a process for determining an action basis according to the sixth exemplary embodiment.

FIG. 64A is a view for describing another example of a process for determining an action basis according to the sixth exemplary embodiment.

FIG. 64B is a view for describing another example of a process for determining an action basis according to the sixth exemplary embodiment.

FIG. 64C is a diagram for describing another example of a process for determining an action basis according to the sixth exemplary embodiment.

FIG. 64D is a diagram for describing another example of a process for determining an action basis according to the sixth exemplary embodiment.

FIG. 67 is a flowchart illustrating a subroutine of the process in step S130 in FIG. 66.

FIG. 68 is a view illustrating one example of an image display according to a first modification of the fifth exemplary embodiment.

FIG. 69 is a view illustrating one example of an image display according to the first modification of the fifth exemplary embodiment.

FIG. 70A is a view illustrating an example of an icon used in an integrated display screen.

FIG. 70B is a view illustrating an example of an icon used in an integrated display screen.

FIG. 71 is a view illustrating one example of an image display according to a first modification of the sixth exemplary embodiment.

FIG. 72 is a view illustrating one example of an image display according to a second modification of the fifth exemplary embodiment.

FIG. 73 is a view illustrating another example of an image display according to the second modification of the fifth exemplary embodiment.

DESCRIPTION OF EMBODIMENTS

Prior to describing exemplary embodiments of the present invention, problems of a conventional device will be briefly described. During autonomous driving (including both full autonomous driving and limited autonomous driving), a driver relies on a vehicle to autonomously drive, so that a trust relationship between the vehicle and the driver is significantly important, and it is necessary to transmit appropriate information between the vehicle and the driver (occupant). In PTL 1, a driver is notified of only a current operating state.

There arises a first problem in which the driver has a large amount of anxiety, if he/she is notified of only a current behavior (operating state or control content) of the vehicle and not notified of a behavior that the vehicle is about to perform (for example, a control content, such as a lane change, acceleration, or deceleration, which is about to be performed by the vehicle particularly before merging, before entering an intersection, when an emergency vehicle is close to the vehicle, or when nearby vehicles around the vehicle are about to do or have done a certain action), during autonomous driving.

In addition, there is a second problem as follows. During full autonomous driving, it is highly likely that the driver takes actions other than monitoring driving. Therefore, even when only the current operating state is suddenly displayed, the driver is unable to recognize the current surrounding situation of the vehicle or the travel state of the vehicle, and even if the driver tries to issue a driving instruction by his/her own will, he/she is unable to promptly respond, and he/she cannot smoothly give an instruction to the vehicle.

There is also a third problem in which the driver is notified of only the current operating state, and even if the driver tries to directly and manually drive the vehicle, the driving mode is not promptly switched from the autonomous driving to the manual driving.

In addition, there is a fourth problem as follows. Even if the vehicle takes the same action by the driver or an occupant, a timing of the action or an operation amount is different for each person, and it is likely to be deviated from a sense of the driver when the driver actually manually drives the vehicle. In the worst case, an unnecessary intervention performed by the driver may be induced during autonomous driving.

Hereinafter, exemplary embodiments of the present invention will be described in detail with reference to the drawings. Note that each of the exemplary embodiments described below is only illustrative, and does not limit the present invention.

First Exemplary Embodiment

Figure 1:
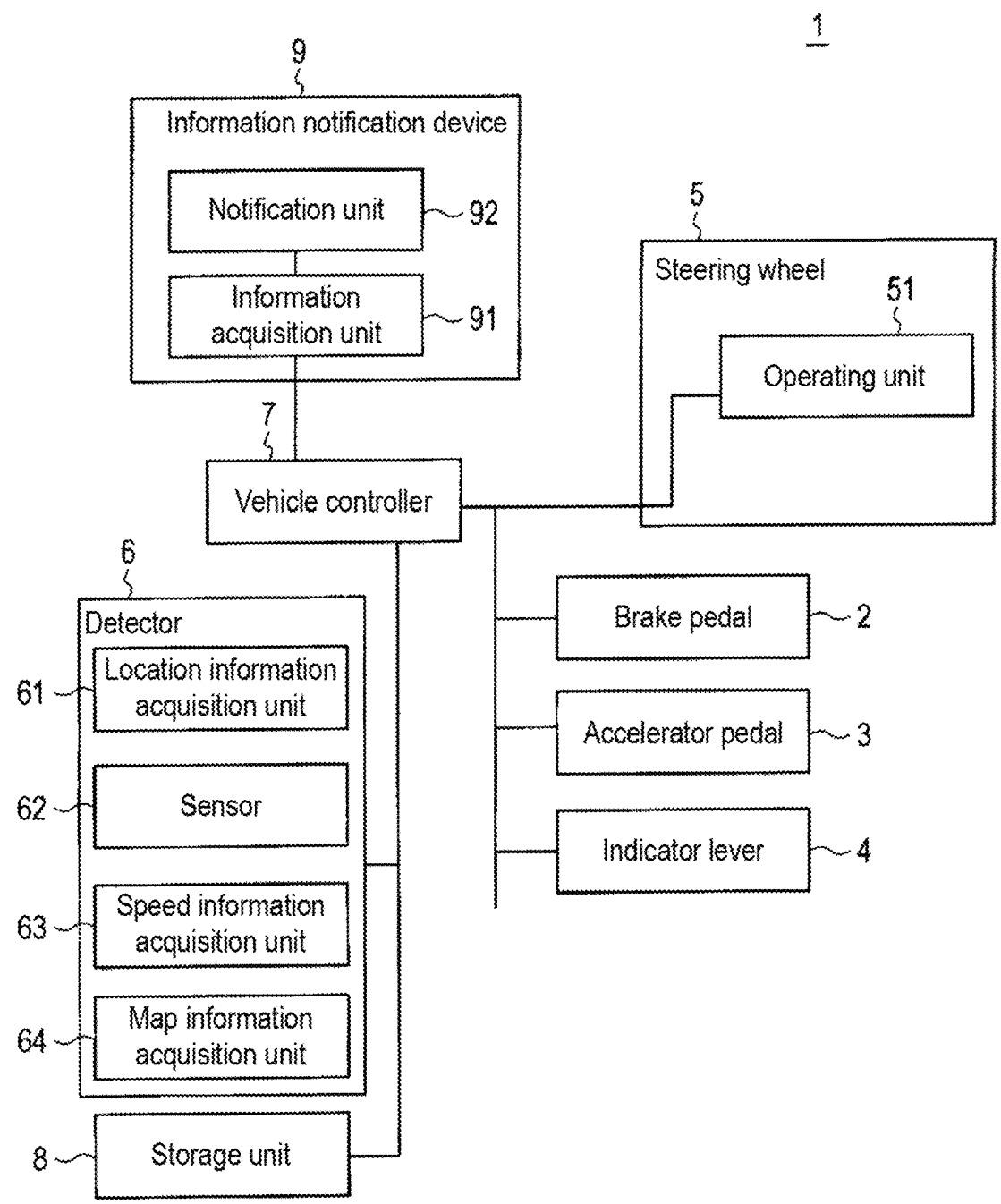
FIG. 1 is a block diagram illustrating a configuration of a main part of a vehicle including an information notification device according to a first exemplary embodiment of the present invention.

FIG. 1 is a block diagram illustrating a configuration of a main part of vehicle 1 including an information notification device according to the first exemplary embodiment of the present invention. Vehicle 1 enables all of or a portion of driving control autonomously without requiring an operation by a driver.

Vehicle 1 includes brake pedal 2, accelerator pedal 3, indicator lever 4, steering wheel 5, detector 6, vehicle controller 7, storage unit 8, and information notification device 9.

Brake pedal 2 receives a brake operation performed by the driver to decelerate vehicle 1. Brake pedal 2 may also receive a result of control performed by vehicle controller 7, and vary in an amount corresponding to the degree of deceleration of vehicle 1. Accelerator pedal 3 receives an acceleration operation performed by the driver to accelerate vehicle 1. Accelerator pedal 3 may also receive a control result by vehicle controller 7, and vary in an amount corresponding to the degree of acceleration of vehicle 1. Indicator lever 4 receives a lever operation performed by the driver to turn on an unillustrated turn indicator of vehicle 1. Indicator lever 4 may also receive a result of control performed by vehicle controller 7 to bring indicator lever 4 into a state corresponding to the indicated direction of vehicle 1 and turn on the unillustrated turn indicator of vehicle 1.

Steering wheel 5 receives a steering operation performed by the driver to change the travel direction of vehicle 1. Steering wheel 5 may also receive a result of control performed by vehicle controller 7, and vary in an amount corresponding to the change in the travel direction of vehicle 1. Steering wheel 5 is provided with operating unit 51.

Operating unit 51 is provided on a front face (face facing the driver) of steering wheel 5, and receives an input operation from the driver. Operating unit 51 is a device such as a button, a touch panel, or a grip sensor, for example. Operating unit 51 outputs the information about the input operation received from the driver to vehicle controller 7.

Detector 6 detects a travel state of vehicle 1 and a surrounding situation of vehicle 1. Then, detector 6 outputs information about the detected travel state and the surrounding situation to vehicle controller 7.

Detector 6 includes location information acquisition unit 61, sensor 62, speed information acquisition unit 63, and map information acquisition unit 64.

Location information acquisition unit 61 acquires, as the information about the travel state, information about the location of vehicle 1 by a global positioning system (GPS) or the like.

Sensor 62 detects the surrounding situation of vehicle 1, that is, the location of a nearby vehicle present around vehicle 1 and the determination of whether the nearby vehicle is a leading vehicle or not from information about the location of this vehicle and lane position information, a time to collision (TTC) from the speed of the nearby vehicle and the speed of vehicle 1, or an obstacle present around vehicle 1.

Speed information acquisition unit 63 acquires, as information about the travel state, information about the speed or the travel direction of vehicle 1 by an unillustrated speed sensor or the like.

Map information acquisition unit 64 acquires, as information about the surrounding situation of vehicle 1, map information around vehicle 1 such as the road on which vehicle 1 is traveling, a merging point with a nearby vehicle on the road, the lane in which vehicle 1 is currently traveling, a position of an intersection, or the like.

Note that sensor 62 includes a millimeter-wave radar, a laser radar, a camera, or a combination thereof.

Storage unit 8 is a storage device such as a read only memory (ROM), a random access memory (RAM), a hard disk drive, or a solid state drive (SSD), and stores a correspondence between the travel environment at present and a candidate of a behavior that can be performed next (after a lapse of a first predetermined time).

The travel environment at present is an environment determined based on the location of vehicle 1, the road on which vehicle 1 is traveling, the location and speed of a nearby vehicle present around vehicle 1, for example. Notably, for example, whether vehicle 1 is now accelerating or decelerating, and in addition, even a possibility of collision with a nearby vehicle after one second because of the nearby vehicle cutting in front of vehicle 1 may also be determined, according to the location or speed of the nearby vehicle, based on not only momentary data but also data before and after the moment. Thus, the action of the nearby vehicle can be predicted, whereby the travel environment can be recognized in more detail with higher accuracy. The behavior candidate is a candidate of a behavior that can be performed next by vehicle 1 (after a lapse of the first predetermined time) in response to the travel environment at present.

For example, storage unit 8 stores in advance three behavior candidates which are acceleration of vehicle 1, deceleration of vehicle 1, and lane change of vehicle 1 to the right, in association with a travel environment in which there is a merging lane ahead on the lane in which vehicle 1 is traveling, there is a vehicle merging from the left side of the lane, and it is possible to change lanes to the right relative to the lane in which vehicle 1 is traveling.

Storage unit 8 also stores in advance, in association with a travel environment in which a vehicle traveling in front of vehicle 1 in the same lane of vehicle 1 (hereinafter such a vehicle will be referred to as a "leading vehicle") is traveling with the speed lower than the speed of vehicle 1, and it is possible to change the lane to the adjacent lane, three behavior candidates which are a travel mode for overtaking the leading vehicle, a travel mode for changing the lane to the adjacent lane, and a travel mode for decelerating vehicle 1 to follow the leading vehicle.

In addition, storage unit 8 may store the priority order of each of the behavior candidates. For example, storage unit 8 may store the number of times each behavior has been actually used for the same previous travel environment, and may store such that the most frequently used behavior has a higher priority order.

Vehicle controller 7 can be implemented as a part of a large scale integration (LSI) circuit or an electronic control unit (ECU) controlling the vehicle, for example. Vehicle controller 7 controls the vehicle based on information about the travel state and the surrounding situation acquired from detector 6, and controls brake pedal 2, accelerator pedal 3, indicator lever 4, and information notification device 9 according to the result of the vehicle control. Note that the target to be controlled by vehicle controller 7 is not limited to those described above.

Firstly, vehicle controller 7 determines the travel environment at present based on the information about the travel state and the surrounding situation. Conventionally proposed various methods can be used for this determination.

For example, vehicle controller 7 determines the travel environment at present to be "a travel environment in which there is a merging lane ahead on the lane in which vehicle 1 is traveling, there is a vehicle merging from the left side of the lane, and it is possible to change the lane to the right relative to the lane in which vehicle 1 is traveling", based on the information about the travel state and the surrounding situation.

Further, vehicle controller 7 determines, for example, that the time sequence of the travel environment is a "travel environment in which a vehicle traveling in front of vehicle 1 in the same lane of vehicle 1 is traveling with the speed lower than the speed of vehicle 1, and it is possible to change the lane to the adjacent lane", based on the information about the travel state and the surrounding situation.

Vehicle controller 7 causes notification unit 92 of information notification device 9 to provide notification regarding information pertaining to the travel environment indicating the travel state and the surrounding situation. Vehicle controller 7 also reads, from storage unit 8, behavior candidates that can be performed next by vehicle 1 (after a lapse of the first predetermined time) in response to the determined travel environment.

Vehicle controller 7 determines which is the most suitable for the current travel environment from among the read behavior candidates, and sets the behavior most suitable for the current travel environment as a first behavior. Notably, the first behavior may be the same as the behavior the vehicle 1 is currently doing, that is, vehicle 1 may continue the current behavior. Then, vehicle controller 7 sets, as a second behavior (different from the behavior to be performed), the behavior candidate executable by the driver other than the first behavior in the current travel environment.

For example, vehicle controller 7 may set the most suitable behavior as the first behavior using a conventional technology for determining the most suitable behavior based on the information about the travel state and the surrounding situation.

Alternatively, vehicle controller 7 may set, from among a plurality of behavior candidates, a predefined behavior as the most suitable behavior, or vehicle controller 7 may store in storage unit 8 the information about the last selected behavior, and determine this behavior as the most suitable behavior. Alternatively, vehicle controller 7 may store in storage unit 8 the number of times each behavior has been previously selected, and determine the most frequently selected behavior as the most suitable behavior.

Then, vehicle controller 7 causes notification unit 92 of information notification device 9 to provide notification regarding the information about the first behavior and the second behavior. Note that, when vehicle controller 7 determines that there is no second behavior, vehicle controller 7 causes notification unit 92 to provide notification regarding only the first behavior.

It is to be noted that vehicle controller 7 may cause notification unit 92 to simultaneously provide notifications regarding the information about the first behavior and the second behavior and the information about the travel state and the surrounding situation.

In addition, vehicle controller 7 acquires information about the operation received by operating unit 51 from the driver. Vehicle controller 7 determines whether or not operating unit 51 has received an operation within a second predetermined time after the notification regarding the first behavior and the second behavior. This operation corresponds to an operation for selecting one of behaviors included in the second behavior, for example.

When operating unit 51 has not received an operation within the second predetermined time, vehicle controller 7 controls the vehicle such that the vehicle executes the first behavior, and controls brake pedal 2, accelerator pedal 3, and indicator lever 4 according to the vehicle control result.

When operating unit 51 has received an operation within the second predetermined time, vehicle controller 7 performs the control corresponding to the received operation.

Information notification device 9 acquires various information items pertaining to travel of vehicle 1 from vehicle controller 7, and provides notification regarding the acquired information. Information notification device 9 includes information acquisition unit 91 and notification unit 92.

Information acquisition unit 91 acquires various information items pertaining to travel of vehicle 1 from vehicle controller 7. For example, when determining that vehicle controller 7 may update the behavior of vehicle 1, information acquisition unit 91 acquires the information about the first behavior and the second behavior from vehicle controller 7.

Then, information acquisition unit 91 temporarily stores the acquired information in an unillustrated storage unit, and reads the stored information from the storage unit and outputs the read information to notification unit 92 as needed.

Notification unit 92 notifies the driver of the information pertaining to travel of vehicle 1. Notification unit 92 may be a display for displaying information, such as a light emitting element, e.g., a light emitting diode (LED), provided on a car navigation system, a head-up display, a center display, steering wheel 5, or a pillar in the vehicle interior. Notification unit 92 may be a speaker for notifying the driver of information by converting the information into a sound. Notification unit 92 may be a vibrator provided on a position (for example, a seat for the driver, steering wheel 5, and the like) where the driver can sense the vibration. In addition, notification unit 92 may be a combination of these elements.

In the following description, notification unit 92 is described as a notification device.

In this case, notification unit 92 is a head up display (HUD), a liquid crystal display (LCD), a head-mounted display or a helmet-mounted display (HMD), smart glasses, and other exclusive displays. HUD may be a windshield of vehicle 1, or a glass surface or a plastic surface (for example, combiner) separately provided, for example. Further, the windshield may be a front windscreen, or a side windscreen, or a rear windscreen of vehicle 1, for example.

In addition, the HUD may be a transmissive display provided on the surface or the inside of the windshield.

Herein, the transmissive display is a transmissive organic electroluminescence (EL) display or a transparent display using a glass that emits light when being irradiated with light of a specific wavelength. The driver can visually recognize the display on the transmissive display while viewing a background. As described above, notification unit 92 may be a display medium that transmits light. In any case, an image is displayed on notification unit 92.

Notification unit 92 notifies the driver of the information pertaining to travel acquired from vehicle controller 7 through information acquisition unit 91. For example, notification unit 92 notifies the driver of the information about the first behavior and the second behavior acquired from vehicle controller 7.

Hereinafter, a specific display content and an operation performed on operating unit 51 will be described.

FIGS. 2A to 2C are views for describing a first example of a travel environment, a display on notification unit 92 for the first example, and an operation to operating unit 51.

FIG. 2A is an overhead view illustrating the travel environment of vehicle 1. Specifically, FIG. 2A illustrates a travel environment in which there is a merging lane ahead on the lane in which vehicle 1 is traveling, there is a vehicle merging from the left side of the lane, and it is possible to change lanes to the right relative to the lane in which vehicle 1 is traveling.

Vehicle controller 7 determines that the travel environment is the one illustrated in FIG. 2A based on the information about the travel state and the surrounding situation. Note that vehicle controller 7 may generate the overhead view illustrated in FIG. 2A, and may cause notification unit 92 to provide notification regarding the generated overhead view in addition to the information about the first behavior and the second behavior.

FIG. 2B illustrates one example of the display on notification unit 92 in response to the travel environment illustrated in FIG. 2A. In a display range of notification unit 92, options involved with the behavior of vehicle 1 are displayed on the right, and information for switching from autonomous driving to manual driving is displayed on the left.

The first behavior is "lane change" displayed in highlighted display region 29b in display regions 29a to 29c and 29g. The second behavior is "acceleration" and "deceleration" respectively displayed in display regions 29a and 29c. In addition, "end autonomous driving" indicating that the driving mode is switched from autonomous driving to manual driving is displayed in display region 29g.

FIG. 2C illustrates one example of operating unit 51 provided on steering wheel 5. Operating unit 51 includes operation buttons 51a to 51d provided on the right side of steering wheel 5 and operation buttons 51e to 51h provided on the left side of steering wheel 5. Note that the number, shape, and other conditions of operating units 51 provided to steering wheel 5 are not limited to those described above.

In the present exemplary embodiment, display regions 29a to 29c illustrated in FIG. 2B correspond to operation buttons 51a to 51c, respectively, and display region 29g corresponds to operation button 51g.

In this configuration, when selecting any one of contents displayed in each display region, the driver presses the operation button corresponding to each display region. For example, to select the behavior of "acceleration" displayed in display region 29a, the driver presses operation button 51a.

Although only character information is displayed in each display region in FIG. 2B, a symbol or an icon involved with drive of the vehicle may be displayed as described next. According to this configuration, the driver can recognize the display content at a glance.

Figure 3:
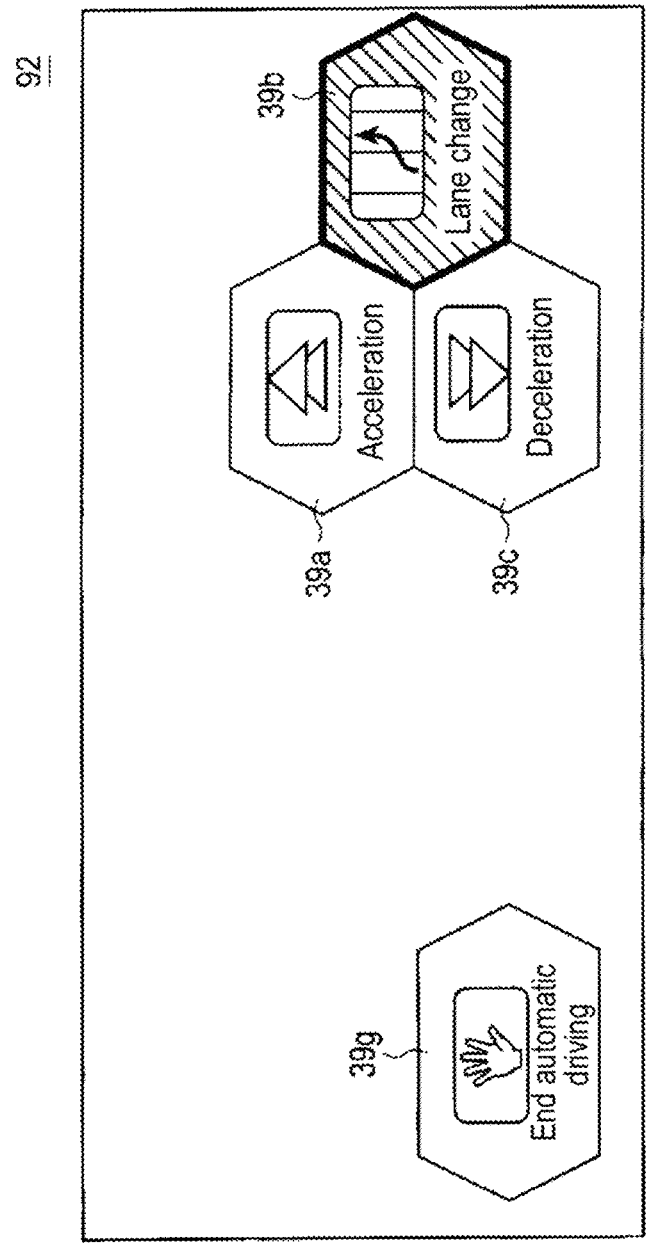
FIG. 3 is a view illustrating another example of a display on the notification unit according to the first exemplary embodiment.

FIG. 3 is a view illustrating another example of a display on notification unit 92. As illustrated in FIG. 3, character information and symbols indicating the information are both displayed in display regions 39a to 39c and 39g. Note that only symbols may be displayed.

Next, a display control flow will be described, using a specific travel environment as one example.

Figure 4:
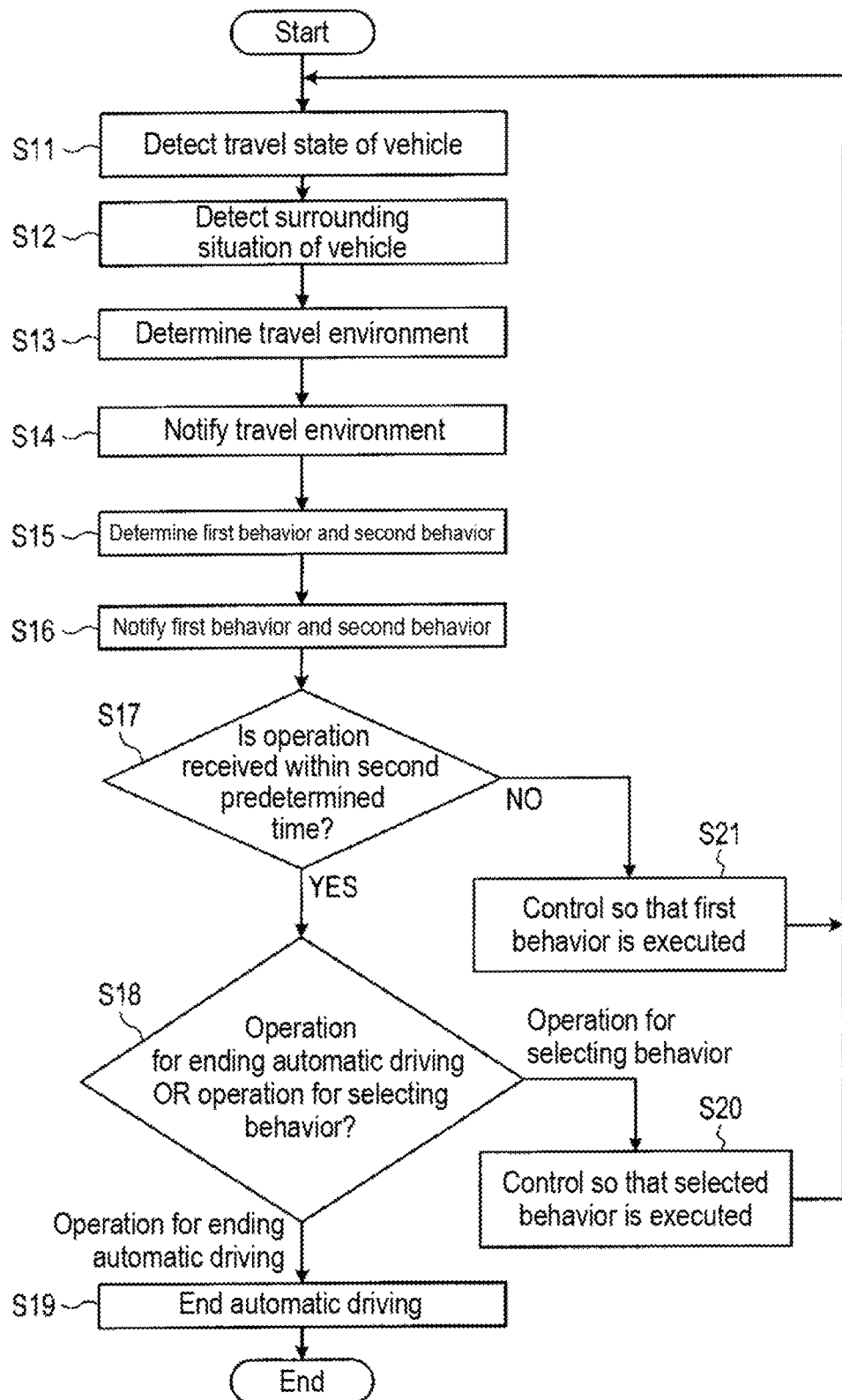
FIG. 4 is a flowchart illustrating a procedure of an information notification process according to the first exemplary embodiment.
Figure 5B:
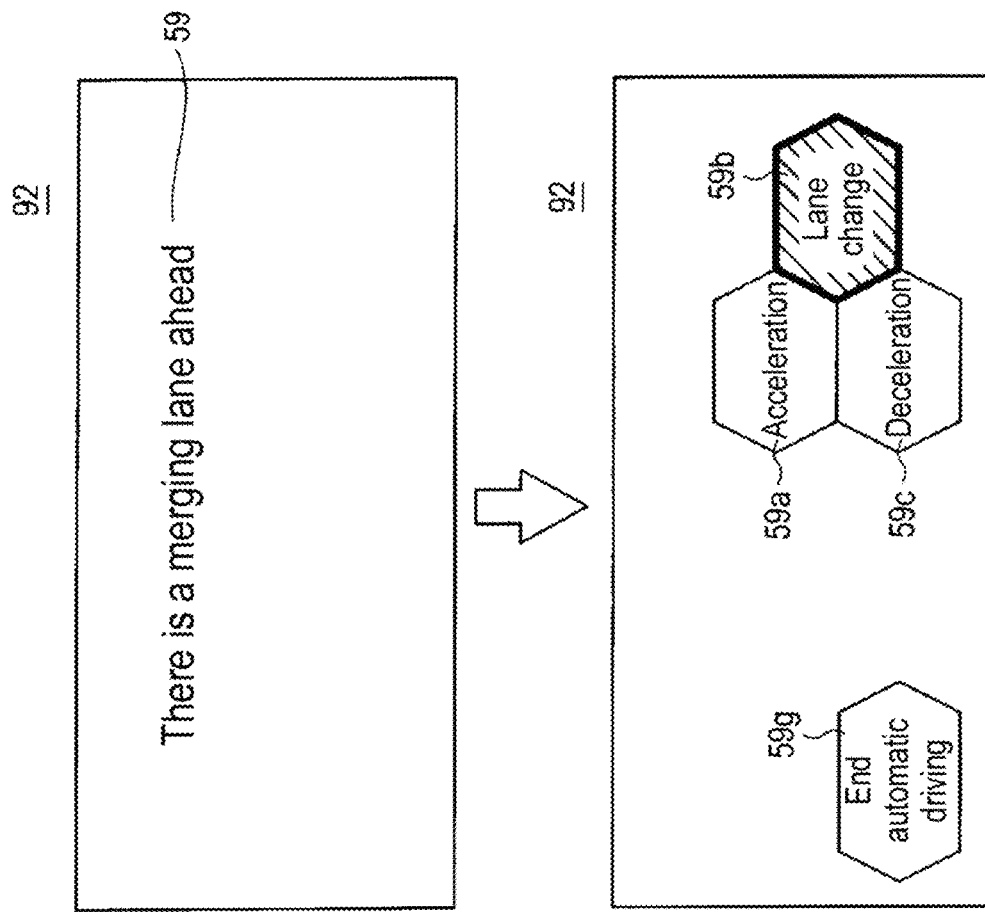
FIG. 5B is a view for describing display control for the first example of a travel environment according to the first exemplary embodiment.
Figure 5A:
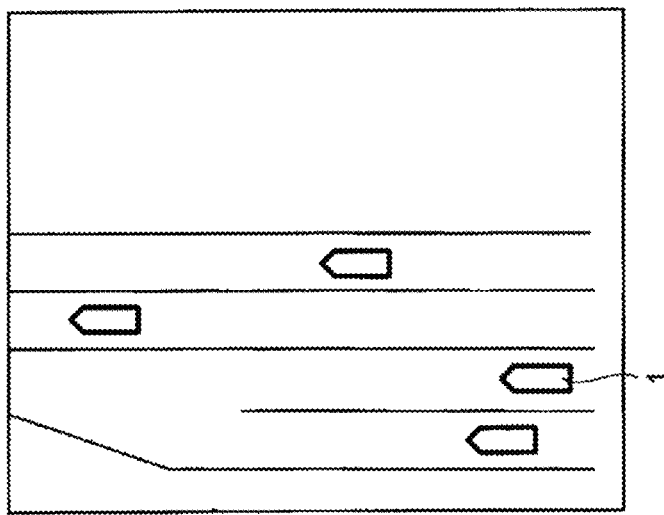
FIG. 5A is a view for describing the first example of a travel environment according to the first exemplary embodiment.

FIG. 4 is a flowchart illustrating a procedure of an information notification process according to the present exemplary embodiment. FIG. 5A is a view illustrating the first example of the travel environment, and FIG. 5B is a view illustrating display control for this environment.

As illustrated in FIG. 4, detector 6 detects the travel state of the vehicle (step S11). Then, detector 6 detects the surrounding situation of the vehicle (step S12). Detector 6 outputs to vehicle controller 7 the information about the travel state of the vehicle and the surrounding situation of the vehicle which have been detected.

Next, vehicle controller 7 determines the travel environment at present based on the information about the travel state and the surrounding situation (step S13). In the example in FIG. 5A, vehicle controller 7 determines the travel environment at present to be "a travel environment in which there is a merging lane ahead on the lane in which vehicle 1 is traveling, there is a vehicle merging from the left side of the lane, and it is possible to change lanes to the right relative to the lane in which vehicle 1 is traveling".

Then, vehicle controller 7 causes notification unit 92 of information notification device 9 to provide notification regarding the information about the determined travel environment (step S14). In the example in FIG. 5B, vehicle controller 7 outputs the information about the determined travel environment to information acquisition unit 91. Notification unit 92 acquires the information about the travel environment from information acquisition unit 91, and displays the acquired information as character information 59. Notably, vehicle controller 7 may cause a speaker or the like to notify the driver, with a voice/sound, of the information about the travel environment, instead of causing notification unit 92 to display the information about the travel environment. Accordingly, the information can reliably be transmitted to the driver, even if the driver does not see or fails to see the display or a monitor.

Next, vehicle controller 7 determines whether or not there is a possibility of updating the behavior for the determined travel environment. When determining that there is a possibility of updating, vehicle controller 7 then determines the first behavior and the second behavior (step S15). Whether or not there is a possibility of updating the behavior for the travel environment is determined based on whether or not the travel environment has been changed. Conceivable behaviors to be executed after the updating include decelerating the vehicle because of a possibility of collision between the vehicle and a nearby vehicle or the like, changing the speed when a leading vehicle disappears in adaptive cruise control (ACC), and changing lanes when the adjacent lane is vacant, for example. Whether or not to perform updating is determined using the conventional technology.

In this case, vehicle controller 7 reads, from storage unit 8, the behavior candidates that can be performed next by vehicle 1 (after a lapse of the first predetermined time) in response to the determined travel environment. Then, vehicle controller 7 determines which is the most suitable for the current travel environment from among the read behavior candidates, and sets the behavior most suitable for the current travel environment as a first behavior. Thereafter, vehicle controller 7 sets the behavior candidates excluding the first behavior as the second behavior.

In the example in FIG. 5B, vehicle controller 7 reads, from storage unit 8, three behavior candidates which are acceleration of vehicle 1, deceleration of vehicle 1, and lane change of vehicle 1 to the right. Then, vehicle controller 7 determines that the lane change of vehicle 1 to the right is the most suitable behavior based on the speed of the vehicle merging from the left and the condition of the right lane of vehicle 1, and sets this behavior as the first behavior. Thereafter, vehicle controller 7 sets the behavior candidates excluding the first behavior as the second behavior.

Next, vehicle controller 7 causes notification unit 92 of information notification device 9 to provide notification regarding the first behavior and the second behavior (step S16). In the example in FIG. 5B, notification unit 92 displays character information of "lane change" which is the information about the first behavior in display region 59b in a highlighted manner, and displays "acceleration" and "deceleration", which are the information about the second behavior, in display regions 59a and 59c, respectively.

Next, vehicle controller 7 determines whether or not operating unit 51 receives an operation from the driver within a second predetermined time (step S17).

For example, vehicle controller 7 sets, as the first predetermined time, the time from when vehicle controller 7 determines that the travel environment at present is the one illustrated in FIG. 5A until vehicle 1 reaches the merging point. Vehicle controller 7 then sets a second predetermined time shorter than the first predetermined time as a time in which the operation for the behavior to be executed next before the merging point can be received.

When operating unit 51 has received the operation from the driver within the second predetermined time (YES in step S17), vehicle controller 7 determines whether the received operation is an operation for ending autonomous driving or a behavior selecting (in other words, updating) operation (step S18).

As described with reference to FIG. 2C, each of the display regions of notification unit 92 corresponds to a corresponding one of the operation buttons of operating unit 51. When selecting "end autonomous driving" in FIG. 5B, the driver presses operation button 51g illustrated in FIG. 2C. When performing behavior selection, the driver presses any one of operation buttons 51a to 51c illustrated in FIG. 2C.

When the operation received by operating unit 51 is an operation for ending autonomous driving (that is, when the depression of operation button 51g is detected), vehicle controller 7 ends autonomous driving (step S19). When the operation received by operating unit 51 is the operation for behavior selection (that is, the depression of any one of operation buttons 51a to 51c is detected), vehicle controller 7 controls vehicle 1 such that vehicle 1 performs the behavior corresponding to the depressed operation button (step S20).

When operating unit 51 has not received any operation performed by the driver within the second predetermined time (NO in step S17), vehicle controller 7 controls vehicle 1 such that vehicle 1 performs the first behavior (step S21).

FIG. 6A is a view illustrating the first example of the travel environment, and FIG. 6B is a view illustrating another display control for this environment. FIG. 6A is similar to FIG. 5A, but the display control in FIG. 6B is different from the display control in FIG. 5B.

As in the case described with reference to FIG. 5B, vehicle controller 7 reads, from storage unit 8, three behavior candidates which are acceleration of vehicle 1, deceleration of vehicle 1, and lane change of vehicle 1 to the right, in response to the travel environment illustrated in FIG. 6A. In this case, it is supposed that storage unit 8 stores the lane change of vehicle 1 to the right as the behavior with the highest priority.

In this case, vehicle controller 7 causes notification unit 92 to provide notification regarding the information about the travel environment and the information about the first behavior. In FIG. 6B, vehicle controller 7 creates character information 69 indicating the information about the travel environment and the information about the first behavior, and causes notification unit 92 to display character information 69.

Then, vehicle controller 7 displays, in display regions 69a and 69c, displays for encouraging the driver to determine whether to use the first behavior. Vehicle controller 7 also displays, in display region 69g, the display of "end autonomous driving" indicating that the driving is switchable from autonomous driving to manual driving.

In this case, vehicle controller 7 displays "YES" corresponding to using the first behavior in a highlighted manner. Which one of "YES" and "NO" is displayed in a highlighted manner may be set in advance, the last selected option may be displayed in a highlighted manner, or storage unit 8 may store the number of times each behavior has been previously selected and notification unit 92 may display the most frequently selected behavior in a highlighted manner.

By learning the previously selected behavior in this way, vehicle controller 7 can appropriately notify the driver of information. In addition, the display to be displayed on notification unit 92 can be less than the display in FIG. 5B, whereby the burden on the driver can be reduced.

FIG. 7A is a view illustrating a second example of the travel environment, and FIG. 7B is a view illustrating display control for this environment. FIG. 7A is an overhead view illustrating the travel environment. The travel environment illustrated in FIG. 7A is similar to those in FIGS. 5A and 6A in that there is a merging lane ahead, but different from those in FIGS. 5A and 6A in that there is a traveling vehicle on the right of vehicle 1. In such a case, vehicle controller 7 determines that it is impossible to change lanes.

When determining that the travel environment of vehicle 1 is the one illustrated in FIG. 7A, vehicle controller 7 causes notification unit 92 to display information about the determined travel environment as character information 79 as illustrated in FIG. 7B.

Further, vehicle controller 7 selects only acceleration of vehicle 1 and deceleration of vehicle 1 from among three behavior candidates read from storage unit 8, which are acceleration of vehicle 1, deceleration of vehicle 1, and lane change of vehicle 1 to the right, because the lane change of vehicle 1 to the right is impossible.

In addition, vehicle controller 7 predicts that vehicle 1 becomes too close to the merging vehicle if vehicle 1 is traveling with the current speed, and determines that the deceleration of vehicle 1 is the most suitable behavior, that is, the first behavior.

In this case, which is the most suitable behavior among the three behavior candidates is determined using a conventional technology for determining the most suitable behavior based on the information about the travel state and the surrounding situation. Alternatively, which is the most suitable behavior may be determined in advance, or vehicle controller 7 may store the information about the last selected behavior in storage unit 8, and determine this behavior as the most suitable behavior. Alternatively, vehicle controller 7 may store in storage unit 8 the number of times each behavior has been previously selected, and determine the most frequently selected behavior as the most suitable behavior.

Thereafter, vehicle controller 7 displays "deceleration" in display region 79c as the first behavior, and displays "acceleration" in display region 79a as the second behavior. Vehicle controller 7 also displays, in display region 79g, the display of "end autonomous driving" indicating that the driving is switched from autonomous driving to manual driving.

With this display control, vehicle controller 7 can notify the driver of the behavior most suitable for the travel environment as the first behavior according to the travel environment.

The information about the first behavior may be disposed on an upper side, the information about the second behavior may be disposed on a lower side, and functions of selecting the first behavior and the second behavior may be assigned to operation buttons 51a and 51c, respectively. Alternatively, the information about the acceleration behavior may be disposed on an upper side, the information about the deceleration behavior may be disposed on a lower side, the information about the behavior of the lane change to the right may be disposed on a right side, the information about the behavior of the lane change to the left may be disposed on a left side, and functions of selecting the acceleration behavior, the deceleration behavior, the behavior of the lane change to the right, and the behavior of the lane change to the left may be assigned to operation buttons 51a, 51c, 51b, and 51d, respectively. Alternatively, these displays may be switchable, and whether priority is placed on action or priority is placed on operation may be displayed separately. In addition, the display size of the first behavior information may be larger, and the display size of the second behavior information may be smaller. It is to be noted that, when behavior information display is arranged corresponding to the behavior in the front-rear direction and left-right direction of the vehicle, the driver is capable of having intuitive recognition and operation.

Next, an example of a travel environment other than the travel environment where there is a merging lane ahead will be described.

Figure 8B:
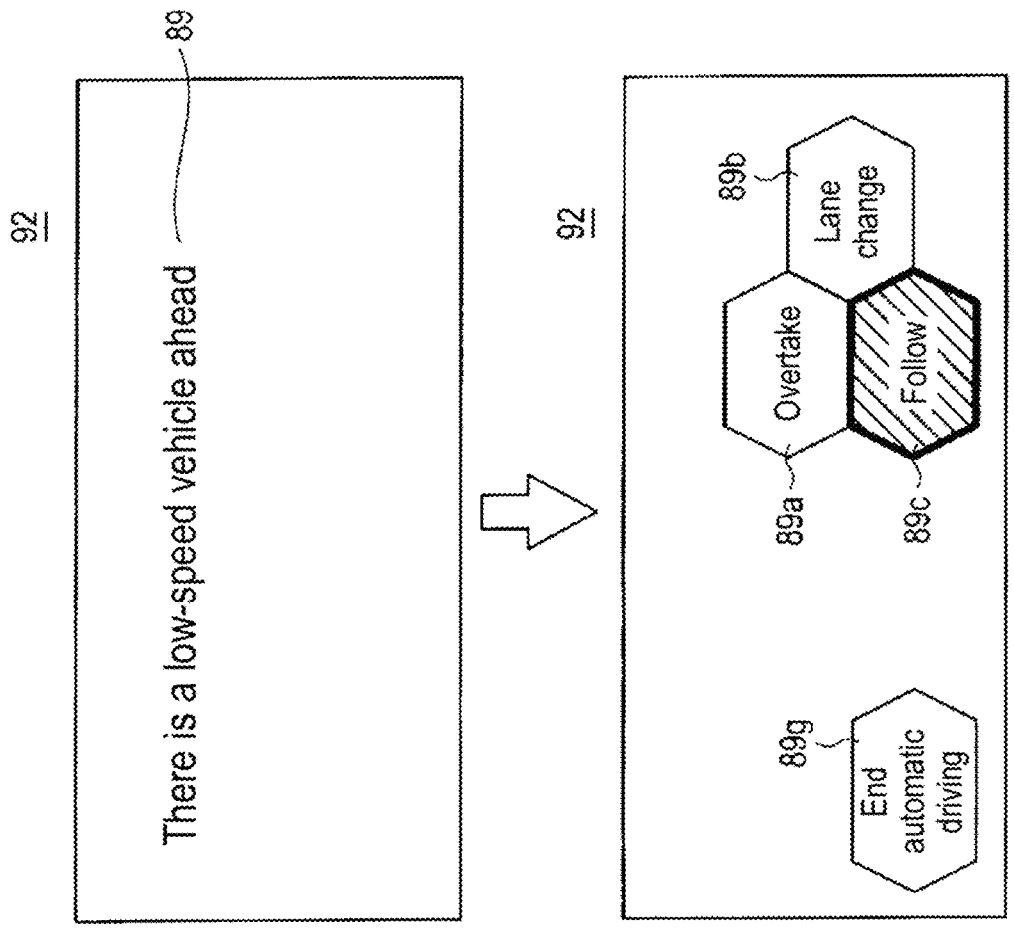
FIG. 8B is a view for describing display control for the third example of a travel environment according to the first exemplary embodiment.
Figure 8A:
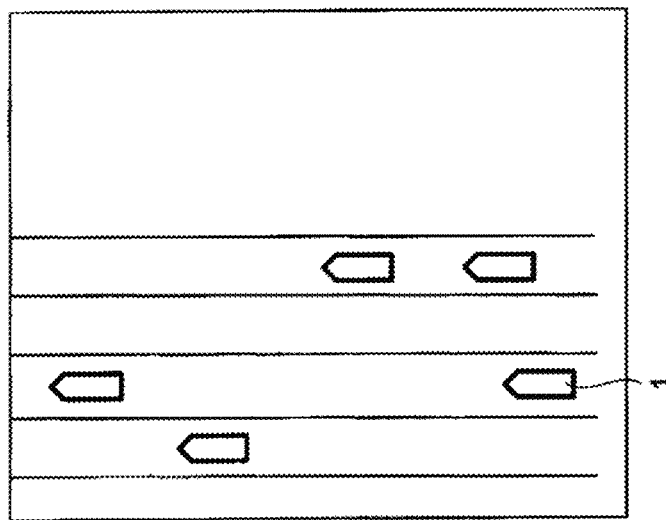
FIG. 8A is a view for describing a third example of a travel environment according to the first exemplary embodiment.

FIG. 8A is a view illustrating a third example of the travel environment, and FIG. 8B is a view illustrating display control for this environment. FIG. 8A is an overhead view illustrating the travel environment of vehicle 1. Specifically, FIG. 8A illustrates the travel environment where a leading vehicle is traveling with a speed lower than the speed of vehicle 1, and a lane change to the adjacent lane is possible.

Vehicle controller 7 determines that the travel environment is the one illustrated in FIG. 8A based on the information about the travel state and the surrounding situation. In this case, vehicle controller 7 causes notification unit 92 to display the information about the determined travel environment as character information 89.

Vehicle controller 7 also reads, as behavior candidates corresponding to the determined travel environment, three behavior candidates which are a travel mode for overtaking the leading vehicle, a travel mode for performing a lane change to the adjacent lane, and a travel mode for decelerating vehicle 1 to follow the leading vehicle, from storage unit 8.

For example, vehicle controller 7 determines that the travel mode for decelerating vehicle 1 to follow the leading vehicle is the most suitable behavior, that is, the first behavior, because the speed of the leading vehicle after deceleration is higher than a predetermined value and is allowable.

In this case, which is the most suitable behavior among the three behavior candidates is determined using a conventional technology for determining the most suitable behavior based on the information about the travel state and the surrounding situation. Alternatively, which is the most suitable behavior may be determined in advance, or vehicle controller 7 may store the information about the last selected behavior in storage unit 8, and determine this behavior as the most suitable behavior. Alternatively, vehicle controller 7 may store in storage unit 8 the number of times each behavior has been previously selected, and determine the most frequently selected behavior as the most suitable behavior.

Vehicle controller 7 also displays character information of "follow" indicating the first behavior in display region 89c in a highlighted manner, and character information items of "overtake" and "lane change" indicating the second behavior in display regions 89a and 89b, respectively, as illustrated in FIG. 8B. Vehicle controller 7 also displays, in display region 89g, the display of "end autonomous driving" indicating that the driving is switched from autonomous driving to manual driving.

The information about the first behavior may be disposed on an upper side, the information about the second behavior may be disposed on a lower side, and functions of selecting the first behavior and the second behavior may be assigned to operation buttons 51a and 51c, respectively. Alternatively, the information about the overtaking behavior may be disposed on an upper side, the information about the following behavior may be disposed on a lower side, the information about the behavior of the lane change to the right may be disposed on a right side, the information about the behavior of the lane change to the left may be disposed on a left side, and functions of selecting the overtaking behavior, the following behavior, the behavior of the lane change to the right, and the behavior of the lane change to the left may be assigned to operation buttons 51a, 51c, 51b, and 51d, respectively. Alternatively, these displays may be switchable, and whether priority is placed on action or priority is placed on operation may be displayed separately. In addition, the display size of the first behavior information may be larger, and the display size of the second behavior information may be smaller.

FIG. 9A is a view illustrating a fourth example of the travel environment, and FIG. 9B is a view illustrating display control for this environment. FIG. 9A is an overhead view illustrating the travel environment of vehicle 1. Specifically, FIG. 9A illustrates the travel environment where the lane in which vehicle 1 is traveling ends ahead.

Vehicle controller 7 determines that the travel environment is the one illustrated in FIG. 9A based on the information about the travel state and the surrounding situation. In this case, vehicle controller 7 causes notification unit 92 to display the information about the determined travel environment as character information 99.

Vehicle controller 7 also reads, as behavior candidates corresponding to the determined travel environment, two behavior candidates which are a travel mode for performing a lane change to the adjacent lane, and a travel mode for keeping traveling in the current lane, from storage unit 8.

For example, vehicle controller 7 determines that the travel mode for performing a lane change to the adjacent lane is the most suitable behavior, that is, the first behavior, because TTC to the point where the lane ends is shorter than a predetermined value.

In this case, which is the most suitable behavior between the two behavior candidates is determined using a conventional technology for determining the most suitable behavior based on the information about the travel state and the surrounding situation. Alternatively, which is the most suitable behavior may be determined in advance, or vehicle controller 7 may store the information about the last selected behavior in storage unit 8, and determine this behavior as the most suitable behavior. Alternatively, vehicle controller 7 may store in storage unit 8 the number of times each behavior has been previously selected, and determine the most frequently selected behavior as the most suitable behavior.

Vehicle controller 7 also displays character information of "lane change" indicating the first behavior in display region 99b in a highlighted manner, and character information of "keep" indicating the second behavior in display region 99c, as illustrated in FIG. 9B. Vehicle controller 7 also displays, in display region 99g, the display of "end autonomous driving" indicating that the driving is switched from autonomous driving to manual driving.

The information about the first behavior may be disposed on an upper side, the information about the second behavior may be disposed on a lower side, and functions of selecting the first behavior and the second behavior may be assigned to operation buttons 51a and 51c, respectively; information about a behavior of doing nothing may be disposed on a lower side, the information about the behavior of lane change to the right may be disposed on a right side, the information about the behavior of lane change to the left may be disposed on a left side, and functions of selecting the behavior of doing nothing, the behavior of lane change to the right, and the behavior of lane change to the left may be assigned to operation buttons 51c, 51b, and 51d, respectively; or these displays may be switchable, and whether priority is placed on action or priority is placed on operation may be displayed separately. In addition, the display size of the first behavior information may be larger, and the display size of the second behavior information may be smaller. Notably, due to the configuration in which a different function is assigned to each display region depending on a different travel environment as illustrated in FIGS. 7B, 8B, and 9B, notification of information or operation is enabled with fewer regions.

It has been described above that vehicle controller 7 causes notification unit 92 to provide notification regarding a behavior according to the information about the travel environment and surrounding situation. However, the present invention is not limited thereto. For example, it may be configured such that vehicle controller 7 causes notification unit 92 to provide notification regarding a behavior when the driver performs a predetermined operation.

FIG. 10A is a view illustrating a fifth example of the travel environment, and FIG. 10B is a view illustrating display control for this environment. FIG. 10A is an overhead view illustrating the travel environment of vehicle 1. Specifically, FIG. 10A illustrates the travel environment where vehicle 1 can change lanes to the left and right.

FIG. 10A illustrates the travel environment where, different from the travel environments illustrated in FIGS. 5A to 9A, vehicle 1 can travel in a normal way without requiring a lane change or acceleration and deceleration of the vehicle.

In this case, vehicle controller 7 may cause notification unit 92 not to display the information about the travel environment as character information as indicated by display 109 in FIG. 10B.

When the driver depresses any of the operation buttons on operating unit 51 under the above-described condition where character information is not displayed on notification unit 92, vehicle controller 7 reads the behavior candidates in a normal travel from storage unit 8.

Specifically, storage unit 8 stores four behavior candidates which are acceleration of vehicle 1, deceleration of vehicle 1, lane change of vehicle 1 to the right, and lane change of vehicle 1 to the left, in association with the travel environment of normal travel as illustrated in FIG. 10A. Vehicle controller 7 reads these behavior candidates, and causes notification unit 92 to display these behavior candidates in display regions 109a to 109d, respectively.

In addition, vehicle controller 7 displays the display of "end autonomous driving" indicating that the driving is switched from autonomous driving to manual driving in display region 109g, and a display of "cancel" indicating that updating of the behavior is canceled in display region 109e in a highlighted manner.

The present exemplary embodiment described above can effectively notify the driver of the behavior candidates to be executed next, thereby enabling the driver to select more preferable behavior.

Note that the driver may directly perform a manual operation on the steering wheel or the like, instead of selecting the behavior he/she desires to do. Thus, the driver can quickly switch to a manual driving operation according to his/her intention.

In the present exemplary embodiment described above, character information is displayed on notification unit 92. However, the present invention is not limited thereto. For example, information may be displayed using a symbol indicating the behavior for enabling the driver to visually recognize the information. Hereinafter, a display using a symbol for enabling the driver to visually recognize information will be described, using the displays in FIGS. 5B and 7B as one example.

Figure 11:
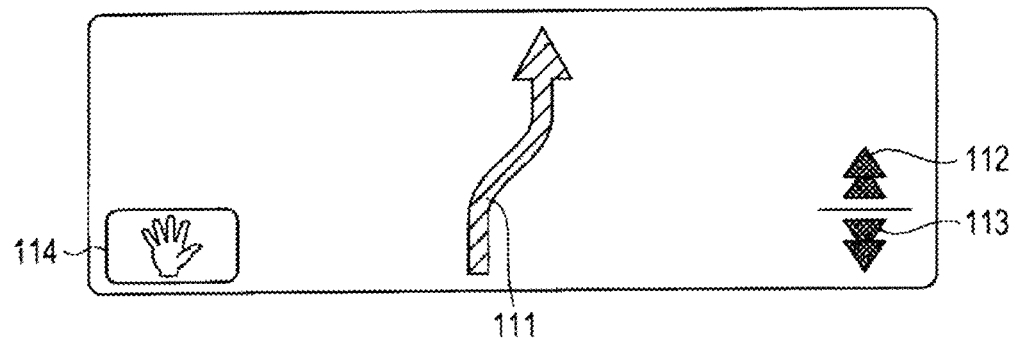
FIG. 11 is a view for describing another display control for the first example of a travel environment illustrated in FIG. 5A.

FIG. 11 is a view for describing another display control for the first example of the travel environment illustrated in FIG. 5A. In this example, the above-described first behavior is a lane change of vehicle 1 to the right, and the second behavior is acceleration of vehicle 1 and deceleration of vehicle 1.

In this case, symbol 111 indicating "lane change" which is the first behavior is displayed bigger on the center, and symbol 112 indicating "acceleration of vehicle 1" and symbol 113 indicating "deceleration of vehicle 1" which are the second behavior are displayed smaller on the right. In addition, symbol 114 indicating ending of autonomous driving is displayed smaller on the left.

If an instruction for changing the behavior of vehicle 1 is not received from the driver, the lane change is performed.

Figure 12A:
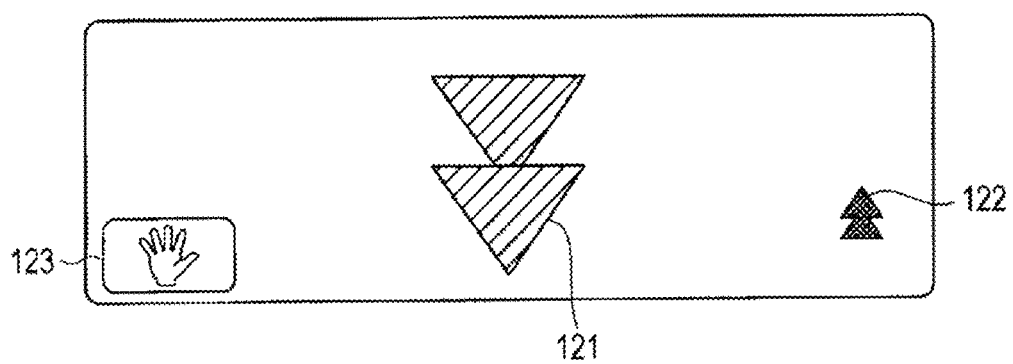
FIG. 12A is a view for describing another display control for the second example of a travel environment illustrated in FIG. 7A.
Figure 12B:
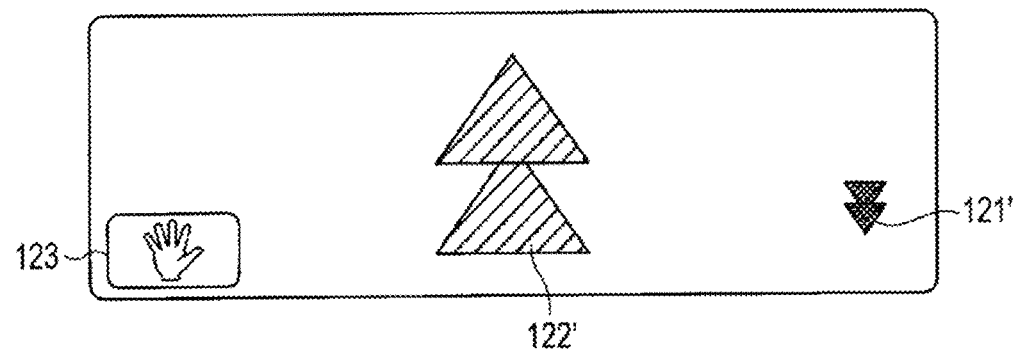
FIG. 12B is a view for describing another display control for the second example of a travel environment illustrated in FIG. 7A.

FIGS. 12A and 12B are views for describing another display control for the second example of the travel environment illustrated in FIG. 7A. In this example, different from the first example, a lane change is impossible because a nearby vehicle is traveling on the right of vehicle 1. Therefore, "deceleration of vehicle 1" is set as the first behavior, and "acceleration of vehicle 1" is set as the second behavior, for example.

In this case, as illustrated in FIG. 12A, symbol 121 indicating "deceleration of vehicle 1" which is the first behavior is displayed bigger on the center, and symbol 122 indicating "acceleration of vehicle 1" which is the second behavior is displayed smaller on the right. In addition, symbol 123 indicating ending of autonomous driving is displayed smaller on the left.

It is supposed here that operating unit 51 receives an operation for selecting "acceleration of vehicle 1" from the driver. In this case, as illustrated in FIG. 12B, symbol 122' indicating "acceleration of vehicle 1" which is the first behavior is displayed bigger on the center, and symbol 121' indicating "deceleration of vehicle 1" which is the second behavior is displayed smaller on the right.

The present exemplary embodiment described above can effectively notify the driver of the behavior candidates to be executed next, thereby enabling the driver to select more preferable behavior. On the other hand, the driver can recognize the behaviors to be executed by vehicle 1 or other selectable behaviors, thereby being capable of continuing autonomous driving with a sense of security. Alternatively, the driver can smoothly issue an instruction to the vehicle.

In addition, according to the present exemplary embodiment, the options notified by the notification unit, that is, the second behavior, can be variable according to the travel environment.

Second Exemplary Embodiment

The first exemplary embodiment has described the configuration in which an operation according to the display on notification unit 92 is performed using operating unit 51 provided on steering wheel 5. The present exemplary embodiment describes a configuration in which a touch panel is provided in place of operating unit 51 provided on steering wheel 5.

Figure 13:
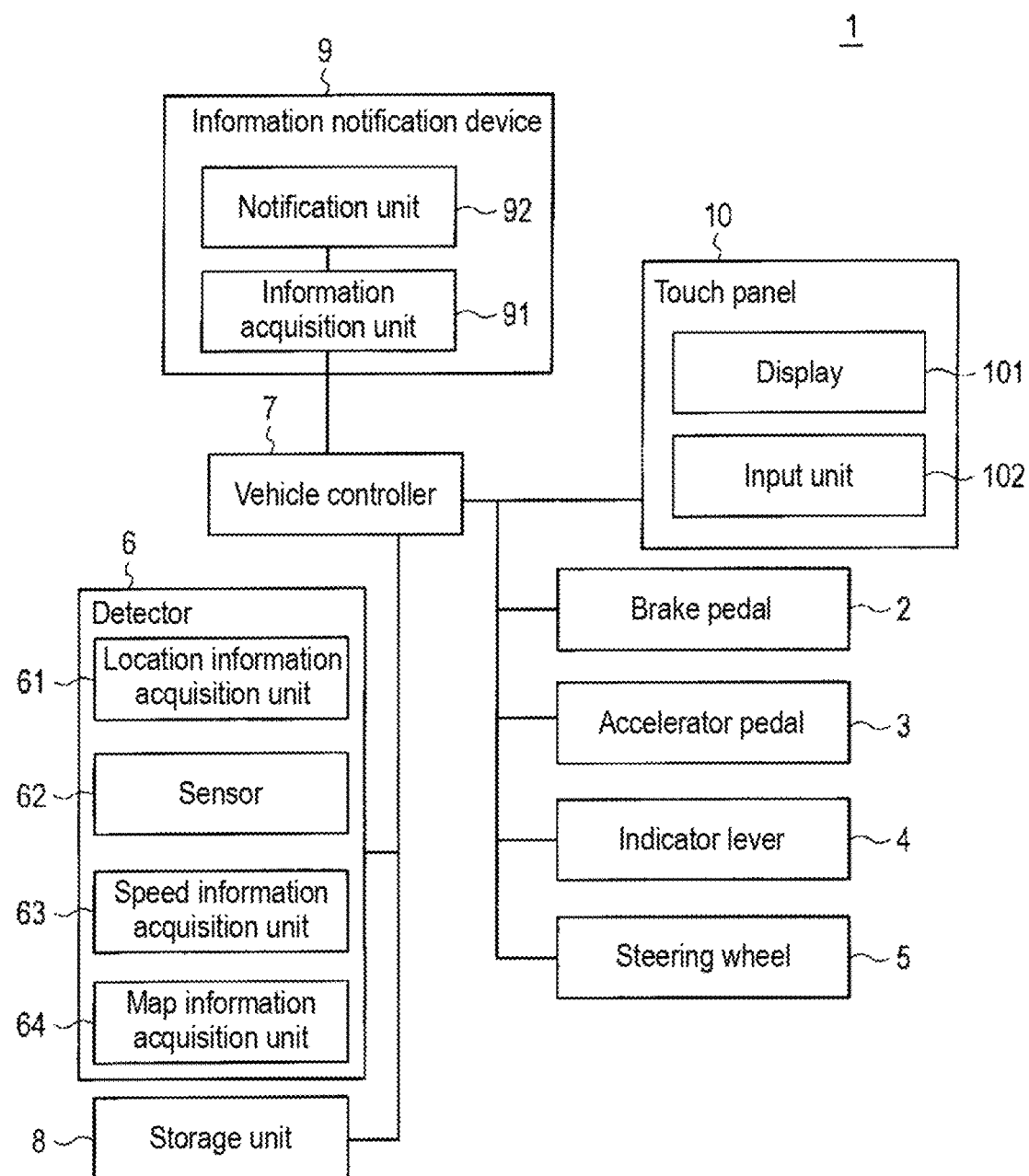
FIG. 13 is a block diagram illustrating a configuration of a main part of a vehicle including an information notification device according to a second exemplary embodiment of the present invention.

FIG. 13 is a block diagram illustrating a configuration of a main part of vehicle 1 including an information notification device according to the second exemplary embodiment of the present invention. It should be noted that constituent elements in FIG. 13 which are substantially identical to the constituent elements in FIG. 1 are denoted by the identical reference numerals used in FIG. 1 and will not be described in detail. Vehicle 1 illustrated in FIG. 13 is provided with touch panel 10 in place of operating unit 51 on steering wheel 5.

Touch panel 10 is a device including a liquid crystal panel or the like and capable of displaying and inputting information, and is connected to vehicle controller 7. Touch panel 10 includes display 101 that displays information based on control by vehicle controller 7, and input unit 102 that receives an operation from a driver or the like and outputs the received operation to vehicle controller 7.

Next, display control for touch panel 10 will be described. Herein, the display control will be described for the case where vehicle 1 is traveling on the center lane of three lanes, and vehicle 1 is capable of changing the lane to the right lane or the left lane.

Figure 14A:
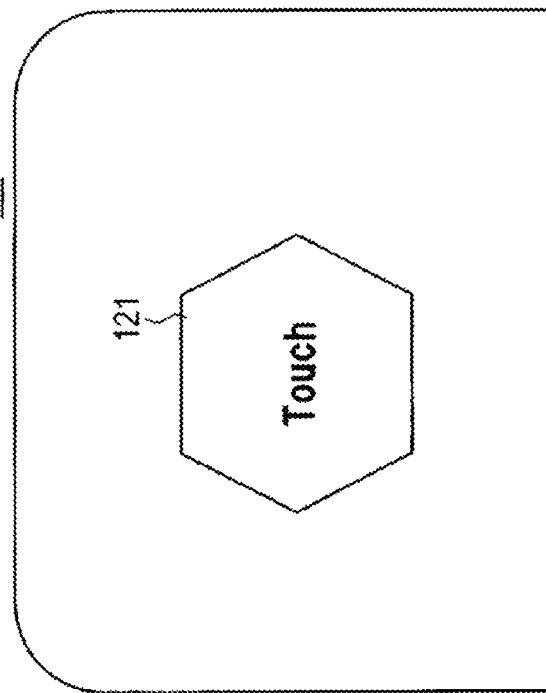
FIG. 14A is a view for describing a display on a touch panel according to the second exemplary embodiment.
Figure 14B:
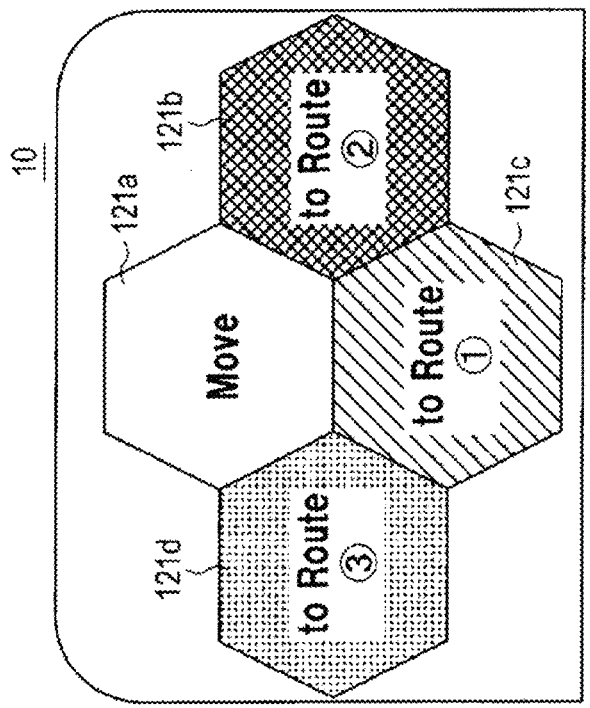
FIG. 14B is a view for describing a display on the touch panel according to the second exemplary embodiment.
Figure 14C:
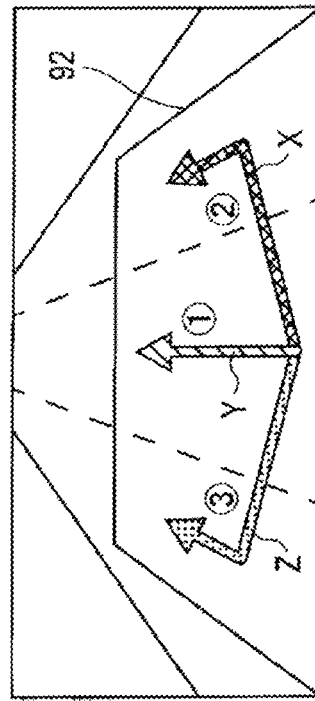
FIG. 14C is a view for describing a display on the touch panel according to the second exemplary embodiment.

FIGS. 14A to 14C are views for describing the display on touch panel 10 according to the second exemplary embodiment. FIG. 14A illustrates an initial display on display 101 of touch panel 10. When determining that vehicle 1 is capable of changing the lane to the right lane or the left lane, vehicle controller 7 causes display 101 of touch panel 10 to execute the display illustrated in FIG. 14A. Herein, the display of "Touch" in display region 121 indicates that touch panel 10 is in a mode where a touch operation performed by the driver is acceptable.

When the driver performs the touch operation for touching display region 121 with the display illustrated in FIG. 14A being displayed therein, input unit 102 receives this operation, and outputs to vehicle controller 7 information indicating that this operation is performed. When receiving this information, vehicle controller 7 causes display 101 to display the display illustrated in FIG. 14B, and causes notification unit 92 to display the display illustrated in FIG. 14C.

In FIG. 14B, display region 121a having therein a display of "Move" which is an operation for instructing vehicle 1 to move is illustrated. In addition, display regions 121b to 121d indicating that it is possible for vehicle 1 to travel in each of three lanes are illustrated in FIG. 14B. Note that display regions 121b to 121d respectively correspond to traveling in lanes indicated by arrows X, Y, and Z in FIG. 14C.

In addition, each display region in FIG. 14B and the corresponding arrow in FIG. 14C have the same manner (for example, color, arrangement, and the like). This makes the display easy to be understood by the driver.

In addition, the lanes indicated by arrows X, Y, and Z may be displayed by varying thickness or the like such that the behavior to be executed by the vehicle determined by the vehicle controller and other behaviors selectable by the driver can be distinguished.

The driver touches the display region corresponding to the lane he/she wishes to travel, from among display regions 121b to 121d, to select the behavior of vehicle 1. In this case, input unit 102 receives the behavior selecting operation performed by the driver, and outputs information about the selected behavior to vehicle controller 7. Then, vehicle controller 7 controls vehicle 1 such that vehicle 1 executes the selected behavior. Thus, vehicle 1 travels in the lane the driver wishes to travel.

It is to be noted that the driver may swipe touch panel 10 instead of touching touch panel 10. For example, when the driver wishes to change the lane to the lane indicated by arrow X in FIG. 14C in the example in FIG. 14C, the driver swipes right on touch panel 10.

In this case, input unit 102 receives the swipe operation, and outputs the information indicating the swipe operation content to vehicle controller 7. Then, vehicle controller 7 controls vehicle 1 such that vehicle 1 executes the selected behavior of changing the lane to the lane indicated by arrow X.

In addition, when display region 121a displaying "Move" which indicates the operation for instructing vehicle 1 to move is displayed, the driver may utter "behavior selection" in a voice. Thus, the driver can operate by seeing only the display on the HUD without seeing the touch panel at his/her hand.

In addition, when the driver performs the touch operation or swipe operation, the display manner of the lane corresponding to the selected display region of the touch panel may be changed such that the driver can confirm which lane he/she is about to select before the selection. For example, the moment the driver touches display region 121b, the thickness of lane X may be enlarged, and if the driver immediately releases his/her hand, lane X may not be selected and the thickness of lane X may be returned to the original size; and the moment the driver then touches display region 121c, the thickness of lane Y may be enlarged, and if the driver keeps this state for a while, lane Y may be selected and may flicker to indicate that lane Y is determined. According to this configuration, the driver can perform the selecting operation or determining operation without viewing his/her hands.

Notably, as in the first exemplary embodiment, vehicle control functions such as acceleration, deceleration, overtake, and keep may be assigned to display regions according to the travel environment.

According to the present exemplary embodiment described above, the driver can perform an intuitive operation due to the touch panel being provided in place of the operating unit. Furthermore, because the number, shape, color, and the like of display regions in the touch panel receiving an operation can freely be changed, the flexibility of a user interface is improved.

Third Exemplary Embodiment

The first exemplary embodiment has described the case where the first behavior and the second behavior are simultaneously displayed. The present exemplary embodiment describes a configuration in which a first behavior is displayed first on notification unit 92, and when a driver's operation is received, a second behavior is displayed.

The configuration of the present exemplary embodiment is achieved such that a grip sensor for detecting whether or not the driver holds steering wheel 5 is further included in operating unit 51 in the configuration, illustrated in FIG. 1, described in the first exemplary embodiment.

FIGS. 15A to 15D are each a view for describing a display on notification unit 92 according to the third exemplary embodiment of the present invention. FIGS. 15A to 15D each illustrate an example of a display in a travel environment, similar to that illustrated in FIG. 8A, where a vehicle traveling ahead of vehicle 1 in the same lane is traveling with a speed lower than the speed of vehicle 1, and a lane change to the adjacent lane is possible.

Figure 15A:
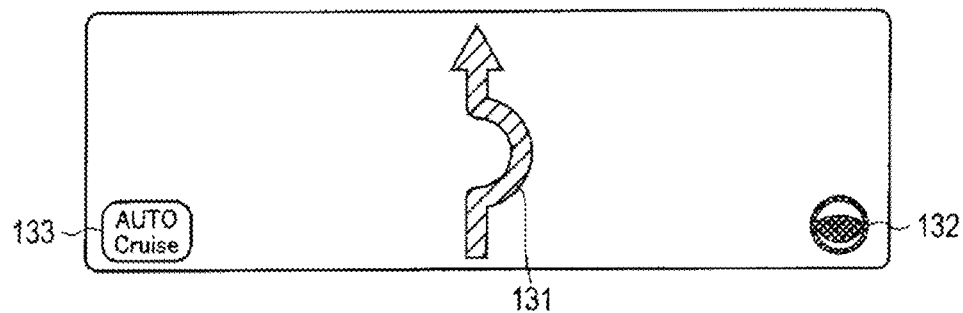
FIG. 15A is a view for describing a display on a notification unit according to a third exemplary embodiment of the present invention.

When determining that the travel environment is the one illustrated in FIG. 8A, vehicle controller 7 firstly causes notification unit 92 to execute the display illustrated in FIG. 15A.

In FIG. 15A, symbol 131 indicating "overtake" which is the first behavior among behavior candidates to be executed after a lapse of a first predetermined time is illustrated in a first manner (for example, in a first color).

When a second predetermined time has elapsed after vehicle controller 7 causes notification unit 92 to execute the display illustrated in FIG. 15A, vehicle controller 7 causes notification unit 92 to display symbol 131 in a second manner different from the first manner (for example, in a second color different from the first color) from the first manner. Herein, the second predetermined time is similar to the second predetermined time described in the first exemplary embodiment.

Specifically, while symbol 131 is displayed in the first manner, the driver is able to select the second behavior, but when symbol 131 is changed to the second manner, it becomes impossible for the driver to select the second behavior.

FIG. 15A also illustrates steering-wheel-shaped symbol 132 indicating that the second behavior is selectable.

As the driver holds steering wheel 5 while symbol 132 is displayed, the second behavior is displayed. Symbol 132 is a display indicating that the second behavior is selectable. However, such configuration may be applied that the driver is notified of the second behavior being selectable by symbol 131 being displayed in the first manner. In this case, symbol 132 may not be displayed.

FIG. 15A also illustrates symbol 133 indicating that vehicle 1 is now in an autonomous driving mode. Symbol 133 is an auxiliary display notifying the driver that vehicle 1 is now traveling in the autonomous driving mode. However, symbol 133 may not be displayed.

When the driver holds steering wheel 5 in response to the display in FIG. 15A, the grip sensor detects the holding, and outputs information about the detection result to vehicle controller 7. In this case, vehicle controller 7 causes notification unit 92 to execute the display illustrated in FIG. 15B.

Figure 15B:
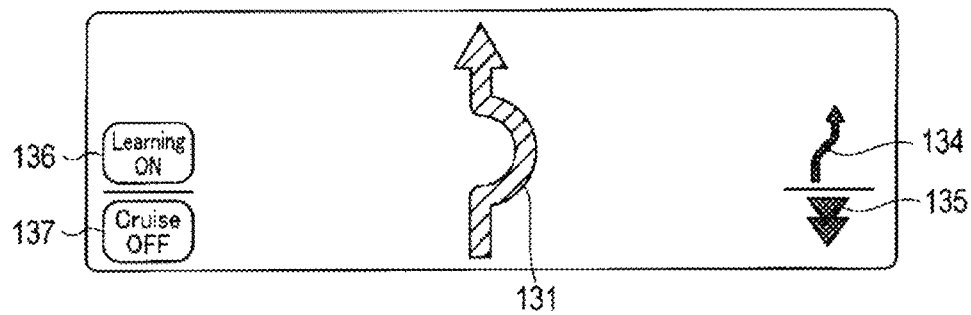
FIG. 15B is a view for describing a display on the notification unit according to the third exemplary embodiment.

In FIG. 15B, symbol 131 indicating "overtake" which is the first behavior is illustrated in the first manner (for example, in the first color) as in FIG. 15A. In addition, symbol 134 indicating "lane change" which is the second behavior and symbol 135 indicating "deceleration" which is the second behavior are also illustrated.

The driver performs changing from the first behavior to the second behavior by operating unit 51 on steering wheel 5. For example, the driver updates the behavior to "lane change" (symbol 134) or "deceleration" (symbol 135) by pressing operation button 51a or operation button 51c (see FIG. 2C) on operating unit 51.

Further, symbol 136 indicating that vehicle controller 7 is learning the behavior of vehicle 1 is illustrated in FIG. 15B. While symbol 136 is displayed, vehicle controller 7 learns the behavior selected by the driver. Symbol 136 may not be displayed. Further, the learning may always be conducted.

Specifically, vehicle controller 7 stores the behavior selected by the driver into storage unit 8, and when vehicle 1 encounters again the similar travel environment, vehicle controller 7 causes notification unit 92 to display the stored behavior as the first behavior. Alternatively, vehicle controller 7 may store, in storage unit 8, the number of times each behavior has been previously selected, and cause notification unit 92 to display the most frequently selected behavior as the first behavior.

In FIG. 15B, symbol 137 indicating that vehicle 1 is not in the autonomous driving mode is also illustrated. When symbol 137 is displayed, vehicle controller 7 waits until the behavior to be executed after a lapse of the first predetermined time is selected by the driver.

Figure 15C:
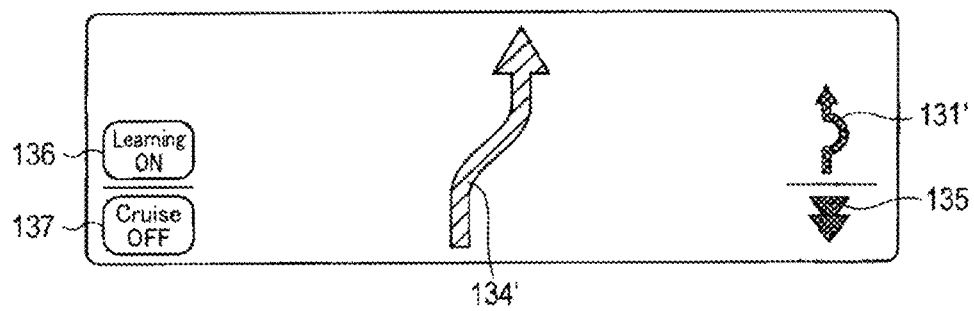
FIG. 15C is a view for describing a display on the notification unit according to the third exemplary embodiment.

When the driver presses operation button 51a on operating unit 51 in response to the display illustrated in FIG. 15B to select "lane change", vehicle controller 7 receives the information about the selecting operation, and causes notification unit 92 to execute the display illustrated in FIG. 15C.

In FIG. 15C, symbol 134' indicating "lane change" is illustrated in the first manner. When receiving the information about the operation for selecting "lane change", vehicle controller 7 determines that the selected behavior is the behavior that is to be executed next, and causes notification unit 92 to display symbol 134' indicating "lane change" in the first manner.

Further, symbol 131 which has been displayed as the first behavior in FIG. 15B is switched to symbol 134, and displayed as symbol 131' in FIG. 15C.

When the driver presses twice in succession any one of the operation buttons in response to the display illustrated in FIG. 15C, the selecting operation previously conducted by the driver may be canceled. In this case, vehicle controller 7 receives the information about the operation for pressing any one of the operation buttons twice in succession, and causes notification unit 92 to execute changing from the display illustrated in FIG. 15C to the display illustrated in FIG. 15B.

In a period from the time when vehicle controller 7 causes notification unit 92 to execute the display illustrated in FIG. 15A before the second predetermined time has elapsed, vehicle controller 7 changes the display on notification unit 92 to the display illustrated in FIG. 15B and the display illustrated in FIG. 15C based on the operation performed by the driver. Then, vehicle controller 7 causes notification unit 92 to execute the display illustrated in FIG. 15D when the second predetermined time has elapsed after vehicle controller 7 causes notification unit 92 to execute the display illustrated in FIG. 15A.

Figure 15D:
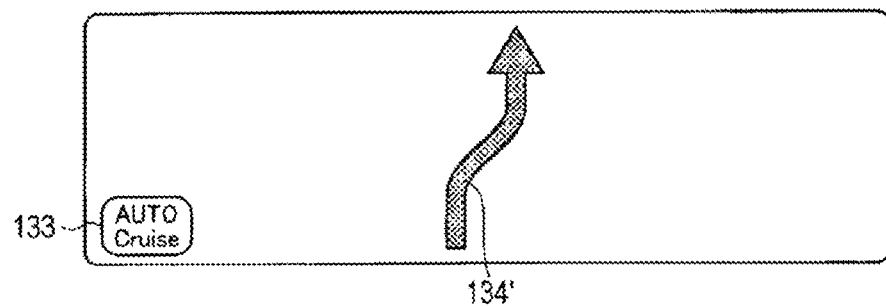
FIG. 15D is a view for describing a display on the notification unit according to the third exemplary embodiment.

Notably, when acquiring the information indicating that the driver releases his/her hand from steering wheel 5 from the grip sensor, vehicle controller 7 may cause notification unit 92 to display the display illustrated in FIG. 15D before the second predetermined time has elapsed.

In this case, FIG. 15D illustrates the state where symbol 134' indicating "lane change" selected by the driver as the next behavior is displayed in the second manner, and symbol 133 indicating that vehicle 1 is traveling in the autonomous driving mode is displayed again.

According to the present exemplary embodiment described above, vehicle controller 7 changes the display on notification unit 92 such that the driver can confirm the other behavior candidates, only when the driver intends to update the behavior to be executed next. According to this configuration, the display visually confirmed by the driver can be reduced, whereby the burden on the driver can be reduced.

Fourth Exemplary Embodiment

The above-mentioned exemplary embodiments have described some of the methods for determining which is the most suitable behavior from among a plurality of behavior candidates executable by vehicle 1. The present exemplary embodiment describes a case where a driver model constructed in advance by learning is used as the method for determining the most suitable behavior.

The method for constructing the driver model will now be described. The driver model is constructed in such a way that the tendency of an operation performed by a driver for each travel environment is modeled based on information relating to the frequency of each operation. Travel histories of a plurality of drivers are aggregated, and the driver model is constructed from the aggregated travel histories.

The travel history of each driver is formed such that the frequency of a behavior actually selected by the driver from among behavior candidates corresponding to each travel environment is aggregated for each behavior candidate, for example.

FIG. 16 is a diagram illustrating one example of the travel history. FIG. 16 illustrates that driver x selects the behavior candidate of "deceleration" three times, "acceleration" once, and "lane change" five times, in a travel environment of "approaching to a merging lane". FIG. 16 also illustrates that driver x selects the behavior candidate of "follow" twice, "overtake" twice, and "lane change" once, in a travel environment where "there is a low-speed vehicle ahead". The same is applied to driver y.

The travel history of the driver may be formed by aggregating the behaviors selected during autonomous driving, or by aggregating the behaviors actually executed by the driver during manual driving. Thus, a travel history according to a driving state, i.e., autonomous driving or manual driving, can be collected.

The driver model is classified into a clustering type constructed by clustering travel histories of a plurality of drivers, and an individually-adapted type in which a driver model of a specific driver (for example, driver x) is constructed from a plurality of travel histories similar to the travel history of driver x.

Firstly, the clustering type will be described. The clustering-type driver model is constructed in such a way that travel histories of a plurality of drivers illustrated in FIG. 16 are aggregated in advance. Then, a plurality of drivers having a high degree of similarity between the travel histories, that is, a plurality of drivers having a similar driving operation tendency, is grouped to construct a driver model.

FIG. 17 is a diagram illustrating a method for constructing the clustering-type driver model. FIG. 17 illustrates the travel histories of drivers a to f in tabular form. FIG. 17 illustrates that, from the travel histories of drivers a to f, model A is constructed based on the travel histories of drivers a to c, and model B is constructed based on the travel histories of drivers d to f.

The degree of similarity between travel histories may be obtained such that: for example, frequencies (numerical values) in the travel histories of driver a and driver b are treated as frequency distributions; a correlation value in the respective frequency distributions is calculated; and the calculated correlation value is set as the degree of similarity. In this case, when the correlation value calculated from the travel histories of driver a and driver b is higher than a predetermined value, the travel histories of driver a and driver b are grouped into a single group.

Note that the calculation of the degree of similarity is not limited thereto. For example, the degree of similarity may be calculated based on the same number of the behavior having the highest frequency in the travel history of driver a and the travel history of driver b.

Then, the clustering-type driver model is constructed by calculating the average of the frequencies in the travel histories of the drivers in each group, for example.

FIG. 18 is a diagram illustrating one example of the constructed clustering-type driver model. The average frequency of the travel history in each group is derived by calculating the average of the frequencies in the travel histories of the drivers in each group illustrated in FIG. 17. In this way, the clustering-type driver model is constructed using the average frequency for the behavior determined for each travel environment.

It is to be noted that the driver model may be constructed using only the behavior having the highest frequency from among the calculated average frequencies. FIG. 19 is a diagram illustrating another example of the constructed clustering-type driver model. As illustrated in FIG. 19, the most frequent behavior is selected for each travel environment, and the driver model is constructed using the selected behavior.

Now, a method for using the constructed clustering-type driver model will be described with examples.

The driver model illustrated in FIG. 18 is stored in advance in storage unit 8 of vehicle 1. In addition, vehicle controller 7 stores, in storage unit 8, the travel history of driver y in previous driving. Notably, driver y is detected by a camera or the like (not illustrated) installed in the vehicle interior.

Then, vehicle controller 7 calculates the degree of similarity between the travel history of driver y and the travel history of each model in the driver model to determine which model is the most suitable for driver y. For example, regarding the travel history of driver y illustrated in FIG. 16 and the driver model illustrated in FIG. 18, vehicle controller 7 determines that model B is the most suitable for driver y.

Vehicle controller 7 determines that, in actual autonomous travel, the behavior having the highest frequency is the behavior most suitable for driver y, that is, the first behavior, in each travel environment in model B.

In this way, the notification regarding the behavior more suitable for the driver can be provided by constructing in advance the driver model from the travel histories of a plurality of drivers.

For example, even when the frequency of the behavior for the travel environment of "there is a low-speed vehicle ahead" is zero in the travel history of driver y as illustrated in FIG. 16, that is, even when the driver has never selected the behavior of "follow", "overtake", and "lane change" in the travel environment of "there is a low-speed vehicle ahead", vehicle controller 7 can determine the behavior of "follow" as the first behavior in the travel environment of "there is a low-speed vehicle ahead" based on model B illustrated in FIG. 18.

Next, the individually-adapted type will be described. The individually-adapted-type driver model is constructed in such a way that travel histories of a plurality of drivers illustrated in FIG. 16 are aggregated in advance, as in the method for constructing the clustering-type. The different point from the clustering-type is such that the driver model is constructed for each driver. Hereinafter, an example of constructing the driver model for driver y will be described.

Firstly, travel histories of a plurality of drivers having a high degree of similarity with the travel history of driver y are extracted from the aggregated travel histories of a plurality of drivers. Then, the driver model for driver y is constructed from the extracted travel histories of a plurality of drivers.

FIG. 20 is a diagram illustrating a method for constructing the individually-adapted-type driver model. As in FIG. 17, FIG. 20 illustrates the travel histories of drivers a to fin tabular form. FIG. 20 also illustrates that the driver model for driver y is constructed from the travel histories of drivers c to e having a high degree of similarity with the travel history of driver y illustrated in FIG. 16.

The individually-adapted-type driver model is constructed by calculating the average of the frequencies in the extracted travel histories of the drivers.

FIG. 21 is a diagram illustrating one example of the constructed individually-adapted-type driver model. In the travel history of driver y illustrated in FIG. 16 and the travel histories of drivers c to e illustrated in FIG. 20, the average frequency of each behavior is derived for each travel environment. In this way, the individually-adapted-type driver model for driver y is constructed using the average frequency for the behavior corresponding to each travel environment.

Now, a method for using the constructed individually-adapted-type driver model will be described with examples.

The driver model for driver y illustrated in FIG. 21 is stored in advance in storage unit 8 of vehicle 1. In addition, vehicle controller 7 stores, in storage unit 8, the travel history of driver y in previous driving. Notably, driver y is detected by a camera or the like (not illustrated) installed in the vehicle interior.

Vehicle controller 7 then determines that, in actual autonomous travel, the behavior having the highest frequency is the behavior most suitable for driver y, that is, the first behavior, in each travel environment in the driver model for driver y.

In this way, the notification regarding the behavior more suitable for the driver can be provided by constructing in advance the driver model for each driver from the travel histories of a plurality of drivers.

For example, even when the frequency of the behavior for the travel environment of "there is a low-speed vehicle ahead" is zero in the travel history of driver y as illustrated in FIG. 16, that is, even when the driver has never selected the behavior of "follow", "overtake", and "lane change" in the travel environment of "there is a low-speed vehicle ahead", vehicle controller 7 can determine the behavior of "lane change" as the first behavior in the travel environment of "there is a low-speed vehicle ahead" based on the driver model illustrated in FIG. 21.

A description will next be given of a case where driving characteristics of a driver (habit in driving) are acquired, and autonomous driving according to the taste of the driver is performed. In general, the actual action (for example, the level of acceleration or deceleration, or an operation amount of a steering wheel) for one behavior (for example, lane change) differs for each driver. Therefore, if autonomous driving according to the taste of the driver is enabled, more comfortable driving for the driver can be implemented.

Notably, while the case where the driving characteristics of the driver are acquired during manual driving, and the acquired driving characteristics are reflected in autonomous driving will be described below, the present invention is not limited to this case.

Vehicle controller 7 extracts a characteristic amount indicating the driving characteristics of the driver based on the content of an operation performed by the driver for each unit in vehicle 1, and stores the acquired amount in storage unit 8. Herein, examples of the characteristic amount include a characteristic amount pertaining to a speed, a characteristic amount pertaining to steering, a characteristic amount pertaining to an operation timing, a characteristic amount pertaining to vehicle exterior sensing, and a characteristic amount pertaining to vehicle interior sensing.

The characteristic amount pertaining to a speed is the speed, acceleration, deceleration, or the like of the vehicle, for example, and these characteristic amounts are acquired from a speed sensor or the like mounted to the vehicle.

The characteristic amount pertaining to steering includes a steering angle, angular velocity, angular acceleration, and the like of the steering, for example, and these characteristic amounts are acquired from steering wheel 5.

The characteristic amount pertaining to an operation timing includes an operation timing of the brake, accelerator, indicator lever, steering wheel, and the like, for example, and these characteristic amounts are acquired respectively from brake pedal 2, accelerator pedal 3, indicator lever 4, and steering wheel 5.

The characteristic amount pertaining to vehicle external sensing includes the distance between vehicle 1 and a vehicle present in front of, at the side of, or at the back of vehicle 1, for example, and these characteristic amounts are acquired from sensor 62 or the like.

The characteristic amount pertaining to vehicle interior sensing includes personal identification information indicating who the driver is and who the fellow passenger is, for example, and these characteristic amounts are acquired from a camera or the like installed in the vehicle interior.

For example, when the driver manually performs a lane change, vehicle controller 7 detects that the driver manually performs the lane change. The detection is performed by analyzing operation time-series data which is acquired from controller area network (CAN) information by establishing rules on operation time-series data pattern for a lane change in advance. Upon detection, vehicle controller 7 acquires the characteristic amount. Vehicle controller 7 stores characteristic amounts in storage unit 8 for each driver, and constructs a driving characteristic model.

Note that vehicle controller 7 may construct the driver model based on the characteristic amount for each driver. Specifically, vehicle controller 7 extracts a characteristic amount pertaining to a speed, a characteristic amount pertaining to steering, a characteristic amount pertaining to an operation timing, a characteristic amount pertaining to vehicle exterior sensing, and a characteristic amount pertaining to vehicle interior sensing, and stores the extracted characteristic amounts into storage unit 8. Then, vehicle controller 7 may construct, based on the characteristic amounts stored in storage unit 8, a driver model in which the operation tendency of the driver for each travel environment and information about the frequency of each operation are associated with each other.

FIG. 22 is a diagram for describing one example of a driving characteristic model. FIG. 22 illustrates the characteristic amounts for each driver in tabular form. FIG. 22 also illustrates the number of times each driver has previously selected each behavior. Although FIG. 22 illustrates only some of the characteristic amounts described above, any of or all of the characteristic amounts described above may be illustrated.

The characteristic amounts illustrated in FIG. 22 will be described in detail. Numerical values in terms of the speed represent the actual speed in stages. Numerical values in terms of the steering wheel, the brake, and the accelerator represent operation amounts in stages. These numerical values are obtained by calculating the averages of the speed and the operation amounts for the steering wheel, the brake, and the accelerator during a predetermined previous time period, and by showing the averages in stages.

For example, when driver x performs a lane change without having a fellow passenger in FIG. 22, the speed level is 8, and the operation amount levels for the steering wheel, the brake, and the accelerator are respectively 4, 6, and 8.

While in autonomous driving, vehicle controller 7 selects, from the driving characteristic models in FIG. 22, the driving characteristic model corresponding to the driver, behavior, and fellow passenger, according to who the driver is, what behavior is executed, and who the fellow passenger is.

Then, vehicle controller 7 causes vehicle 1 to travel with the speed corresponding to the selected driving characteristic model, and controls vehicle 1 in combination of the operation amounts and operation timings for the steering wheel, the brake, and the accelerator. Thus, autonomous driving according to the taste of the driver can be implemented. Note that the notification regarding the information about the driving characteristic model illustrated in FIG. 22 can be provided by notification unit 92.

FIGS. 23A to 23D are each a view for describing a display on notification unit 92 according to the fourth exemplary embodiment of the present invention. FIGS. 23A to 23D are each a view illustrating a display corresponding to the first example of the travel environment illustrated in FIG. 5A.

Figure 23A:
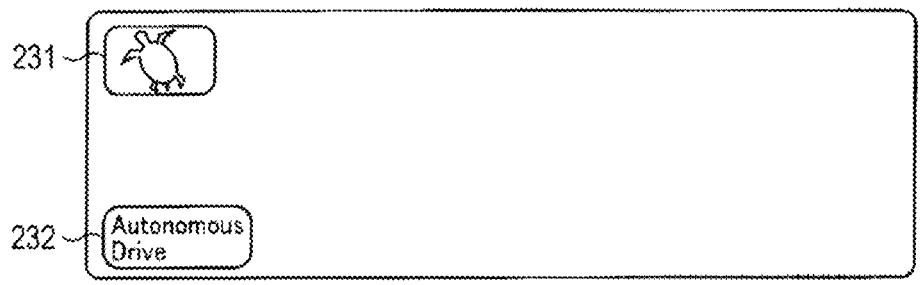
FIG. 23A is a view for describing a display on the notification unit according to the fourth exemplary embodiment.

FIG. 23A illustrates a display on notification unit 92 when vehicle 1 performs normal travel without requiring a lane change or acceleration/deceleration of the vehicle. In FIG. 23A, symbol 231 indicating that the driver has a driving characteristic of "frequently decelerating" and symbol 232 indicating that autonomous driving is now conducted are illustrated.

Vehicle controller 7 determines the driving characteristic of the driver based on the number of times the driver has previously selected each behavior included in the driving characteristic model illustrated in FIG. 22, for example. In this case, vehicle controller 7 causes notification unit 92 to display a display including symbol 231 as illustrated in FIGS. 23A to 23D for the driver who frequently "decelerates" (that is, the driver who frequently selects the behavior of "deceleration") based on the driving characteristic, for example.

Figure 23B:
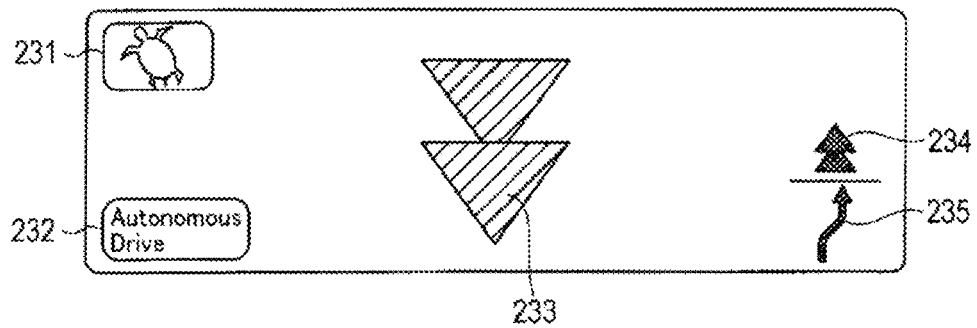
FIG. 23B is a view for describing a display on the notification unit according to the fourth exemplary embodiment.

When determining that the travel environment is the one in the first example illustrated in FIG. 5A, vehicle controller 7 determines that the first behavior is "deceleration" based on the driver's driving characteristic of "frequently decelerating", and causes notification unit 92 to execute the display in FIG. 23B.

In FIG. 23B, symbol 233 indicating "deceleration" which is the first behavior is illustrated in the first manner (for example, in the first color). In addition, symbol 234 indicating "acceleration" which is the second behavior and symbol 235 indicating "lane change" which is the second behavior are illustrated.

Figure 23C:
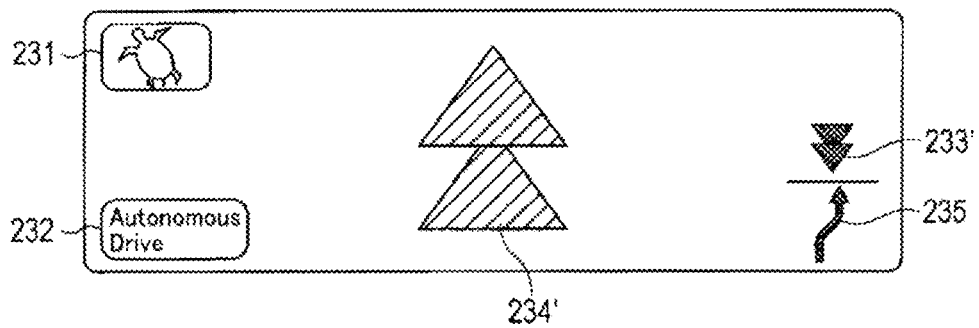
FIG. 23C is a view for describing a display on the notification unit according to the fourth exemplary embodiment.

When the driver changes the behavior to the behavior of "acceleration" by the operation described in the first exemplary embodiment, vehicle controller 7 causes notification unit 92 to execute the display in FIG. 23C.

In FIG. 23C, symbol 234' indicating "acceleration" which is the selected behavior is illustrated in the first manner. Further, symbol 233 which has been displayed as the first behavior in FIG. 23B is switched to symbol 234, and displayed as symbol 233'.

Figure 23D:
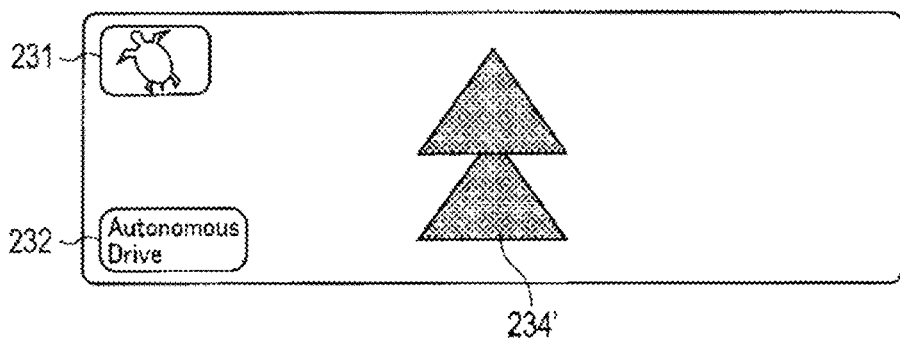
FIG. 23D is a view for describing a display on the notification unit according to the fourth exemplary embodiment.
Figure 24A:
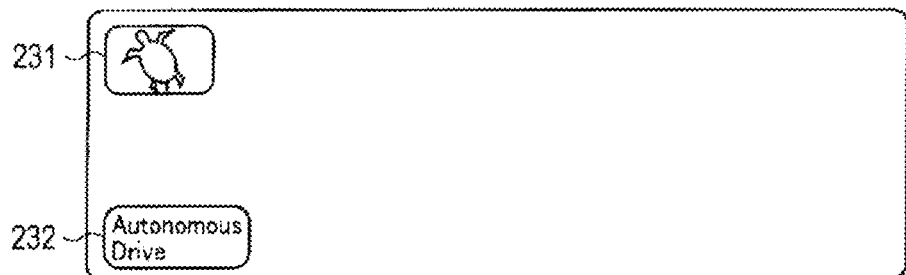
FIG. 24A is a view for describing a display on the notification unit according to the fourth exemplary embodiment.
Figure 24B:
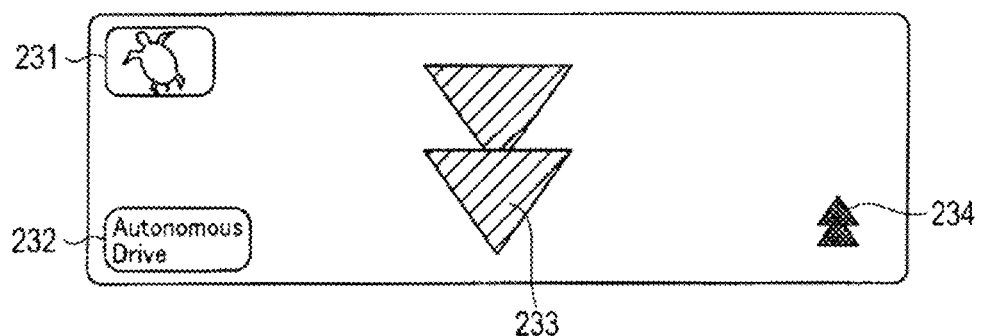
FIG. 24B is a view for describing a display on the notification unit according to the fourth exemplary embodiment.
Figure 24C:
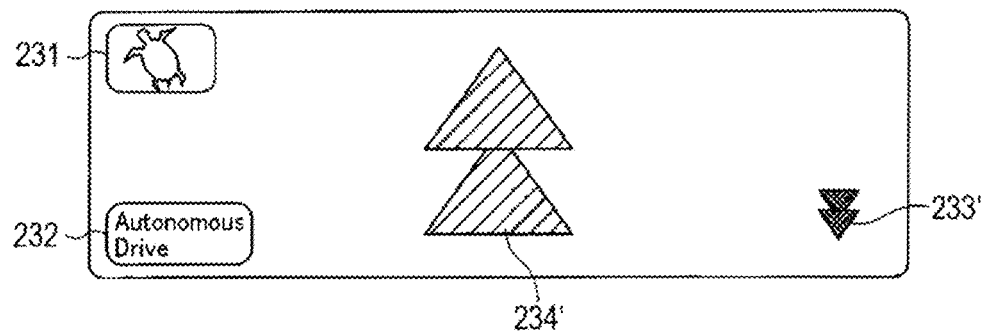
FIG. 24C is a view for describing a display on the notification unit according to the fourth exemplary embodiment.
Figure 24D:
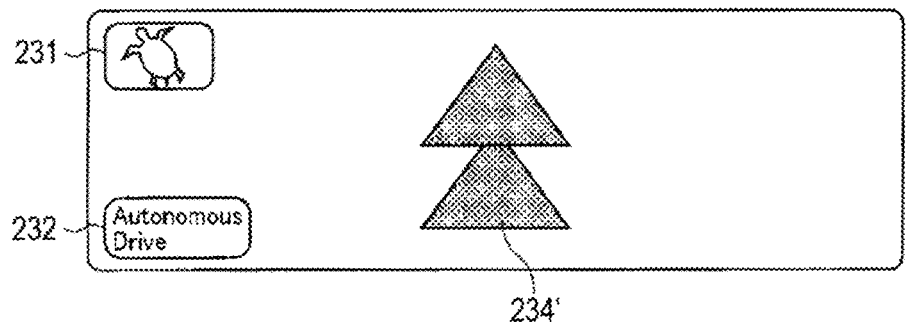
FIG. 24D is a view for describing a display on the notification unit according to the fourth exemplary embodiment.

Then, vehicle controller 7 causes notification unit 92 to execute the display illustrated in FIG. 23D when the second predetermined time has elapsed after vehicle controller 7 causes notification unit 92 to execute the display illustrated in FIG. 23A. In FIG. 23D, symbol 234' indicating "acceleration" selected as the next behavior by the driver is displayed in the second manner.

When the behavior to be executed next is determined to be "acceleration", vehicle controller 7 reads characteristic amounts corresponding to the behavior of "acceleration" included in the driving characteristic model, and controls vehicle 1 such that vehicle 1 performs "acceleration" with these characteristic amounts being reflected thereon.

FIGS. 24A to 24D are each a view for describing a display on notification unit 92 according to the fourth exemplary embodiment of the present invention. FIGS. 24A to 24D are each a view illustrating a display corresponding to the second example of the travel environment illustrated in FIG. 7A. It should be noted that constituent elements in FIGS. 24A to 24D which are substantially identical to constituent elements in FIGS. 23A to 23D are denoted by identical reference numerals used in FIGS. 23A to 23D and will not be described in detail. FIGS. 24A to 24D are formed by deleting symbol 235 indicating "lane change" from FIGS. 23A to 23D.

As mentioned previously, in the second example (FIG. 7A), different from the first example (FIG. 5A), a lane change is impossible because a nearby vehicle is traveling on the right of vehicle 1. Therefore, "lane change" is not displayed in FIGS. 24B and 24C. Further, in the example in FIG. 24C, because "acceleration" is selected as in FIG. 23C, vehicle controller 7 reads characteristic amounts corresponding to the behavior of "acceleration" included in the driving characteristic model, and controls vehicle 1 such that vehicle 1 performs "acceleration" with these characteristic amounts being reflected thereon, as in FIGS. 23A to 23D.

FIGS. 25A to 25D are each a view for describing a display on notification unit 92 according to the fourth exemplary embodiment of the present invention. FIGS. 25A to 25D are each a view illustrating a display corresponding to the third example of the travel environment illustrated in FIG. 8A.

Figure 25A:
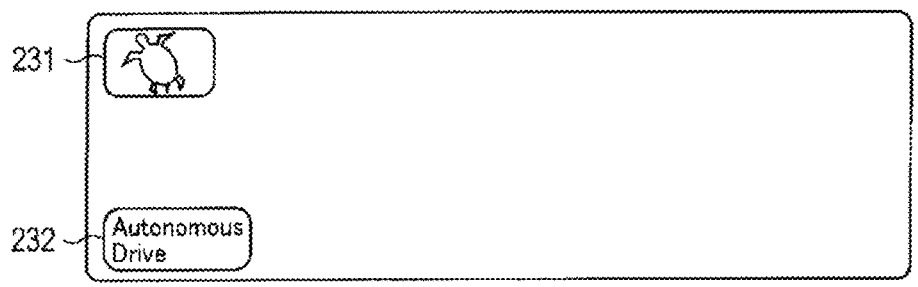
FIG. 25A is a view for describing a display on the notification unit according to the fourth exemplary embodiment.

FIG. 25A is similar to FIG. 23A. When determining that the travel environment is the one in the third example illustrated in FIG. 8A, vehicle controller 7 determines that the first behavior is "deceleration" based on the driver's driving characteristic of "frequently decelerating", and causes notification unit 92 to execute the display in FIG. 25B.

Figure 25B:
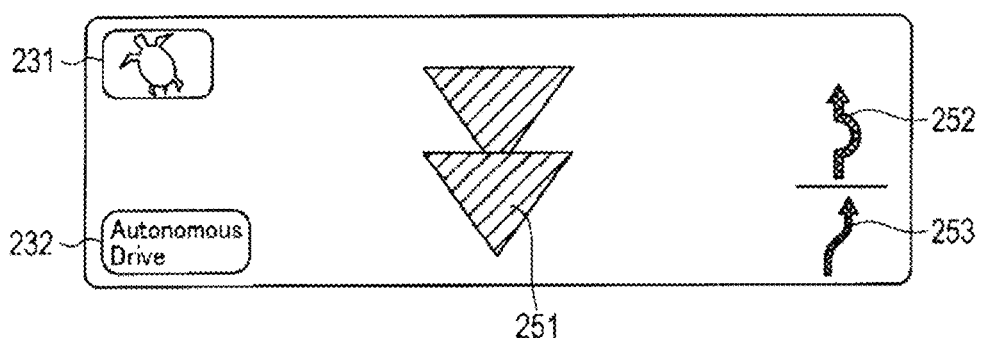
FIG. 25B is a view for describing a display on the notification unit according to the fourth exemplary embodiment.

In FIG. 25B, symbol 251 indicating "deceleration" which is the first behavior is illustrated in the first manner (for example, in the first color). In addition, symbol 252 indicating "overtake" which is the second behavior and symbol 253 indicating "lane change" which is the second behavior are illustrated.

Figure 25C:
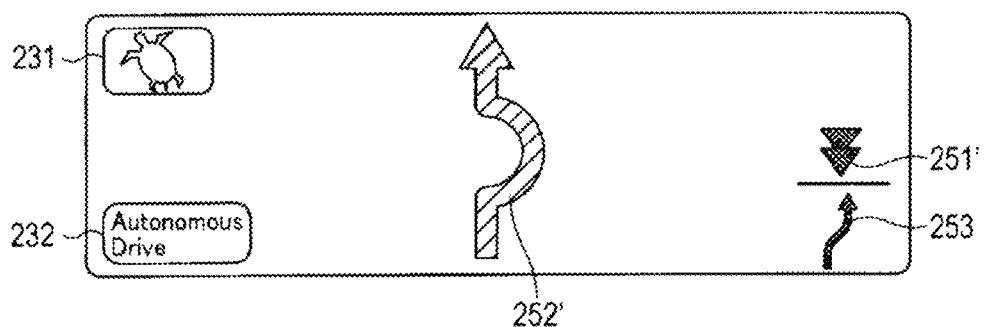
FIG. 25C is a view for describing a display on the notification unit according to the fourth exemplary embodiment.

When the driver changes the behavior to the behavior of "overtake" by the operation described in the first exemplary embodiment, vehicle controller 7 causes notification unit 92 to execute the display in FIG. 25C.

In FIG. 25C, symbol 252' indicating "overtake" which is the selected behavior is illustrated in the first manner. Further, symbol 251 which has been displayed as the first behavior in FIG. 25B is switched to symbol 252 and displayed as symbol 251'.

Figure 25D:
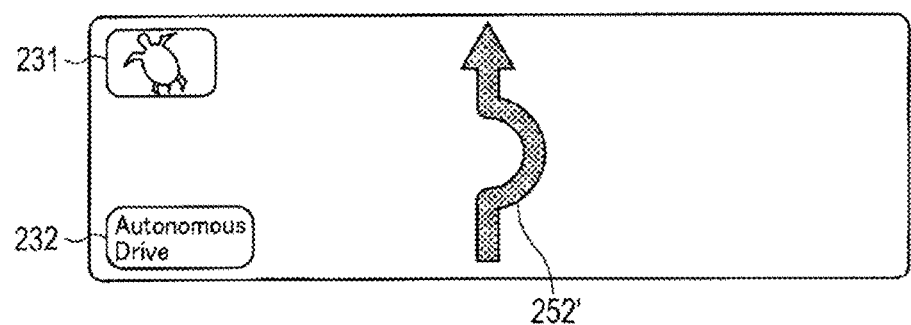
FIG. 25D is a view for describing a display on the notification unit according to the fourth exemplary embodiment.

Then, vehicle controller 7 causes notification unit 92 to execute the display illustrated in FIG. 25D when the second predetermined time has elapsed after vehicle controller 7 causes notification unit 92 to execute the display illustrated in FIG. 25A. In FIG. 25D, symbol 252' indicating "overtake" selected as the next behavior by the driver is displayed in the second manner.

When the behavior to be executed next is determined to be "overtake", vehicle controller 7 reads characteristic amounts corresponding to the behavior of "overtake" included in the driving characteristic model, and controls vehicle 1 such that vehicle 1 performs "acceleration" with these characteristic amounts being reflected thereon.

A description will next be given of an example of a display when the driving characteristic of the driver is not the driving characteristic of "frequently decelerating".

Figure 26A:
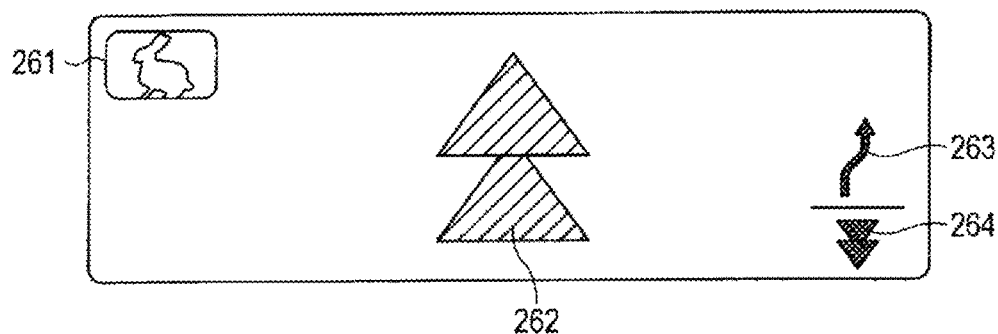
FIG. 26A is a view for describing a display on the notification unit according to the fourth exemplary embodiment.
Figure 26B:
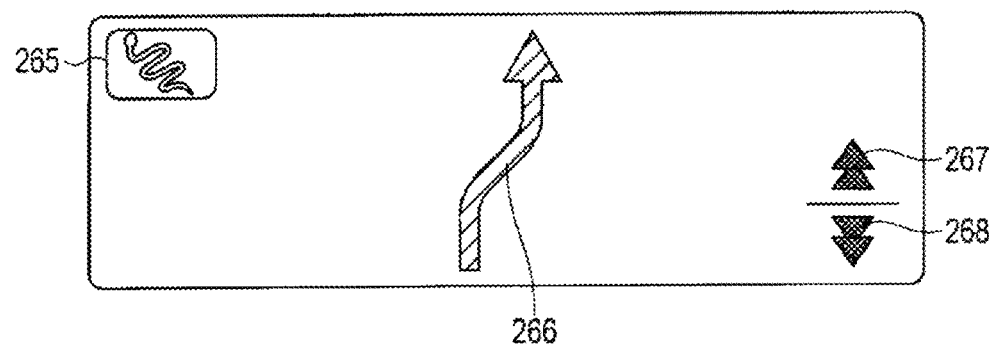
FIG. 26B is a view for describing a display on the notification unit according to the fourth exemplary embodiment.

FIGS. 26A to 26B are each a view for describing a display on notification unit 92 according to the fourth exemplary embodiment of the present invention. FIGS. 26A to 26B are each a view illustrating a display corresponding to the first example of the travel environment illustrated in FIG. 5A. It is to be noted that FIG. 26A illustrates an example of a case where the driver has a driving characteristic of "frequently accelerating", and FIG. 26B illustrates an example of a case where the driver has a driving characteristic of "frequently performing a lane change".

In FIG. 26A, symbol 261 indicating that the driver has a driving characteristic of "frequently accelerating" is illustrated. Symbol 262 indicating "acceleration" which is the first behavior is also illustrated in the first manner (for example, in the first color). In addition, symbol 263 indicating "lane change" which is the second behavior and symbol 264 indicating "deceleration" which is the second behavior are also illustrated.

Vehicle controller 7 causes notification unit 92 to execute a display including symbol 261 as illustrated in FIG. 26A for the driver who has frequently "accelerated" previously (that is, the driver who has frequently selected the behavior of "acceleration" previously) based on the driving characteristic, for example. In addition, vehicle controller 7 determines the first behavior as "acceleration" and causes notification unit 92 to execute the display in FIG. 26A based on the driver's driving characteristic of "frequently accelerating".

In FIG. 26B, symbol 265 indicating that the driver has a driving characteristic of "frequently performing a lane change" is illustrated. Symbol 266 indicating "lane change" which is the first behavior is also illustrated in the first manner (for example, in the first color). In addition, symbol 267 indicating "acceleration" which is the second behavior and symbol 268 indicating "deceleration" which is the second behavior are also illustrated.

Vehicle controller 7 causes notification unit 92 to execute a display including symbol 265 as illustrated in FIG. 26B for the driver who has frequently performed "lane change" previously (that is, the driver who has frequently selected the behavior of "lane change" previously) based on the driving characteristic, for example. Vehicle controller 7 determines the first behavior as "lane change" and causes notification unit 92 to execute the display in FIG. 26B based on the driver's driving characteristic of "frequently performing a lane change".

The description has been given only using the driving characteristic model. However, the driver model may also be considered. Symbols 231, 261, and 265 in FIGS. 23A to 23D, 24A to 24D, 25A to 25D, 26A, and 26B may indicate the type of the driver model selected from the operation history of the driver. For example, for the driver model to be applied to a driver frequently selecting "deceleration" for the first example of the travel environment illustrated in FIG. 5A, vehicle controller 7 causes notification unit 92 to execute the display including symbol 231 as in FIGS. 23A to 23D and determines the first behavior as "deceleration". For the driver model to be applied to a driver frequently selecting "acceleration", vehicle controller 7 causes notification unit 92 to execute the display including symbol 261 as in FIG. 26A and determines the first behavior as "acceleration". For the driver model to be applied to a driver frequently selecting "lane change", vehicle controller 7 causes notification unit 92 to execute the display including symbol 265 as in FIG. 26B and determines the first behavior as "lane change".

According to the present exemplary embodiment described above, when determining a future behavior of the vehicle, the vehicle can learn the previous travel history of the driver and reflect the result in determining the future behavior. In addition, when controlling the vehicle, vehicle controller can learn the driving characteristic (driving taste) of the driver and reflect the result in controlling the vehicle.

Thus, the vehicle can control the autonomous driving at a timing or with an operation amount favored by the driver or the occupant, thereby being capable of suppressing unnecessary operation intervention performed by the driver during the autonomous driving without causing deviation from a sense of the driver when he/she actually manually drives the vehicle.

Note that, in the present invention, the function similar to the function executed by vehicle controller 7 may be executed by a cloud server or a server device. In addition, storage unit 8 may be provided in the cloud server or the server device, not in vehicle 1. Alternatively, storage unit 8 may store a driver model which has already been constructed, and vehicle controller 7 may determine a behavior by referring to the driver model stored in storage unit 8.

As described above, in the fourth exemplary embodiment, vehicle controller 7 acquires the information about the characteristic amount indicating the driving characteristic of the driver; storage unit 8 stores the information about the characteristic amount; and vehicle controller 7 constructs, for each travel environment of the vehicle, the driver model which indicates the tendency of the behavior of the vehicle selected by the driver in terms of the frequency of the selected behavior, based on the information about the characteristic amount stored in storage unit 8.

In addition, vehicle controller 7 determines, among from a plurality of drivers, the group of the drivers having similar behavior selection, and constructs the driver model for each group or each travel environment of the vehicle.

Further, vehicle controller 7 calculates the average of the frequency of the behavior selected by each driver for each group of the drivers performing a similar operation, and constructs, for each travel environment of the vehicle, a driver model in which the tendency of the behavior of the vehicle selected by the driver is indicated in terms of the calculated average.

Moreover, vehicle controller 7 constructs, based on the vehicle behavior which is selected by another driver having a similar tendency to the vehicle behavior selected by a specific driver, a driver model in which the tendency of the vehicle behavior selected by the specific driver is indicated in terms of the frequency of each selected behavior, for each travel environment of the vehicle.

Accordingly, vehicle controller 7 can construct a driver model more suitable for the driving tendency of the driver, and can perform autonomous driving more appropriate for the driver based on the constructed driver model.

(Modification of Driver Model)

The driver model described above is constructed in such a way that the operation (behavior) tendency of a driver for each travel environment is modeled based on information relating to the frequency of each operation. However, the present invention is not limited thereto.

For example, the driver model may be constructed based on a travel history in which an environmental parameter indicating a travel environment (i.e., situation) through which the vehicle has previously traveled and the operation (behavior) actually selected by the driver in this travel environment are associated with each other. When the environmental parameter is incorporated into the driver model, options can be decided without going through the procedure for individually performing detection and labeling of the travel environment and inputting (storing) the labeling result in the driver model. Specifically, when the difference in travel environment as in FIGS. 23A to 23D and 24A to 24D is acquired as environmental parameters, and the acquired parameters are directly input (stored) in the driver model, "acceleration", "deceleration", and "lane change" are determined as options in FIGS. 23A to 23D, and "acceleration" and "deceleration" are determined as options in FIGS. 24A to 24D. Hereinafter, an example of constructing such a driver model will be described. Note that the driver model described below may be restated as a situation database.

Now, a travel history for constructing the driver model in the present modification will be described. FIG. 27 is a diagram illustrating one example of the travel history. FIG. 27 illustrates the travel history in which environmental parameters indicating a travel environment through which the vehicle driven by driver x has previously traveled and the operation (behavior) actually selected by the driver in this travel environment are associated with each other.

The environmental parameters in (a) to (c) in the travel history in FIG. 27 respectively indicate the travel environment when the vehicle behavior is presented to the driver as in FIGS. 8B, 5B, and 7B, for example. The environmental parameters in the travel history are acquired from sensing information or infrastructure information.

The sensing information is information detected by sensors or radars in the vehicle. The infrastructure information includes information from GPS, map information, information acquired through road-to-vehicle communication, for example.

For example, the environmental parameters in the travel history in FIG. 27 include: "host vehicle information"; "leading vehicle information" indicating information about a vehicle traveling in front of the host vehicle in a lane of the host vehicle; "adjacent lane information" indicating information about an adjacent lane of the lane in which the host vehicle is traveling; "merging lane information" indicating, when there is a merging lane on a location where the host vehicle travels, the information about the merging lane; and "location information" indicating information about the location of the host vehicle and the surrounding thereof. In addition, following vehicle information may be included. In this case, a relative speed of the following vehicle relative to the host vehicle, head-to-head spacing, rate of change of the head-to-head spacing, and the like may be used. In addition, vehicle presence information may be included.

For example, the "host vehicle information" includes information about speed Va of the host vehicle. The "leading vehicle information" includes information about relative speed Vba of the leading vehicle relative to the host vehicle, distance DRba between the leading vehicle and the host vehicle, and rate of change RSb of the size of the leading vehicle.

Herein, speed Va of the host vehicle is detected by a speed sensor mounted to the host vehicle. Relative speed Vba and distance DRba between the host vehicle and the leading vehicle are detected by a sensor, radar, or the like. Rate of change RSb of the size is calculated from a relational expression of $RSb=-Vba/DRba$.

The "adjacent lane information" includes information about an adjacent following vehicle traveling behind the host vehicle in the adjacent lane, information about an adjacent leading vehicle traveling in front of the host vehicle in the adjacent lane, and information about remaining adjacent lane length DRda for the host vehicle.

The adjacent following vehicle information includes information about relative speed Vca of the adjacent following vehicle relative to the host vehicle, head-to-head spacing Dca between the adjacent following vehicle and the host vehicle, and rate of change Rca of the head-to-head spacing. Head-to-head spacing Dca between the adjacent following vehicle and the host vehicle is the distance between the front part (head) of the host vehicle and the front part (head) of the adjacent following vehicle measured in the direction along the travel direction of the host vehicle (and the adjacent following vehicle). Note that the head-to-head spacing may be calculated from the inter-vehicular distance or vehicle length. In addition, the head-to-head spacing may be replaced by the inter-vehicular distance.

Relative speed Vca and head-to-head spacing Dca are detected by a sensor, radar, or the like. Rate of change Rca of the head-to-head spacing is calculated from a relational expression of $Rca=Vca/Dca$.

In addition, the adjacent leading vehicle information includes information about relative speed Vda of the adjacent leading vehicle relative to the host vehicle, head-to-head spacing Dda between the adjacent leading vehicle and the host vehicle, and rate of change Rda of the head-to-head spacing. Head-to-head spacing Dda between the adjacent leading vehicle and the host vehicle is the distance between the front part (head) of the host vehicle and the front part (head) of the adjacent leading vehicle measured along the travel direction of the host vehicle (and the adjacent leading vehicle).

Relative speed Vda and head-to-head spacing Dda are detected by a sensor, radar, or the like. In addition, rate of change Rda of the head-to-head spacing is calculated from a relational expression of Rda=Vda/Dda.

Remaining adjacent lane length DRda for the host vehicle is a parameter indicating the degree of possibility of a lane change to the adjacent lane. Specifically, when the distance between the front part (head) of the host vehicle and the rear part of the adjacent leading vehicle measured along the travel direction of the host vehicle (and the adjacent leading vehicle) is longer than distance DRba between the leading vehicle and the host vehicle, remaining adjacent lane length DRda for the host vehicle is the distance between the front part (head) of the host vehicle and the rear part of the adjacent leading vehicle, and when the distance between the front part (head) of the host vehicle and the rear part of the adjacent leading vehicle is shorter than DRba, remaining adjacent lane length DRda is DRba. Remaining adjacent lane length DRda for the host vehicle is detected by a sensor, radar, or the like.

The "merging lane information" includes information about relative speed Vma of a merging vehicle relative to the host vehicle, head-to-head spacing Dma between the merging vehicle and the host vehicle, and rate of change Rma of the head-to-head spacing. Head-to-head spacing Dma between the merging vehicle and the host vehicle is the distance between the front part (head) of the host vehicle and the front part (head) of the merging vehicle measured in the direction along the travel direction of the host vehicle (and the merging vehicle).

Relative speed Vma and head-to-head spacing Dma are detected by a sensor, radar, or the like. Rate of change Rma of the head-to-head spacing is calculated from a relational expression of Rma=Vma/Dma.

In the example of the travel history illustrated in FIG. 27, the numerical values of the speed, distance, and rate of change described above are classified into a plurality of levels, and the numerical values indicating the classified levels are stored. Note that the numerical values of the speed, distance, and rate of change may be stored without being classified into levels.

The location information includes "host vehicle location information", "number of travel lanes", "host vehicle travel lane", "distance to start/end point of merging section", "distance to start/end point of branch section", "distance to start/end point of road work section", "distance to start/end point of lane end section", "distance to accident spot", and the like. FIG. 27 illustrates, as examples of the location information, the "host vehicle travel lane" (travel lane in FIG. 27) and the "distance to start/end point of merging section" (illustrated as "distance to merging point" in FIG. 27).

For example, numerical information indicating the latitude and longitude acquired from the GPS is stored in the part of the "host vehicle location information" not illustrated. The number of travel lanes on the road where the host vehicle is traveling is stored in the part of the "number of travel lanes". Numerical information indicating the location of the lane where the host vehicle is traveling is stored in the part of the "host vehicle travel lane" not illustrated. When there are start and end points of a merging section within a predetermined distance, the distances to the start and end points of the merging section are classified into a plurality of predetermined levels, and the numerical values of the classified levels are stored in the part of the "distance to start/end point of merging section". When there are no start and end points of a merging section within the predetermined distance, "0" is stored in the part of the "distance to start/end point of merging section".

When there are start and end points of a branch section within a predetermined distance, the distances to the start and end points of the branch section are classified into a plurality of predetermined levels, and the numerical values of the classified levels are stored in the part of the "distance to start/end point of branch section". When there are no start and end points of a branch section within the predetermined distance, "0" is stored in the part of the "distance to start/end point of branch section". When there are start and end points of a road work section within a predetermined distance, the distances to the start and end points of the road work section are classified into a plurality of predetermined levels, and the numerical values of the classified levels are stored in the part of the "distance to start/end point of road work section". When there are no start and end points of a road work section within the predetermined distance, "0" is stored in the part of the "distance to start/end point of road work section".

When there are start and end points of a lane end section within a predetermined distance, the distances to the start and end points of the lane end section are classified into a plurality of predetermined levels, and the numerical values of the classified levels are stored in the part of the "distance to start/end point of lane end section". When there are no start and end points of a lane end section within the predetermined distance, "0" is stored in the part of the "distance to start/end point of lane end section".

When there is an accident spot within a predetermined distance, the distance to the accident spot is classified into a plurality of predetermined levels, and the numerical values of the classified levels are stored in the part of the "distance to accident spot". When there is no accident spot within the predetermined distance, "0" is stored in the part of the "distance to accident spot".

In addition, the location information may include information indicating which lane, out of all lanes on the road where the host vehicle is traveling, is the merging lane, the branch lane, the lane having a road work, the lane which ends, and the lane having an accident spot.

Note that the travel history illustrated in FIG. 27 is merely one example, and the present invention is not limited thereto. For example, when the adjacent lane information is information about the right adjacent lane, the travel history may further include "left adjacent lane information" opposite to the right adjacent lane.

The "left adjacent lane information" includes information about a left adjacent following vehicle traveling behind the host vehicle in the left adjacent lane, information about a left adjacent leading vehicle traveling in front of the host vehicle in the left adjacent lane, and information about remaining left adjacent lane length DRda for the host vehicle.

The left following vehicle information includes information about relative speed Vfa of the left adjacent following vehicle relative to the host vehicle, head-to-head spacing Dfa between the left adjacent following vehicle and the host vehicle, and rate of change Rfa of the head-to-head spacing. Head-to-head spacing Dfa between the left adjacent following vehicle and the host vehicle is the distance between the front part (head) of the host vehicle and the front part (head) of the left adjacent following vehicle measured in the direction along the travel direction of the host vehicle (and the left adjacent following vehicle).

Here, relative speed Vfa and head-to-head spacing Dfa are detected by a sensor, radar, or the like. In addition, rate of change Rfa of the head-to-head spacing is calculated from a relational expression of Rfa=Vfa/Dfa.

In addition, the left adjacent leading vehicle information includes information about relative speed Vga of the left adjacent leading vehicle relative to the host vehicle, head-to-head spacing Dga between the left adjacent leading vehicle and the host vehicle, and rate of change Rga of the head-to-head spacing. Head-to-head spacing Dga between the left adjacent leading vehicle and the host vehicle is the distance between the front part (head) of the host vehicle and the front part (head) of the left adjacent leading vehicle measured along the travel direction of the host vehicle (and the left adjacent leading vehicle).

Here, relative speed Vga and head-to-head spacing Dga are detected by a sensor, radar, or the like. In addition, rate of change Rga of the head-to-head spacing is calculated from a relational expression of Rga=Vga/Dga.

It is to be noted that, while the description has been given of the case where the vehicle is in the left side of the road, the similar process is also applied for the case where the vehicle is in the right side of the road by inverting left to right.

In addition, the travel history illustrated in FIG. 27 may include "following vehicle information" indicating information about a vehicle traveling behind the host vehicle in the travel lane of the host vehicle.

The following vehicle information includes information about relative speed Vea of the following vehicle relative to the host vehicle, head-to-head spacing Dea between the following vehicle and the host vehicle, and rate of change Rea of the head-to-head spacing. Head-to-head spacing Dea between the following vehicle and the host vehicle is the distance between the front part (head) of the host vehicle and the front part (head) of the following vehicle measured in the direction along the travel direction of the host vehicle (and the following vehicle).

Here, relative speed Vea and head-to-head spacing Dea are detected by a sensor, radar, or the like. Rate of change Rea of the head-to-head spacing is calculated from a relational expression of Rea=Vea/Dea.

It is to be noted that, if the head-to-head spacing cannot be measured because of the vehicles being hidden by a moving body, the measurable distance between vehicles or an approximate value obtained by adding a predetermined vehicle length to the distance between vehicles may be substituted for the head-to-head spacing, or the head-to-head spacing may be calculated by adding the vehicle length of each recognized vehicle type to the distance between vehicles. Alternatively, regardless of whether the head-to-head spacing can be measured, the measurable distance between vehicles or an approximate value obtained by adding a predetermined vehicle length to the distance between vehicles may be substituted for the head-to-head spacing, or the head-to-head spacing may be calculated by adding the vehicle length of each recognized vehicle type to the distance between vehicles.

The travel history may include other various information items pertaining to the travel environment of the vehicle. For example, the travel history may include information about the size or the type of a leading vehicle, an adjacent vehicle, or a merging vehicle, or information about the relative position relative to the host vehicle. For example, when the vehicle approaching from behind is an emergency vehicle as a result of recognition of the type of the vehicle by a camera sensor, information indicating the vehicle being an emergency vehicle may be included. According to this configuration, notification regarding information for responding to the emergency vehicle can be provided. Alternatively, numerical values indicating, in stages, operation amounts of the steering wheel, the brake, and the accelerator or the information pertaining to a fellow passenger as described with reference to FIG. 22 may be included in the travel history.

In addition, the travel history of the driver may be formed by aggregating the behaviors selected during autonomous driving, or by aggregating the behaviors actually executed by the driver during manual driving. Thus, a travel history according to a driving state, i.e., autonomous driving or manual driving, can be collected.

Further, although the environmental parameters included in the travel history in the example in FIG. 27 show the travel environment when a vehicle behavior is presented to the driver, the environmental parameters may show a travel environment when the driver performs behavior selection. Alternatively, the travel history may include both environmental parameters showing the travel environment when a vehicle behavior is presented to the driver and environmental parameters showing the travel environment when the driver performs behavior selection.

Moreover, the following configuration may be applied when vehicle controller 7 generates the display of the overhead view illustrated FIG. 2A, 5A, 6A, 7A, 8A, 9A, or 10A or the display illustrated FIG. 14C. Specifically, vehicle controller 7 generates, as notification information item, at least one of the information about the environmental parameter which has a high rate of contribution by which the first behavior and the second behavior are selected, and the information (for example, icon) pertaining to this environmental parameter. The notification information may be provided by notification unit 92 by displaying the generated notification information on the overhead view.

In this case, if distance DRba between the leading vehicle and the host vehicle or rate of change RSb of the size of the leading vehicle has a high rate of contribution, for example, vehicle controller 7 may cause notification unit 92 to display a high luminance region or a color-changed region between the leading vehicle and the host vehicle in the overhead view so as to provide the notification information.

Alternatively, vehicle controller 7 may display, as the notification information, an icon indicating that distance DRba or rate of change RSb has a high rate of contribution, in a region between the leading vehicle and the host vehicle. Still alternatively, vehicle controller 7 may cause notification unit 92 to depict, as the notification information, a line segment connecting the leading vehicle and the host vehicle in the overhead view, or to depict line segments connecting all surrounding vehicles and the host vehicle as the notification information and to highlight only the line segment connecting the leading vehicle and the host vehicle in the overhead view.

Alternatively, vehicle controller 7 may cause notification unit 92 to display between the leading vehicle and the host vehicle, as the notification information, a region having higher luminance than the surrounding region or a region having a different color from the surrounding region, not in the overhead view, but in a viewpoint image viewed by the driver, thereby implementing augmented reality (AR) display. Alternatively, vehicle controller 7 may cause notification unit 92 to display in the viewpoint image, as the notification information, an AR image of an icon indicating an environmental parameter having a high rate of contribution in a region between the leading vehicle and the host vehicle.

Still alternatively, vehicle controller 7 may cause notification unit 92 to display in the viewpoint image, as the notification information, an AR image of a line segment connecting the leading vehicle and the host vehicle, or to display in the viewpoint image, as the notification information, an AR image of line segments connecting all surrounding vehicles and the host vehicle and to highlight only the line segment connecting the leading vehicle and the host vehicle.

It should be noted that the method for providing notification regarding the environmental parameter having a high rate of contribution or the information pertaining to the environmental parameter is not limited to the methods described above. For example, vehicle controller 7 may generate, as the notification information, an image in which the leading vehicle involved with an environmental parameter having a high rate of contribution is displayed in a highlighted manner, and may cause notification unit 92 to display this image.

In addition, vehicle controller 7 may generate, as the notification information, information indicating the direction of the leading vehicle or the like involved with an environmental parameter having a high rate of contribution in the overhead view or AR display, and display this information in the host vehicle or around the host vehicle.

Alternatively, in place of providing the notification regarding the information about the environmental parameter having a high rate of contribution or the information pertaining to this environmental parameter, vehicle controller 7 may make a leading vehicle or the like which is involved with an environmental parameter having a low rate of contribution unnoticeable by lowering the display luminance of the leading vehicle or the like, generate, as the notification information, the information about the environmental parameter having a high rate of contribution which becomes relatively noticeable or the information pertaining to the environmental parameter, and cause notification unit 92 to display the generated information.

Next, the construction of a driver model based on the travel history of the driver will be described. The driver model is classified into a clustering type constructed by clustering travel histories of a plurality of drivers, and an individually-adapted type in which a driver model of a specific driver (for example, driver x) is constructed from a plurality of travel histories similar to the travel history of driver x.

Firstly, the clustering type will be described. The clustering-type driver model is constructed in such a way that the travel history of the driver illustrated in FIG. 27 is aggregated in advance for each driver. Then, a plurality of drivers having a high degree of similarity between the travel histories, that is, a plurality of drivers having a similar driving operation tendency, is grouped to construct a driver model.

The degree of similarity between travel histories can be determined, for example, based on a correlation value of a vector having, when the behaviors in the travel histories of driver a and driver b are quantified according to a predetermined rule, the numerical value of the environmental parameter and the numerical value of the behavior as an element. In this case, when the correlation value calculated from the travel histories of driver a and driver b is higher than a predetermined value, the travel histories of driver a and driver b are grouped into a single group. Note that the calculation of the degree of similarity is not limited thereto.

Next, the individually-adapted type will be described. The individually-adapted-type driver model is constructed in such a way that travel histories of a plurality of drivers illustrated in FIG. 27 are aggregated in advance, as in the method for constructing the clustering-type. The different point from the clustering-type is such that the driver model is constructed for each driver. For example, when a driver model is constructed for driver y, the travel history of driver y and travel histories of the other drivers are compared, and the travel histories of the drivers having a high degree of similarity are extracted. Then, the individually-adapted-type driver model for driver y is constructed from the extracted travel histories of a plurality of drivers.

Notably, the driver model (situation database) based on the travel history in FIG. 27 is not limited to the clustering type or the individually-adapted type, and may be constructed to include travel histories of all drivers, for example.

Now, a method for using the constructed driver model will be described with examples. A description will next be given of a case where a driver model formed by aggregating travel histories of four drivers a to d is used for driver x. Note that the driver model is constructed by vehicle controller 7.

Modification

FIGS. 28A and 28B are diagrams illustrating a method for using the driver model in the present modification. FIG. 28A illustrates environmental parameters indicating the current travel environment of the vehicle driven by driver x. FIG. 28B illustrates one example of a driver model for driver x.

As illustrated in FIG. 28A, the behavior (operation) for the environmental parameters indicating the current travel environment is blank. Vehicle controller 7 acquires environmental parameters at predetermined intervals, and determines the next behavior from the driver model illustrated in FIG. 28B by using any one of the environmental parameters as a trigger.

For example, the environmental parameter indicating the need to change the operation of the vehicle, such as the case where the distance to the start point of the merging section becomes shorter than or equal to a predetermined distance or the case where the relative speed relative to the leading vehicle becomes less than or equal to a predetermined value, may be used as a trigger.

Vehicle controller 7 compares the environmental parameters illustrated in FIG. 28A with the environmental parameters in the travel history of the driver model illustrated in FIG. 28B, and determines the behavior associated with the most similar environmental parameters as the first behavior. In addition, vehicle controller 7 determines some behaviors associated with the other similar environmental parameters as the second behavior.

The similarity between environmental parameters can be determined from a correlation value of a vector having the numerical values of the environmental parameters as elements. For example, when the correlation value calculated from the vector having the numerical values of the environmental parameters illustrated in FIG. 28A as an element and the vector having the numerical values of the environmental parameters in FIG. 28B as an element is larger than a predetermined value, these environmental parameters are determined to be similar to each other. Note that the method for determining similarity between environmental parameters is not limited thereto.

In the above, a behavior is determined based on the degree of similarity between environmental parameters. However, a group of environmental parameters having high degree of similarity may be firstly generated, statistics of the environmental parameters in this group may be taken, and a behavior may be determined from this statistical data.

In this way, the notification regarding the behavior more suitable for the driver can be provided by constructing in advance the driver model for each driver from the travel histories of a plurality of drivers. Notably, to register a safer travel history into a database, it may be configured such that: storage unit 8 stores information indicating a safe travel standard; vehicle controller 7 determines whether or not the travel history satisfies this standard; and vehicle controller 7 further registers the travel history satisfying this standard into the database and does not register the travel history not satisfying this standard.

In addition, due to the association between the parameter indicating the travel environment and the behavior, vehicle controller 7 can determine the next behavior with high accuracy without determining a specific travel environment, i.e., without performing labeling of travel environments.

It is to be noted that the driver model (situation database) may be constructed from the travel history in which the behavior selected by the driver during autonomous driving and the environmental parameters indicating the travel environment when this behavior is presented are associated with each other. Alternatively, the driver model (situation database) may be constructed from the travel history in which the behavior selected by the driver during autonomous driving and the environmental parameters indicating the travel environment when the vehicle performs this behavior are associated with each other.

When the environmental parameters indicate the travel environment when the vehicle performs the behavior selected by the driver, the following configuration may be applied. Specifically, environmental parameters indicating a future travel environment are predicted from the environmental parameters indicating the current travel environment. Then, from among the environmental parameters indicating the travel environment when the vehicle performs the behavior selected by the driver, the behavior associated with the environmental parameter most similar to the predicted environmental parameters may be determined as the first behavior, and some behaviors associated with the other similar environmental parameters may be determined as the second behavior.

For example, the above prediction is conducted by extrapolating the environmental parameters in the future from the environmental parameters indicating the travel environments at the present moment and before the present moment.

Alternatively, the driver model (situation database) may be constructed from both the travel history in which the behavior selected by the driver during autonomous driving and the environmental parameters indicating the travel environment when this behavior is presented are associated with each other, and the travel history in which the behavior selected by the driver during autonomous driving and the environmental parameters indicating the travel environment when the vehicle performs this behavior are associated with each other.

In this case, both of the travel histories are stored in the form illustrated in FIG. 28B for example, and vehicle controller 7 determines the next behavior from these travel histories. In this case, vehicle controller 7 may place priority between these travel histories, and may preferentially determine the next behavior from the travel history in which the behavior selected by the driver during autonomous driving and the environmental parameters indicating the travel environment when the vehicle performs this behavior are associated with each other.

Note that, in the present invention, the function similar to the function executed by vehicle controller 7 may be executed by a cloud server or a server device. Particularly, storage unit 8 may be mounted in a server device such as a cloud server, not in vehicle 1, because it has an enormous amount of data with accumulation of travel histories. Alternatively, storage unit 8 may store a driver model which has already been constructed, and vehicle controller 7 may determine a behavior by referring to the driver model stored in storage unit 8.

It is to be noted that, in the configuration in which storage unit 8 is mounted in a cloud server, a cache is desirably provided in case of storage unit 8 being inaccessible due to a drop in a communication speed or disruption of communication.

Figure 29:
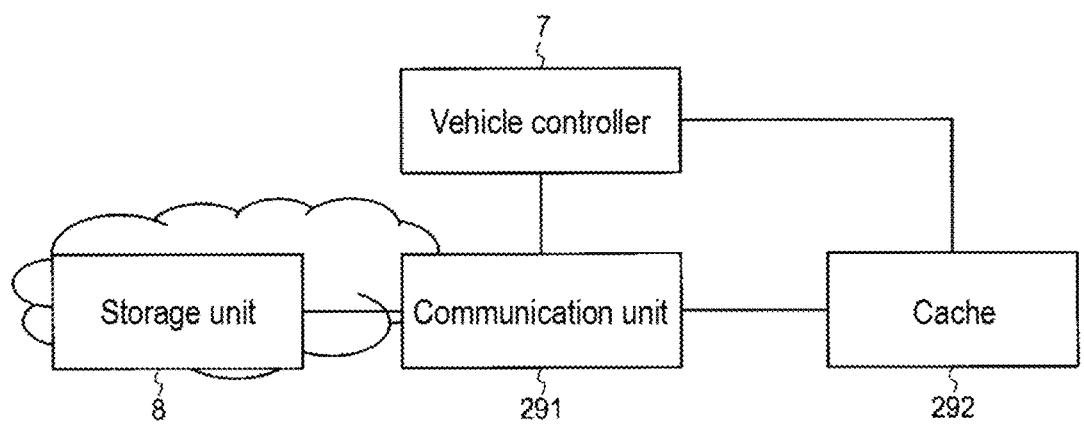
FIG. 29 is a block diagram illustrating one example of a cache arrangement in a modification of the driver model according to the fourth exemplary embodiment.

FIG. 29 is a block diagram illustrating one example of the arrangement of the cache. Vehicle controller 7 causes storage unit 8 to store the travel history through communication unit 291, and causes cache 292 to store a portion of the driver model (situation database) stored in storage unit 8 through communication unit 291.

Vehicle controller 7 accesses the driver model in cache 292. Conceivable methods for creating a cache in this case include a method for limitation according to presence or absence of an environmental parameter, a method using location information, and a method for processing data. Each of the methods will be described below.

Firstly, the method for limitation according to presence or absence of an environmental parameter will be described. It is possible to extract similar situations through comparison with surrounding situations, if there are sufficient travel environments (situations) having only the same environmental parameters. Therefore, vehicle controller 7 extracts travel environments having only the same environmental parameters from among the travel environments stored in storage unit 8, sorts these travel environments, and holds the resultant in cache 292.

In this case, vehicle controller 7 updates a primary cache at the timing at which the environmental parameters acquired from the detected situation are changed. According to this process, vehicle controller 7 can extract similar surrounding conditions even if the communication speed drops. Notably, the environmental parameters which are determined to be changed or not may be all environmental parameters or some of the environmental parameters described previously.

Moreover, because the environmental parameters vary from hour to hour, a primary cache and a secondary cache may be prepared in cache 292. For example, vehicle controller 7 holds travel environments having the same environmental parameters in the primary cache. Further, vehicle controller 7 holds, in the secondary cache, at least one of a travel environment in which one environmental parameter is added to the travel environment held in the primary cache and a travel environment in which one environmental parameter is reduced from the travel environment held in the primary cache.

Accordingly, vehicle controller 7 can extract a similar situation only by using the data in cache 292, even if temporal communication disruption occurs.

Figure 30:
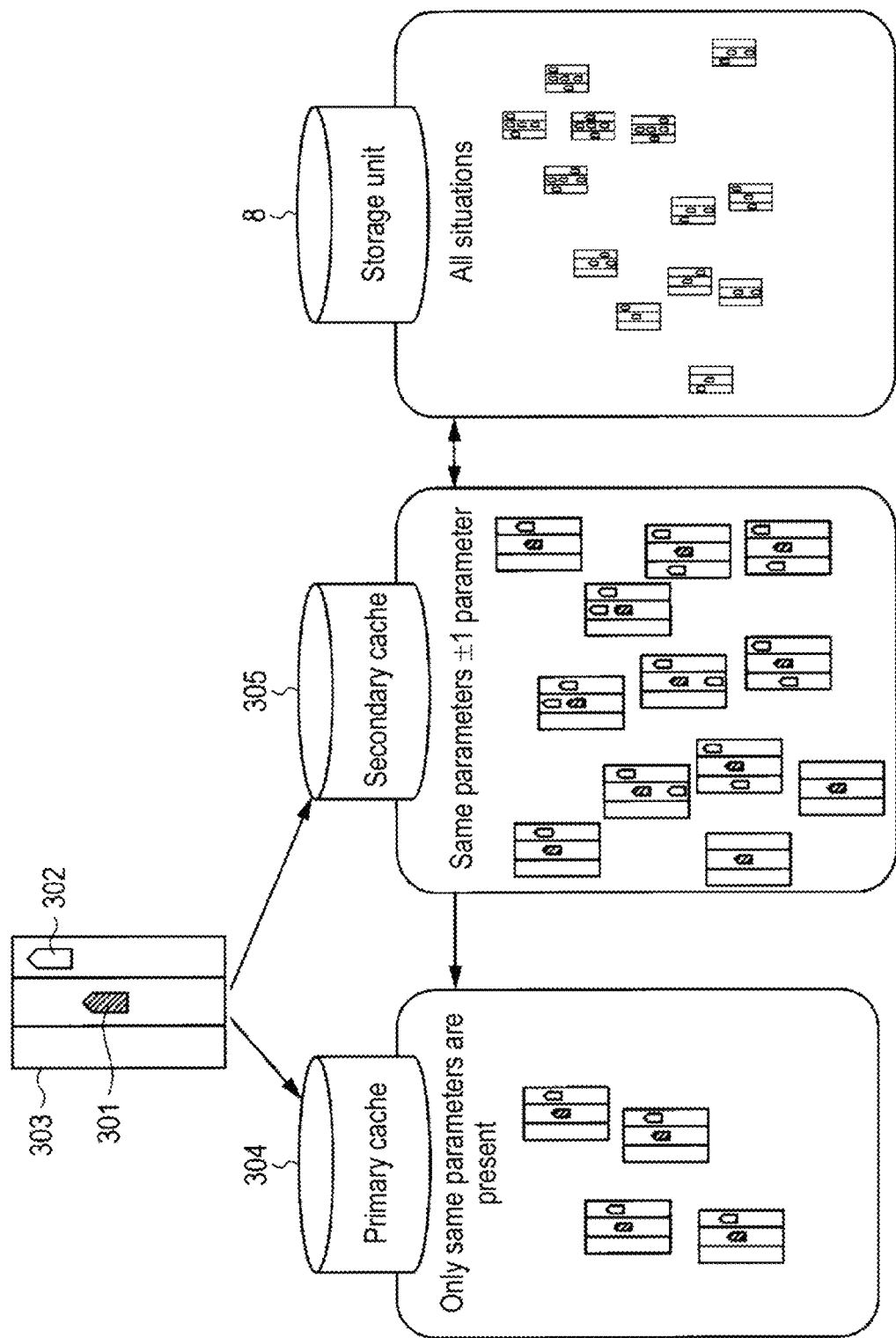
FIG. 30 is a diagram illustrating one example of a method for generating a cache in the modification of the driver model according to the fourth exemplary embodiment.

This case will be more specifically described with reference to FIG. 30. When sensor 62 detects surrounding situation 303 in which only adjacent leading vehicle 302 is present around host vehicle 301, vehicle controller 7 extracts travel environments (travel environments having the same environmental parameters) where only adjacent leading vehicle 302 is present, from storage unit 8 in which all travel environments (situations) stored, and stores the extracted travel environments in primary cache 304.

In addition, vehicle controller 7 extracts a travel environment where only one vehicle other than adjacent leading vehicle 302 is added (travel environment where one environmental parameter is added to the same environmental parameter) or a travel environment where there is no adjacent leading vehicle 302 (travel environment where one environmental parameter is reduced from the same environmental parameters) from storage unit 8, and stores the extracted travel environments in secondary cache 305.

When surrounding situation 303 detected by sensor 62 is changed, vehicle controller 7 copies the travel environment corresponding to changed surrounding situation 303 to primary cache 304 from secondary cache 305, extracts, from storage unit 8, a travel environment where one environmental parameter is added and a travel environment where one environmental parameter is reduced relative to the travel environment corresponding to changed surrounding situation 303, and stores the extracted travel environments into secondary cache 305. Thus, vehicle controller 7 updates secondary cache 305. Accordingly, vehicle controller 7 can smoothly extract more similar surrounding situation through comparison with the surrounding situations.

Next, the method using location information will be described. When location information is included in environmental parameters, vehicle controller 7 can extract, from storage unit 8, the travel environment (situation) where the location indicated by the location information is included within a certain range around the location of the host vehicle, and store the extracted travel environment in cache 292.

In this case, vehicle controller 7 updates cache 292 when the location indicated by the location information corresponding to the travel environment falls outside the certain range. Accordingly, vehicle controller 7 can extract a similar surrounding situation as long as the location falls within a certain range, even if long-term communication disruption occurs.

In addition, the method for processing data will be described. Operation histories including environmental parameters are accumulated in storage unit 8. Vehicle controller 7 divides the respective environmental parameters for each predetermined range to form a mesh on a multidimensional space. Then, vehicle controller 7 creates a table in which behaviors included in each mesh are counted for each type.

Figures 31A, 31B:
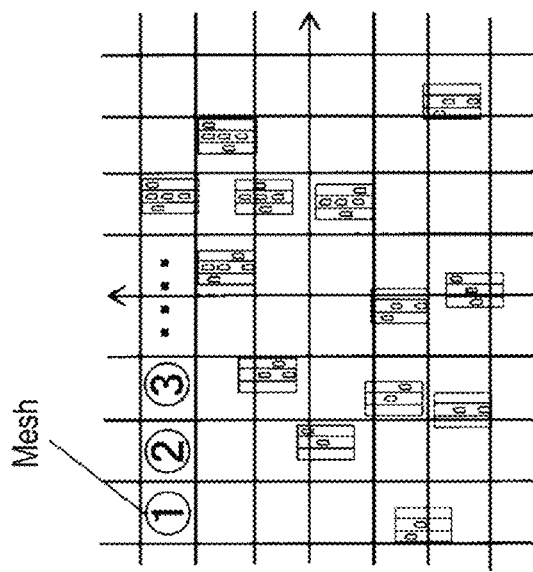
FIG. 31A is a diagram illustrating one example of a method for generating a cache in the modification of the driver model according to the fourth exemplary embodiment.
FIG. 31B is a diagram illustrating one example of a method for generating a cache in the modification of the driver model according to the fourth exemplary embodiment.

A description will be given of the case where the environmental parameters to be used are limited to two, for example. Vehicle controller 7 maps the environmental parameters included in the operation history on a plane as illustrated in FIG. 31A, and each axis is equally divided, whereby the plane is divided into a plurality of blocks. This is called a mesh.

Vehicle controller 7 counts the number of behaviors included in each mesh for each type (for example, the type such as acceleration, deceleration, lane change, or overtake). FIG. 31B illustrates a table where the number of behaviors included in each mesh is counted for each type.

Vehicle controller 7 stores this content in cache 292. Then, when extracting similar surrounding situation through the comparison with surrounding situations, vehicle controller 7 determines in which mesh the detected environmental parameter is located, selects the behavior having the highest number from the behaviors included in the determined mesh, and determines the selected behavior as the behavior to be provided as notification.

For example, when determining that the detected environmental parameter is located in No. 3 mesh, vehicle controller 7 determines operation of the behavior (here, "acceleration") showing the highest number among the behaviors included in the No. 3 mesh as the behavior to be provided as notification. If this method is used, cache 292 can be updated at any timing, and the capacity of cache 292 can be made constant.

The cache is created by using one of these methods or a combination thereof. It is to be noted that the methods described above are merely one example, and the method for creating a cache is not limited thereto.

The above is an example of extending the driver model according to the fourth exemplary embodiment. In this example, vehicle controller 7 acquires information about characteristic amounts indicating a driver's driving characteristic including information about a previous travel environment, storage unit 8 stores the information about characteristic amounts, and when it is determined that a vehicle behavior is needed to be changed, vehicle controller 7 determines information similar to characteristic amounts indicating the driver's driving characteristic including information about a newly-acquired travel environment, from the information about characteristic amounts stored in storage unit 8, and provides notification regarding the behavior corresponding to the determined information.

In addition, the following configuration may be applied to the example of extending the driver model according to the fourth exemplary embodiment. It is configured such that the information about characteristic amounts indicating the driver's driving characteristic including the information about the previous travel environment is at least one of information about characteristic amounts when a vehicle behavior is presented to the driver and information about characteristic amounts when the driver performs behavior selection.

In addition, the following configuration is applied to the example of extending the driver model according to the fourth exemplary embodiment. Specifically, when the information about characteristic amounts indicating the driver's driving characteristic including the information about the previous travel environment is both the information about characteristic amounts when a vehicle behavior is presented to the driver and the information about characteristic amounts when the driver performs behavior selection, vehicle controller 7 determines information similar to characteristic amount indicating the driver's driving characteristic including information about a newly-acquired travel environment, from both information items of characteristic amounts, and provides notification regarding the behavior corresponding to the determined information.

In addition, the following configuration is applied to the example for extending the driver model according to the fourth exemplary embodiment. Specifically, when the information about characteristic amounts indicating the driver's driving characteristic including the information about the previous travel environment is both the information about characteristic amounts when a vehicle behavior is presented to the driver and the information about characteristic amounts when the driver performs behavior selection, vehicle controller 7 determines information similar to characteristic amounts indicating the driver's driving characteristic including information about a newly-acquired travel environment, preferentially from the information about characteristic amounts when the driver performs behavior selection, and provides notification regarding the behavior corresponding to the determined information.

In addition, in the example of extending the driver model according to the fourth exemplary embodiment, the information about characteristic amounts indicating the driver's driving characteristic including the information about the previous travel environment is information about characteristic amounts indicating the driver's driving characteristic when the vehicle is under autonomous driving and/or under manual driving.

Accordingly, vehicle controller 7 can construct a driver model more suitable for the driving tendency of the driver, and can perform autonomous driving more appropriate for the driver based on the constructed driver model. Due to the association between parameters indicating the travel environment and the behavior, vehicle controller 7 can determine the next behavior with high accuracy without requiring a process for determining a specific travel environment, i.e., without performing labeling of travel environments.

Common Description for Fifth and Sixth Exemplary Embodiments

Recently, development pertaining to autonomous driving for motor vehicles has been advanced. According to the levels of vehicle automation defined by National Highway Traffic Safety Administration (NHTSA) in 2013, vehicle automation is classified into no automation (level 0), function-specific automation (level 1), combined function automation (level 2), limited self-driving automation (level 3), and full self-driving automation (level 4). The level 1 is a driving assistance system autonomously performing one of acceleration, deceleration, and steering, and level 2 is a driving assistance system autonomously performing two or more of acceleration, deceleration, and steering in unison. In either case, driver intervention for a driving operation is required. The level 4 is a full self-driving automation system autonomously performing all of acceleration, deceleration, and steering, and the driver does not intervene the driving operation. The level 3 is a limited self-driving automation system autonomously performing all of acceleration, deceleration, and steering, but the driver performs a driving operation according to need.

The exemplary embodiments below mainly provide a device (hereinafter also referred to as a "driving assistance device") that controls a human machine interface (HMI) for providing/receiving information pertaining to autonomous driving of the vehicle to/from a driver or an occupant of the vehicle (a driver or an occupant is referred to as an occupant below). The technologies described in the fifth and sixth exemplary embodiments pertain to, when presenting an action candidate of the vehicle to an occupant in a vehicle during autonomous driving of the vehicle, presenting a basis that the action should be executed or the action should not be executed together with the action candidate. "Actions" of the vehicle in the description below correspond to "behaviors" of the vehicle in the description of the first to fourth exemplary embodiments, and include an activation state such as steering or braking while the vehicle is traveling or stopped, or a control content pertaining to autonomous driving control, during autonomous driving or manual driving. The "actions" include constant-speed driving, acceleration, deceleration, temporarily stop, stop, lane change, route change, right/left turn, parking, etc., for example. In addition, the travel environment includes at least one of the surrounding condition and the travel state of the vehicle.

Figure 32:
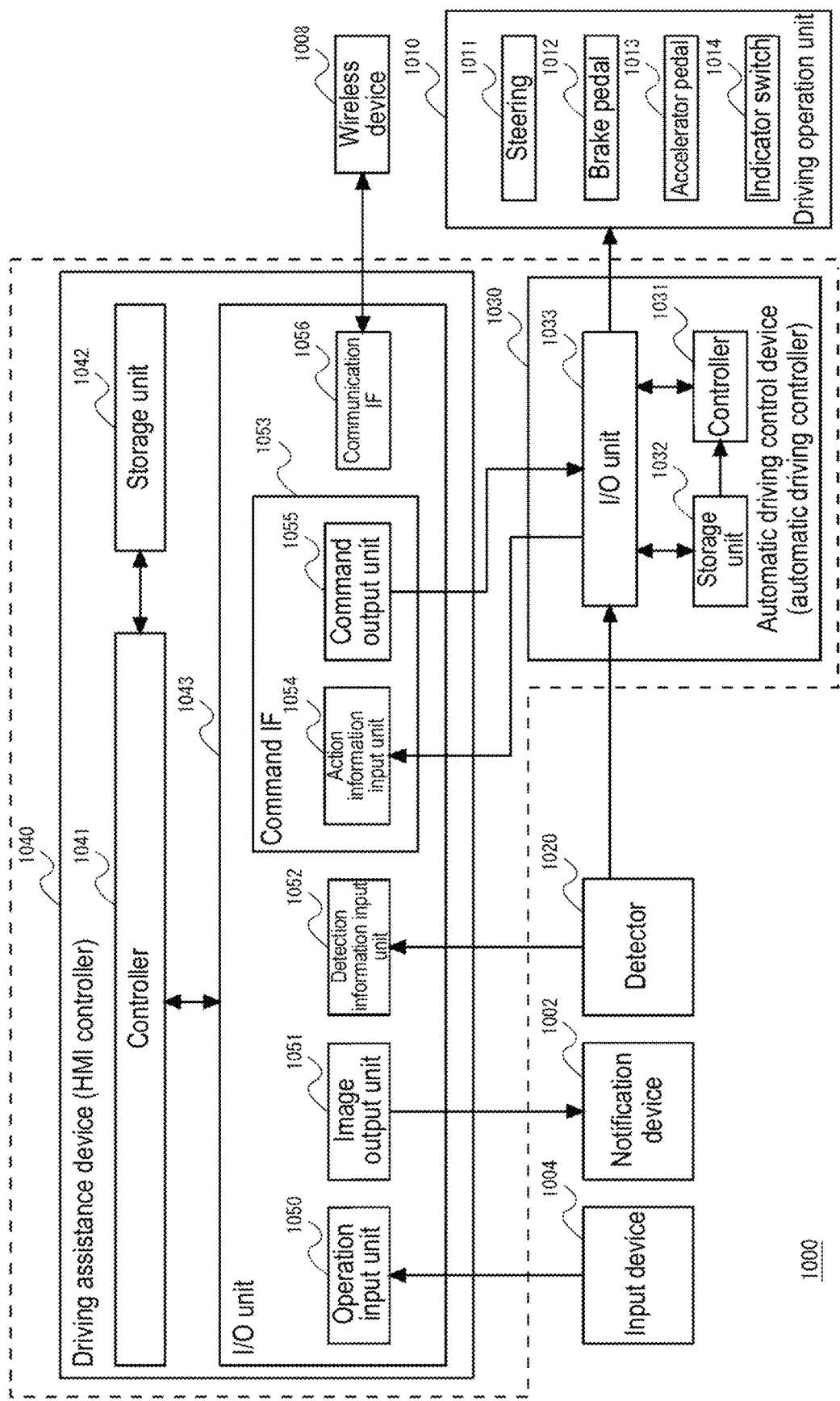
FIG. 32 is a block diagram illustrating a configuration of a vehicle according to fifth to sixth exemplary embodiments of the present invention.

Further, the action candidate is a candidate of an action of the vehicle presented to the occupant in the vehicle from notification device 1002 illustrated in FIG. 32. The action candidate may be determined by driving assistance device 1040 or by autonomous driving control device 1030 illustrated in FIG. 32. In addition, the number of the action candidates to be presented to the occupant may be one or more. When a plurality of action candidates is presented, they may include at least one recommended candidate. In addition, the action candidates to be presented may include all actions which can be executed in terms of performance of vehicle 1000 illustrated in FIG. 32, or the action candidates to be presented may be those excluding, from among actions which can be executed in terms of performance, an action which is inhibited from being executed based on at least one of the surrounding situation and travel state of vehicle 1000, road rules, and limitation derived from security.

FIG. 32 is a block diagram illustrating the configuration of vehicle 1000, showing the configuration pertaining to autonomous driving. Vehicle 1000 can travel in an autonomous driving mode, and includes notification device 1002, input device 1004, wireless device 1008, driving operating unit 1010, detector 1020, autonomous driving control device 1030, and driving assistance device 1040. The devices illustrated in FIG. 32 may be interconnected by exclusive lines or wire communication such as a controller area network (CAN). Alternatively, they may be interconnected by wire communication or wireless communication such as a Universal Serial Bus (USB), Ethernet (registered trademark), Wi-Fi (registered trademark), or Bluetooth (registered trademark).

Vehicle 1000 corresponds to vehicle 1 in the first to fourth exemplary embodiments. Notification device 1002 corresponds to information notification device 9 in FIGS. 1 and 13, input device 1004 corresponds to operating unit 51 in FIG. 1 and input unit 102 in FIG. 13, and detector 1020 corresponds to detector 6 in FIGS. 1 and 13. In addition, autonomous driving control device 1030 and driving assistance device 1040 correspond to vehicle controller 7 in FIGS. 1 and 13. Hereinafter, the description of the components which have already been described in the first to fourth exemplary embodiments will be omitted as appropriate.

Notification device 1002 is a user interface device for presenting information pertaining to the autonomous driving of the vehicle to an occupant. Notification device 1002 may be a head unit such as a car navigation system, or a display audio; a mobile terminal device such as a smartphone or a tablet; or an exclusive console terminal device. In addition, notification device 1002 may be a liquid crystal display, an organic EL display, or a head-up display (HUD). Input device 1004 is a user interface device that receives an operation input performed by an occupant. For example, input device 1004 receives information pertaining to autonomous driving of a host vehicle that is input by the occupant. Input device 1004 outputs the received information to driving assistance device 1040 as an operation signal.

Figure 33:
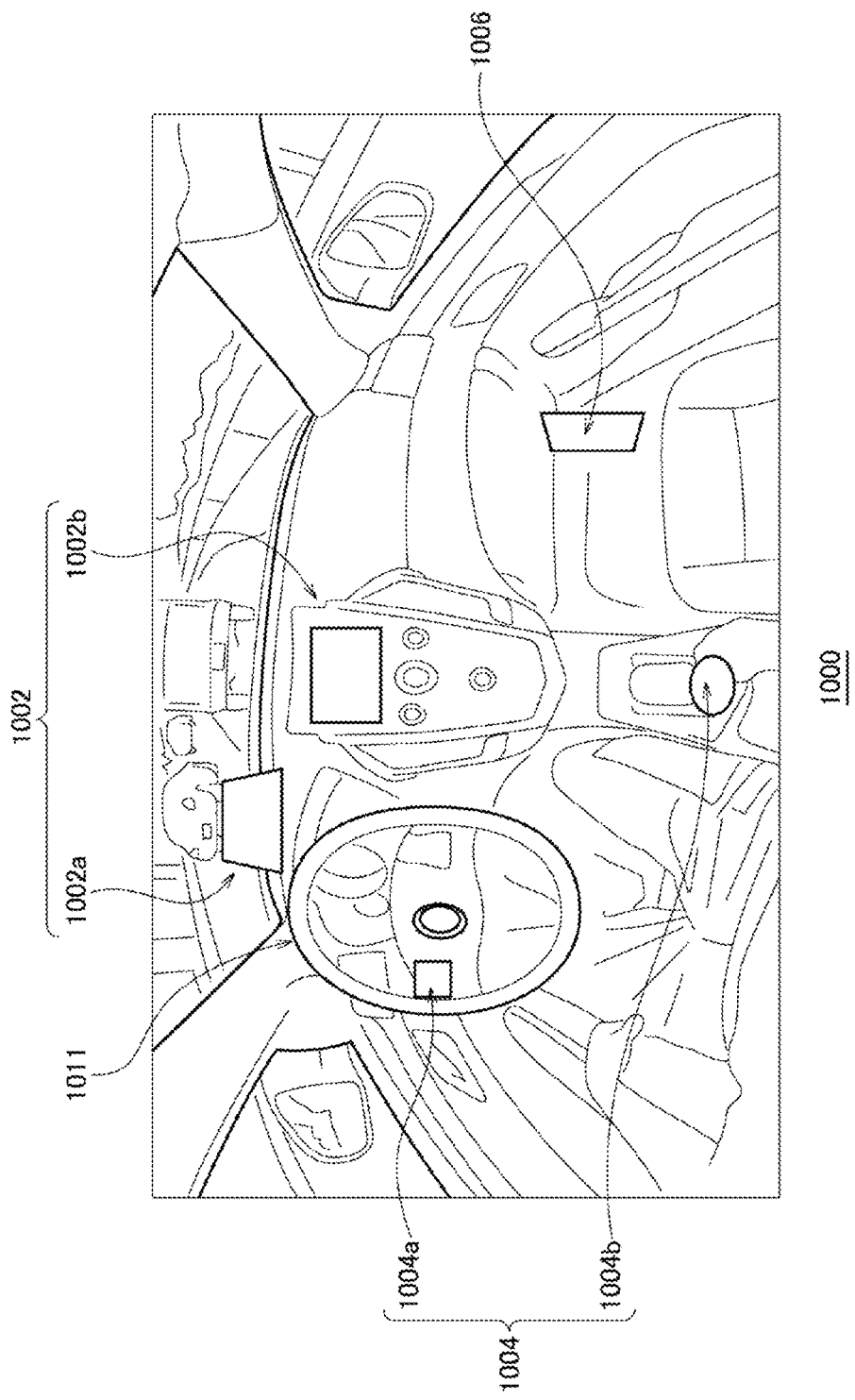
FIG. 33 is a diagram schematically illustrating an interior of the vehicle in FIG. 32.

Notification device 1002 notifies the occupant of information pertaining to travel of vehicle 1000. Notification device 1002 may be a display for displaying information, including a light emitting element such as a light emitting diode (LED) provided on, for example, a car navigation system, a head-up display, a center display, a steering wheel, a pillar, a dashboard, and the vicinity of an instrument panel. Notification device 1002 may also be a speaker for notifying the occupant of information by converting the information into a voice/sound or a vibrator provided on a position (for example, a seat for the occupant, steering wheel 5, and the like) where the occupant can sense the vibration. In addition, notification device 1002 may be a combination of these elements. The fifth and sixth exemplary embodiments will be described using a display device as one example. However, as illustrated in FIG. 33, speaker 1006 for presenting, with a voice/sound, information pertaining to autonomous driving to the occupant may be mounted on vehicle 1000. In this case, driving assistance device 1040 may cause notification device 1002 to display an image indicating information pertaining to autonomous driving, and in addition to or in place of this configuration, driving assistance device 1040 may output a voice/sound indicating the information pertaining to autonomous driving from speaker 1006.

FIG. 33 schematically illustrates an interior of vehicle 1000 in FIG. 32. Notification device 1002 may be head-up display (HUD) 1002*a* or center display 1002*b*. Input device 1004 may be first operating unit 1004*a* mounted to steering wheel 1011 or second operating unit 1004*b* mounted between a driver seat and a passenger seat. Note that notification device 1002 and input device 1004 may be integrated. For example, they may be mounted as a touch panel display.

Returning to FIG. 32, wireless device 1008 is adapted to a mobile phone communication system, Wireless Metropolitan Area Network (WMAN), or the like, and executes wireless communication with a device (not illustrated) outside of vehicle 1000. Driving operating unit 1010 includes steering 1011, brake pedal 1012, accelerator pedal 1013, and indicator switch 1014. Steering 1011 corresponds to steering wheel 5 in FIGS. 1 and 13, brake pedal 1012 corresponds to brake pedal 2 in FIGS. 1 and 13, accelerator pedal 1013 corresponds to accelerator pedal 3 in FIGS. 1 and 13, and indicator switch 1014 corresponds to indicator lever 4 in FIGS. 1 and 13.

Steering 1011, brake pedal 1012, accelerator pedal 1013, and indicator switch 1014 can be electronically controlled respectively by a steering ECU, a brake ECU, an engine ECU and a motor ECU, and an indicator controller. In an autonomous driving mode, the steering ECU, the brake ECU, the engine ECU, and the motor ECU drive actuators according to control signals supplied from autonomous driving control device 1030. In addition, the indicator controller turns on or off an indicator lamp according to a control signal supplied from autonomous driving control device 1030.

Detector 1020 detects a surrounding situation and a travel state of vehicle 1000. As has been partially mentioned in the first to fourth exemplary embodiments, for example, detector 1020 detects a speed of vehicle 1000, relative speed of a leading vehicle relative to vehicle 1000, distance between vehicle 1000 and the leading vehicle, relative speed of a vehicle in the adjacent lane relative to vehicle 1000, distance between vehicle 1000 and the vehicle in the adjacent lane, and location information of vehicle 1000. Detector 1020 outputs detected various information items (hereinafter referred to as "detection information") to autonomous driving control device 1030 and driving assistance device 1040. Note that the detail of detector 1020 will be described later.

Autonomous driving control device 1030 is an autonomous driving controller having mounted thereto an autonomous driving control function, and determines an action of vehicle 1000 in autonomous driving. Autonomous driving control device 1030 includes controller 1031, storage unit 1032, and input/output unit (I/O unit) 1033. The configuration of controller 1031 can be achieved by collaboration of a hardware resource and a software resource, or by a hardware resource alone. Available hardware resources include a processor, a ROM, a RAM, and other LSI, and available software resources include a program such as an operating system, an application, and firmware. Storage unit 1032 has a non-volatile recording medium such as a flash memory. I/O unit 1033 executes communication control according to various communication formats. For example, I/O unit 1033 outputs information pertaining to autonomous driving to driving assistance device 1040, and receives a control command from driving assistance device 1040. I/O unit 1033 also receives detection information from detector 1020.

Controller 1031 applies the control command input from driving assistance device 1040 and various information items collected from detector 1020 or various ECUs to an autonomous driving algorithm, thereby calculating a control value for controlling a target to be autonomously controlled such as a travel direction of vehicle 1000. Controller 1031 transmits the calculated control value to the ECU or the controller for each of the targets to be controlled. In the present exemplary embodiment, controller 1031 transmits the calculated control value to the steering ECU, the brake ECU, the engine ECU, and the indicator controller. It is to be noted that, in an electric vehicle or a hybrid car, controller 1031 transmits the control value to the motor ECU in place of or in addition to the engine ECU.

Driving assistance device 1040 is an HMI controller executing an interface function between vehicle 1000 and an occupant, and includes controller 1041, storage unit 1042, and I/O unit 1043. Controller 1041 executes a variety of data processing such as HMI control. Controller 1041 can be achieved by collaboration of a hardware resource and a software resource, or by a hardware resource alone. Available hardware resources include a processor, a ROM, a RAM, and other LSI, and available software resources include a program such as an operating system, an application, and firmware.

Storage unit 1042 is a storage area for storing data that will be referred to or updated by controller 1041. For example, storage unit 1042 is implemented by a non-volatile recording medium such as a flash memory. I/O unit 1043 executes various communication controls according to various communication formats. I/O unit 1043 is provided with operation input unit 1050, image output unit 1051, detection information input unit 1052, command interface (IF) 1053, and communication IF 1056.

Operation input unit 1050 receives, from input device 1004, an operation signal by an operation performed to input device 1004 by an occupant or a user outside of the vehicle, and outputs this operation signal to controller 1041. Image output unit 1051 outputs image data generated by controller 1041 to notification device 1002 and causes notification device 1002 to display this image data. Detection information input unit 1052 receives, from detector 1020, information (hereinafter referred to as "detection information") which is the result of the detection process performed by detector 1020 and indicates the current surrounding situation and travel state of vehicle 1000, and outputs the received information to controller 1041.

Command IF 1053 executes an interface process with autonomous driving control device 1030, and includes action information input unit 1054 and command output unit 1055. Action information input unit 1054 receives information, pertaining to autonomous driving of vehicle 1000, transmitted from autonomous driving control device 1030, and outputs the received information to controller 1041. Command output unit 1055 receives, from controller 1041, a control command which indicates the manner of autonomous driving to autonomous driving control device 1030, and transmits this command to autonomous driving control device 1030.

Communication IF 1056 executes an interface process with wireless device 1008. Communication IF 1056 transmits the data output from controller 1041 to wireless device 1008, and transmits this data to the external device from wireless device 1008. In addition, communication IF 1056 receives data transmitted from the external device and transferred by wireless device 1008, and outputs this data to controller 1041.

Note that autonomous driving control device 1030 and driving assistance device 1040 are configured as individual devices. As a modification, autonomous driving control device 1030 and driving assistance device 1040 may be integrated into one controller as indicated by a broken line in FIG. 32. In other words, a single driving control device may have both the functions of autonomous driving control device 1030 and driving assistance device 1040 in FIG. 32. In this case, a plurality of ECUs is provided in the integrated controller, wherein one ECU may achieve the function of autonomous driving control device 1030, and the other one may achieve the function of driving assistance device 1040. In addition, one ECU in the integrated controller may execute a plurality of operating systems (OSs), wherein one OS may achieve the function of autonomous driving control device 1030 and the other one may achieve the function of driving assistance device 1040.

Figure 34:
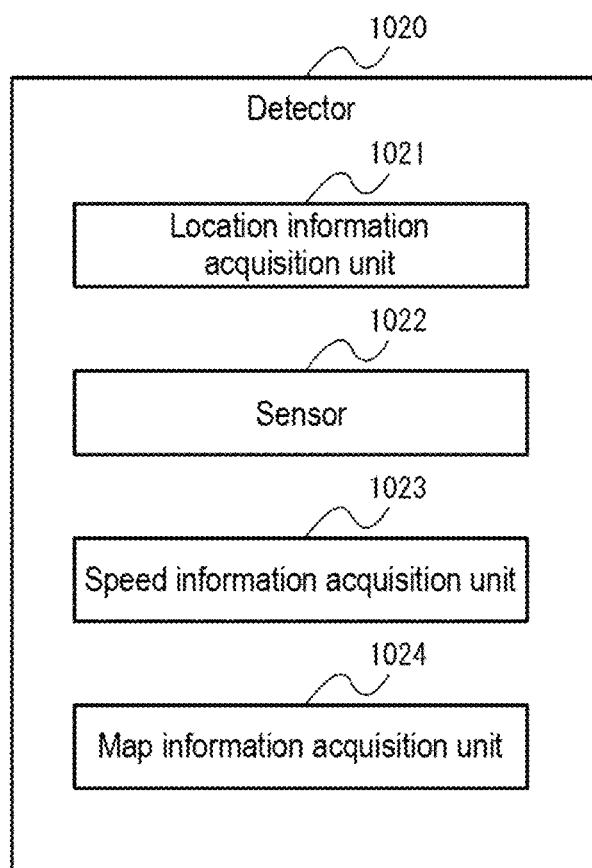
FIG. 34 is a block diagram illustrating a detailed configuration of a detector in FIG. 32.

FIG. 34 is a block diagram illustrating the detailed configuration of detector 1020 in FIG. 32. Detector 1020 includes location information acquisition unit 1021, sensor 1022, speed information acquisition unit 1023, and map information acquisition unit 1024. Location information acquisition unit 1021 acquires the current location of vehicle 1000 from a GPS receiver.

Sensor 1022 is a general term for various sensors for detecting a situation outside of the vehicle and the state of vehicle 1000. Examples of sensors to be mounted for detecting the situation outside of the vehicle include a camera, a millimeter-wave radar, light detection and ranging or laser imaging detection and ranging (LIDAR), an ambient temperature sensor, an atmospheric pressure sensor, a humidity sensor, and an illuminance sensor. The situation outside the vehicle includes a road condition, including lane information, of a road in which a host vehicle is traveling, an environment including weather, a surrounding situation of the host vehicle, and nearby vehicles (such as nearby vehicles traveling in the adjacent lane) present near the host vehicle. Note that the situation outside the vehicle may be anything which is information about an outside of the vehicle detectable by the sensor. In addition, as sensors for detecting the state of vehicle 1000, for example, an acceleration sensor, a gyro sensor, a geomagnetic sensor, an inclination sensor, and the like are mounted.

Speed information acquisition unit 1023 acquires the current speed of vehicle 1000 from a speed sensor. Map information acquisition unit 1024 acquires map information around the current location of vehicle 1000 from a map database. The map database may be recorded in a recording medium in vehicle 1000, or downloaded from a map server via a network when being used. Hereinafter, each exemplary embodiment will be described.

Figure 35:
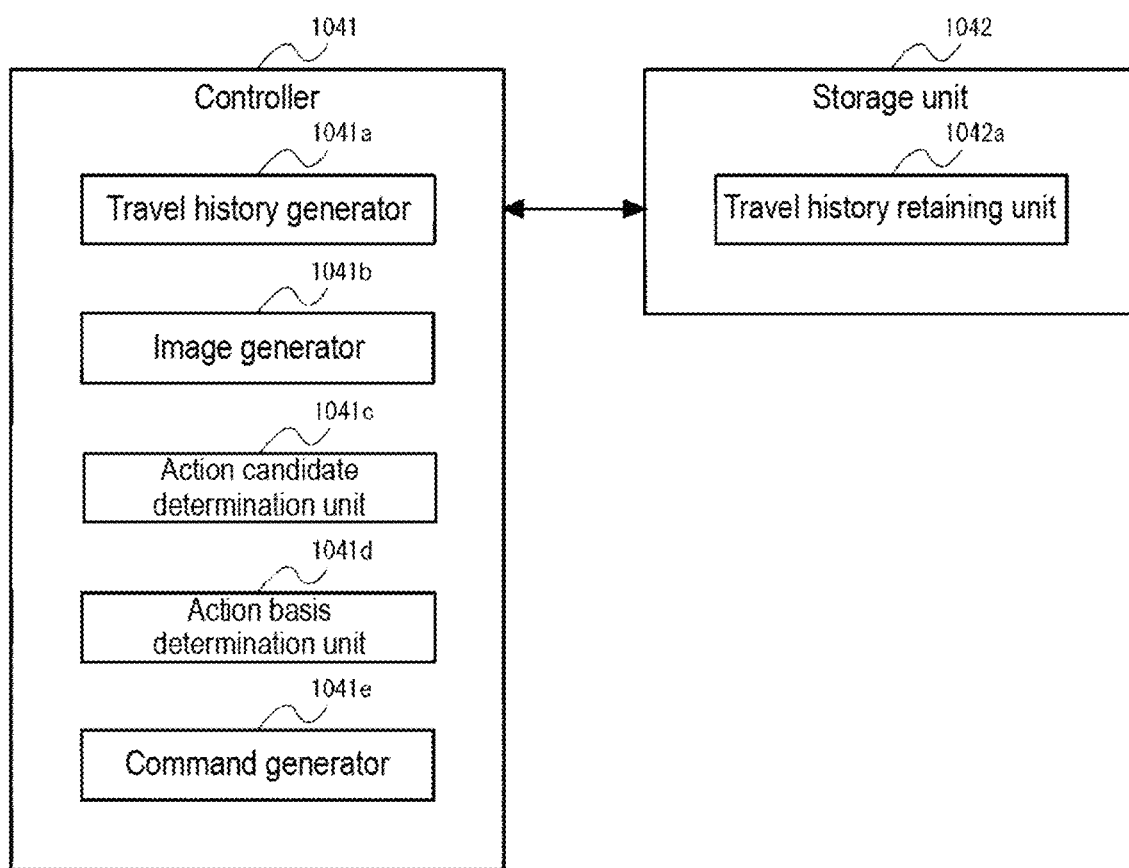
FIG. 35 is a block diagram illustrating a detailed configuration of a controller and a storage unit in a driving assistance device.

FIG. 35 is a block diagram illustrating the detailed configuration of controller 1041 and storage unit 1042 in driving assistance device 1040. Controller 1041 includes travel history generator 1041*a*, image generator 1041*b*, action candidate determination unit 1041*c*, action basis determination unit 1041*d*, and command generator 1041*e*. Storage unit 1042 includes travel history retaining unit 1042*a*. The detailed description for each unit will be described later.

Fifth Exemplary Embodiment

Firstly, the fifth exemplary embodiment is summarized. In the fifth exemplary embodiment, an overhead image indicating the host vehicle and the surrounding situation thereof and an action selection image indicating action candidates of the vehicle are separately displayed. For example, the overhead image is displayed in center display 1002*b* in FIG. 33, and the action selection image is displayed in HUD 1002*a*. While the configuration in which they are displayed in different screens is described as one example, they may be displayed in different regions in one screen, or they may be displayed as partially overlapping each other in one screen. In the fifth exemplary embodiment, a recommended action candidate is displayed in the action selection image. When any one of the action candidates displayed in the action selection image is selected by an occupant, a travel-environmental basis that the selected action candidate should be executed or is to be executed is displayed in the overhead image. The basis is determined based on a travel history. Note that, even if the occupant selects no candidate, the bases for the action candidates may sequentially be displayed.

The details which have already been described in the previous exemplary embodiments will be omitted below as appropriate. The configurations or operations described in the present exemplary embodiment can be combined with or replaced with configurations or operations described in other exemplary embodiments or modifications without departing from the spirit of the present invention.

FIG. 36 is a diagram illustrating one example of a travel history accumulated in travel history retaining unit 1042*a* according to the fifth exemplary embodiment. Travel history generator 1041*a* generates a travel history by associating the action executed by vehicle 1000 based on the action selection performed by the occupant with values of a plurality of environmental parameters for specifying the travel environment when the action is executed, and accumulates the generated travel history in travel history retaining unit 1042*a*. The travel environment when the action is executed is specified by detection information input from detection information input unit 1052. As illustrated in FIG. 36, an action selection history of the occupant and values of parameters of the host vehicle and the surrounding environment of the host vehicle when the action is selected are accumulated as a database. FIG. 36 is a diagram obtained by modifying a portion of the travel history illustrated in FIG. 27, and the description of each environmental parameter in FIG. 27 is directly applied to FIG. 36.

Figure 37:
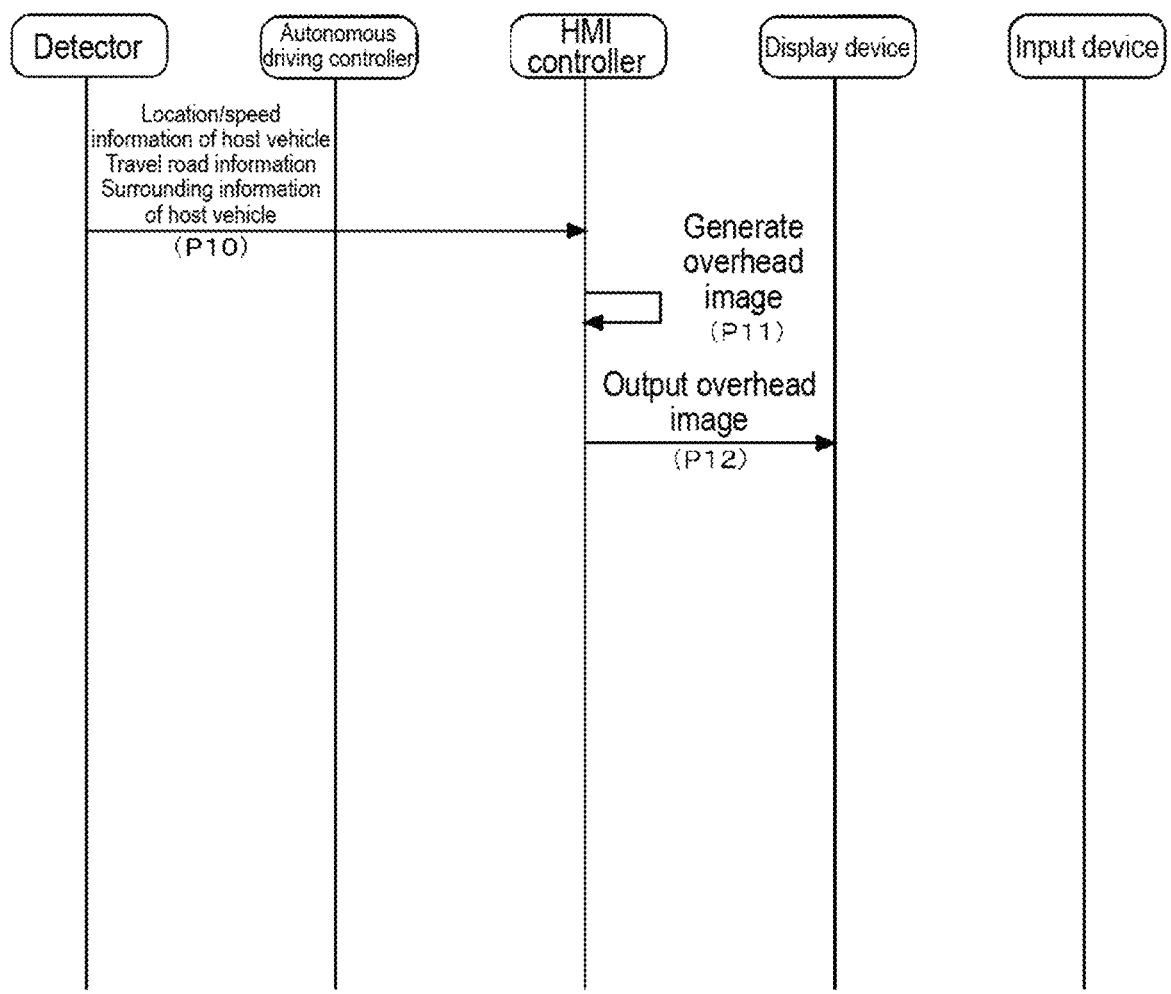
FIG. 37 is a sequence diagram illustrating an example of a process pertaining to displaying an overhead image according to the fifth exemplary embodiment.

FIG. 37 is a sequence diagram illustrating an example of a process pertaining to displaying an overhead image according to the fifth exemplary embodiment. Detector 1020 detects location/speed information of the host vehicle, information of a road on which the host vehicle is traveling, and surrounding information of the host vehicle, and outputs these information items to the HMI controller (driving assistance device 1040) (P10). Note that these detection information items may be input to the HMI controller via the autonomous driving controller (autonomous driving control device 1030).

Image generator 1041*b* in the HMI controller generates an overhead image based on the detection information input from detector 1020 (P11). Image generator 1041b generates an overhead image having a composition from which the occupant can understand at once the relation between the location of the host vehicle and locations of nearby vehicles on the road. Image output unit 1051 outputs the generated overhead image to notification device 1002 (for example, center display 1002b) (P12). The sequence described above is repeatedly executed at predetermined time intervals.

Figures 38, 39:
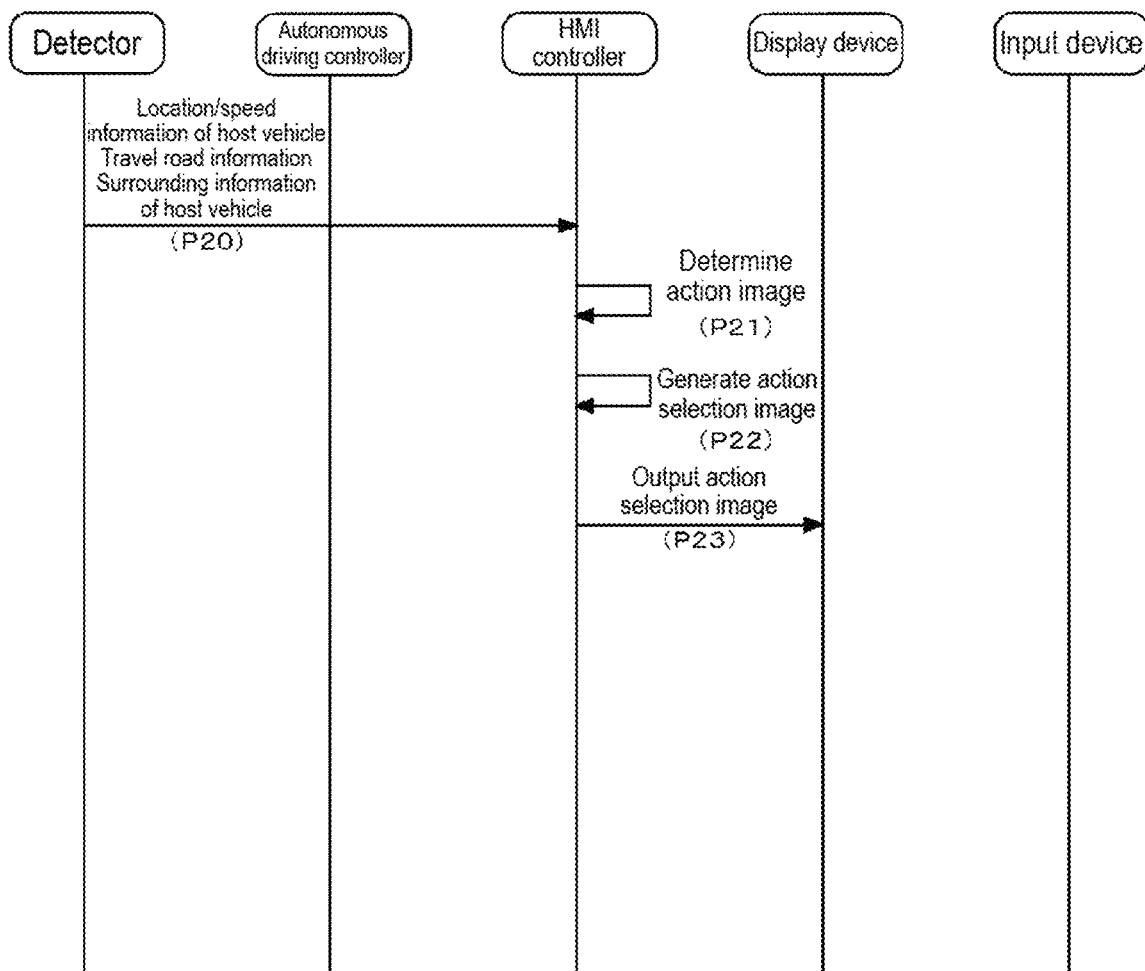
FIG. 38 is a sequence diagram illustrating an example of a process pertaining to displaying an action selection image according to the fifth exemplary embodiment.
FIG. 39 is a diagram illustrating one example of a parameter aggregate table generated based on the travel history illustrated in FIG. 36 according to the fifth exemplary embodiment.

FIG. 38 is a sequence diagram illustrating an example of a process for displaying an action selection image according to the fifth exemplary embodiment. Detector 1020 detects location/speed information of the host vehicle, information of a road on which the host vehicle is traveling, and surrounding information of the host vehicle, and outputs these information items to the HMI controller (driving assistance device 1040) (P20). Note that these detection information items may be input to the HMI controller via the autonomous driving controller (autonomous driving control device 1030).

Action candidate determination unit 1041c in the HMI controller determines an action candidate of vehicle 1000 based on the detection information input from detector 1020 and the travel history retained in travel history retaining unit 1042a (P21). The specific example of the action candidate determination process will be described later. Image generator 1041b generates the action selection image based on the determined action candidate (P22). Image output unit 1051 outputs the generated action candidate image to notification device 1002 (for example, HUD 1002a) (P23). The sequence described above is repeatedly executed at predetermined time intervals.

FIG. 39 is a diagram illustrating one example of a parameter aggregate table created based on the travel history illustrated in FIG. 36 according to the fifth exemplary embodiment. Action candidate determination unit 1041c creates, as basic data for determining an action candidate to be presented to the occupant, the parameter aggregate table based on the travel history retained in travel history retaining unit 1042a. Action candidate determination unit 1041c aggregates, for each specified action, the number of times the action is selected for each level of each environmental parameter.

In FIG. 39, regarding speed Va of the host vehicle when "acceleration" is selected, "acceleration" is selected four times for the level 1, twice for the level 2, twice for the level 3, once for the level 4, . . . , for example. This shows that, the lower the level of speed Va of the host vehicle is (the slower the host vehicle is), the more frequently "acceleration" is selected.

While in FIGS. 36 and 39, "lane change to right" and "lane change to left" are not distinguished from each other for simplifying the table, "lane change to right" and "lane change to left" are actually distinguished from each other and accumulated as a database.

FIGS. 40A to 40C are diagrams for describing one example of a process for determining an action candidate and a recommended action according to the fifth exemplary embodiment. FIG. 40A illustrates an overhead image indicating the location of host vehicle 1101 and the location of leading vehicle 1102 on a road. In the overhead image, host vehicle 1101 and leading vehicle 1102 are indicated as icons.

Notably, various display manners are conceivable for displaying the surrounding situation including the host vehicle, nearby vehicles, and road. A video image may be used or an elaborate CG image or an animation image may be used. It is not limited to display the host vehicle by using an icon. The host vehicle may be displayed using a simpler mark or character, or using a video image. Specifically, it is only necessary that the host vehicle is displayed as an object in a screen in any display manner. The same is applied to the display of nearby vehicles or other objects.

FIG. 40B is a diagram illustrating values of the respective environmental parameters based on the current detection information detected by detector 1020. The level of speed Va of host vehicle 1101 is 4. The level of relative speed Vba of leading vehicle 1102 relative to host vehicle 1101 is 1, the level of distance DRba between these vehicles is 2, and the level of rate of change RSb of the size of leading vehicle 1102 is 4. There are lanes present.

FIG. 40C is a parameter aggregate table created by action candidate determination unit 1041c, and it is the same as the table in FIG. 39. Action candidate determination unit 1041c selects columns corresponding to the current values (levels) of the environmental parameters in the parameter aggregate table based on the current detection information. The selected columns are enclosed by a thick line in FIG. 40C.

Action candidate determination unit 1041c sums the values (number of selected times) of the selected columns for each action (for each row). In the example illustrated in FIG. 40C, action candidate determination unit 1041c calculates 1+1+1+ . . . for "acceleration", 5+4+3+ . . . for "deceleration", and 2+6+2+ . . . for "lane change". Action candidate determination unit 1041c determines, as an action candidate, the action in which the total of the number of selected times is equal to or larger than a threshold. Action candidate determination unit 1041c also determines, as a recommended action, the action in which the total of the number of selected times is the maximum.

Figure 41A:
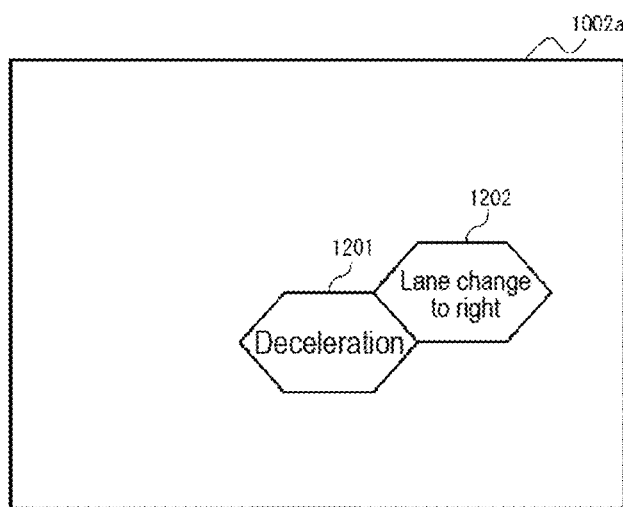
FIG. 41A is a view for describing one example of a process for determining an action candidate and a recommended action according to the fifth exemplary embodiment.
Figure 41B:
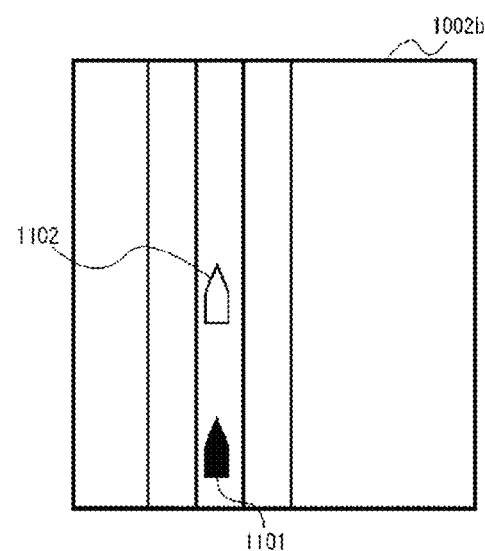
FIG. 41B is a view for describing one example of a process for determining an action candidate and a recommended action according to the fifth exemplary embodiment.

FIGS. 41A and 41B are views for describing one example of the process for determining an action candidate and a recommended action according to the fifth exemplary embodiment. FIG. 41A illustrates an action selection image, and FIG. 41B illustrates an overhead image. The overhead image illustrated in FIG. 41B is the same as the overhead image illustrated in FIG. 40A. FIG. 41A illustrates an example in which action candidate determination unit 1041c determines "deceleration" and "lane change to right" as action candidates, and determines "deceleration" as the recommended action. "Acceleration" and "lane change to left" are excluded from the action candidates, for example.

Image generator 1041b generates an action selection image including "deceleration" 1201 and "lane change to right" 1202 which are action candidates determined by action candidate determination unit 1041c. Image generator 1041b generates an action selection image in which the recommended action in a plurality of action candidates is highlighted. For example, image generator 1041b displays the character of the recommended action in a visible color or in boldface. In FIG. 41A, the character of "deceleration" 1201 which is the recommended action is displayed in boldface. FIG. 41A illustrates an example where the action candidate is displayed as a panel key including a character. However, the action candidate may be displayed as an icon or a mark.

Figure 42:
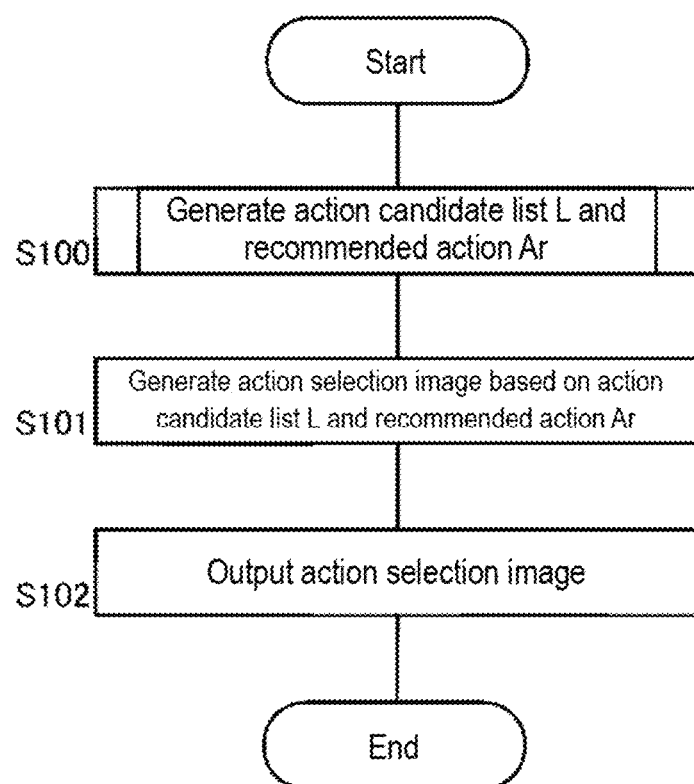
FIG. 42 is a flowchart illustrating a flow of a process up to displaying an action selection image based on current detection information according to the fifth exemplary embodiment.

FIG. 42 is a flowchart illustrating the flow of the process up to displaying the action selection image based on the current detection information according to the fifth exemplary embodiment. Action candidate determination unit 1041c generates action candidate list L and recommended action Ar based on the parameter aggregate table and the currently detected values (levels) of the environmental parameters (S100). Image generator 1041b generates the action selection image based on action candidate list L and recommended action Ar (S101). Image output unit 1051 outputs the generated action selection image to notification device 1002 (S102).

Figure 43:
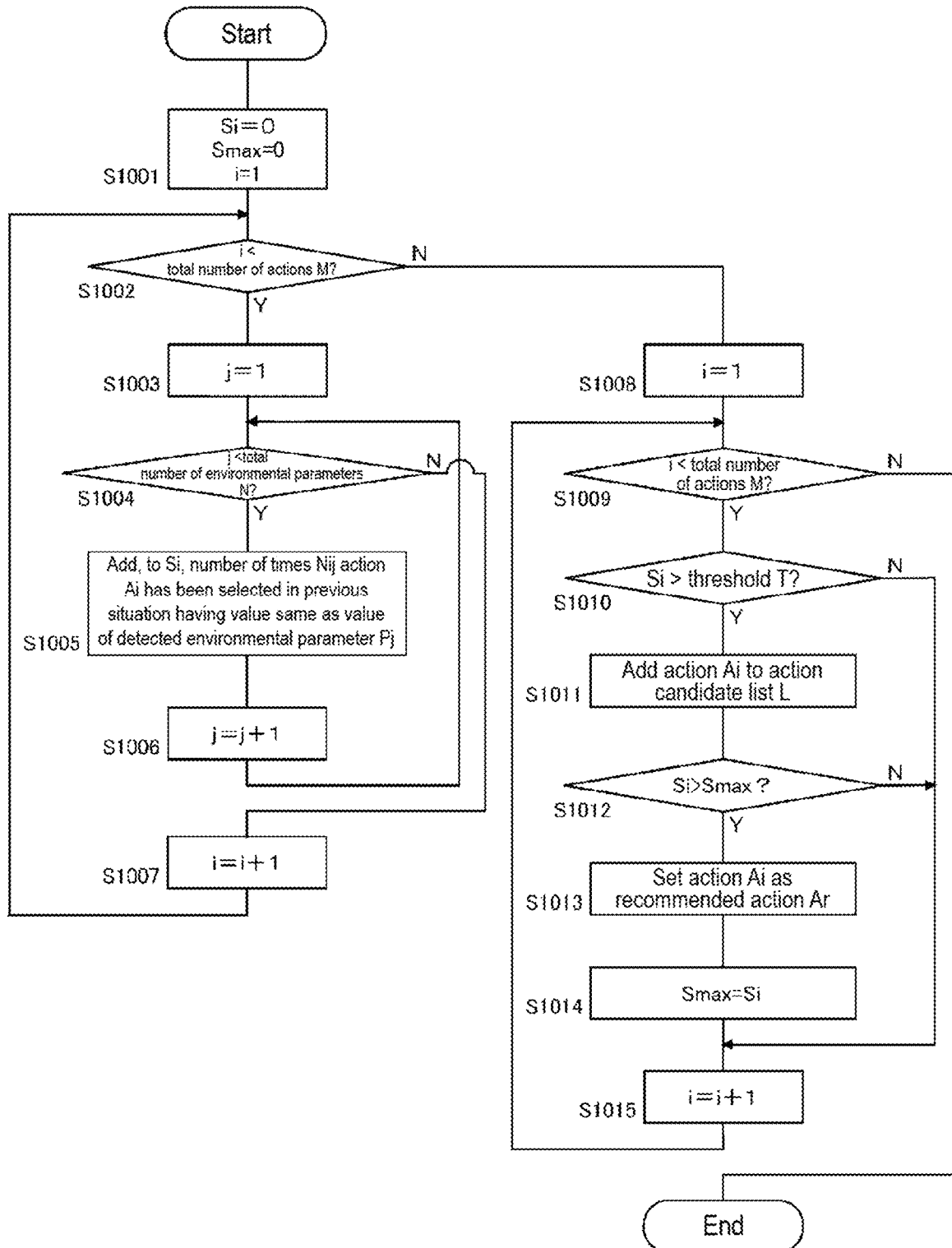
FIG. 43 is a flowchart illustrating a subroutine of the process in step S100 in FIG. 42.

FIG. 43 is a flowchart illustrating a subroutine of the process in step S100 in FIG. 42. Action candidate determination unit 1041c sets 0, as an initial value, to variable Si which is a parameter for obtaining the total of the number of times for each of a plurality of environmental parameter values corresponding to the detection information. Action candidate determination unit 1041c also sets 0, as an initial value, to variable Smax which is a parameter for obtaining the largest number of the total of the number of times. Action candidate determination unit 1041c also sets 1, as an initial value, to variable i which is a parameter representing a kind of an action (S1001). Action candidate determination unit 1041c compares variable i with total number of actions M (S1002). If variable i is less than total number of actions M (Y in S1002), the process proceeds to step S1003, and if variable i is equal to or larger than total number of actions M (N in S1002), the process proceeds to step S1008.

If variable i is less than total number of actions M (Y in S1002), action candidate determination unit 1041c sets 1, as an initial value, to variable j which is a parameter representing a kind of an environmental parameter (S1003). Action candidate determination unit 1041c compares variable j with total number of environmental parameters N (S1004). If variable j is less than total number of environmental parameters N (Y in S1004), the process proceeds to step S1005, and if variable j is equal to or larger than total number of environmental parameters N (N in S1004), the process proceeds to step S1007.

If variable j is less than total number of environmental parameters N (Yin S1004), action candidate determination unit 1041c adds, to variable Si, number of times Nij action Ai has been selected in the previous situation having a value same as the value of detected environmental parameter Pj (S1005). Action candidate determination unit 1041c increments variable j (S1006). The process returns to step S1004.

When variable j is equal to or larger than total number of environmental parameters N (N in S1004), action candidate determination unit 1041c increments variable i (S1007). The process returns to step S1002. The processes from step S1002 to step S1007 correspond to the process of adding the values (number of selected times) in each of the plurality of selected columns for each action (each row) in FIG. 40C.

After the processes from step S1002 to step S1007 pertaining to the total number of actions are finished, action candidate determination unit 1041c resets variable i to 1 as an initial value (S1008). Action candidate determination unit 1041c compares variable i with total number of actions M (S1009). If variable i is less than total number of actions M (Y in S1009), the process proceeds to step S1010, and if variable i is equal to or larger than total number of actions M (N in S1009), the process of this subroutine ends.

When variable i is less than total number of actions M (Y in S1009), action candidate determination unit 1041c compares variable Si with threshold T (S1010). If variable Si is larger than threshold T (Y in S1010), the process proceeds to step S1011, and if variable Si is equal to or less than threshold T (N in S1010), the process proceeds to step S1015.

In step S1011, action candidate determination unit 1041c adds action Ai to action candidate list L (S1011). Action candidate determination unit 1041c compares variable Si with variable Smax (S1012). If variable Si is larger than variable Smax (Yin S1012), the process proceeds to step S1013, and if variable Si is equal to or less than variable Smax (N in S1012), the process proceeds to step S1015.

In step S1013, action candidate determination unit 1041c sets action Ai as recommended action Ar (S1013). Action candidate determination unit 1041c substitutes the value of variable Si into variable Smax (S1014).

After step S1014, action candidate determination unit 1041c increments variable i (S1014). The process returns to step S1009. With the process described above, from among the actions executed by vehicle 1000, the action having an actual value exceeding a threshold can be selected as the action candidate of vehicle 1000 based on the selection performed by the occupant under the previous similar travel environment. In addition, the action having the highest actual value can be selected as the recommended action.

Threshold T mentioned above can be set by a designer based on an experiment, simulation, or the like. If threshold T is set to be lower, more action candidates can be selected, and if threshold T is set to be higher, the number of action candidates can be narrowed down.

Notably, it may be possible to use a method for selecting a predetermined number of actions as action candidates in descending order of the value of variable Si, not through the comparison with threshold T.

While the above-mentioned example has described the configuration where one recommended action is selected, two or more recommended actions may be selected. When two recommended actions are selected, for example, two actions may be selected in descending order of the value of variable Si.

Figure 44:
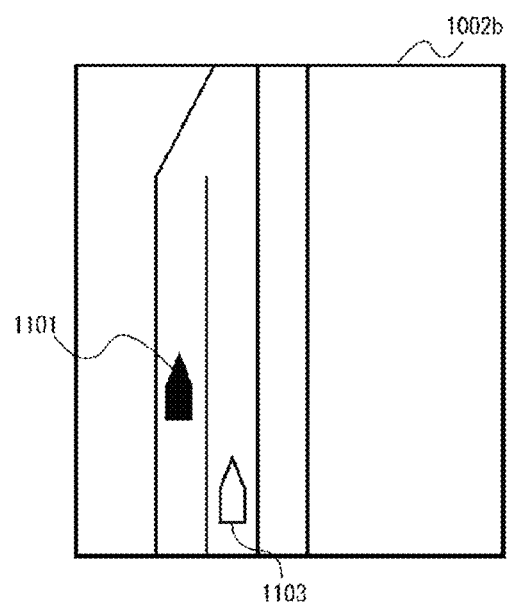
FIG. 44 is a view for describing another example of a process for determining an action candidate and a recommended action according to the fifth exemplary embodiment.

FIG. 44 is a view for describing another example of the process for determining an action candidate and a recommended action according to the fifth exemplary embodiment. FIGS. 45A and 45B are diagrams for describing another example of the process for determining an action candidate and a recommended action according to the fifth exemplary embodiment. This example illustrates the case where host vehicle 1101 is located on a merging lane, and there is adjacent following vehicle 1103 located in the main lane on the right of the merging lane. In the overhead image illustrated in FIG. 44, a road condition where there is a merging point ahead is depicted using a line, and host vehicle 1101 and adjacent following vehicle 1103 are indicated as icons.

FIG. 45A is a diagram illustrating values of the respective environmental parameters based on the current detection information detected by detector 1020 in this example. The level of speed Va of host vehicle 1101 is 4. There are lanes present. The level of relative speed Vca of adjacent following vehicle 1103 relative to host vehicle 1101 is 2, the level of head-to-head spacing Dca between both vehicles is 1, and the level of rate of change Rca of the head-to-head spacing between both vehicles is 2. The level of relative speed Vma of the merging vehicle relative to host vehicle 1101 is 2, the level of head-to-head spacing Dma between both vehicles is 1, and the level of rate of change Rma of the head-to-head spacing between both vehicles is 2. The level of distance Rmga to the merging point is 2.

FIG. 45B is a parameter aggregate table created by action candidate determination unit 1041c in this example. Action candidate determination unit 1041c selects columns corresponding to the current values (levels) of the environmental parameters in the parameter aggregate table based on the current detection information. The selected columns are enclosed by a thick line in FIG. 45B.

Action candidate determination unit 1041c sums the values of the selected columns (number of selected times) for each action. In the example illustrated in FIG. 45B, action candidate determination unit 1041c calculates 1+4+2+2+ 1+ . . . 2+2+1 . . . for "acceleration", 5+3+2+2 . . . 2+2+2+4 for "deceleration", and 2+4+1+0+0 . . . 1+2+0+5 for "lane change". Action candidate determination unit 1041c determines, as an action candidate, the action in which the total of the number of selected times is equal to or larger than a threshold. Action candidate determination unit 1041c also determines, as a recommended action, the action in which the total of the number of selected times is the maximum.

In addition, in this example, action candidate determination unit 1041c excludes the action in which zero is included in the values (number of selected times) of the selected columns. It is determined that the possibility of selecting the action, which has never been previously selected in the travel environment similar to the travel environment based on the currently detected detection information, is also low this time, and this action is excluded from the action candidates. In the example in FIG. 45B, "acceleration" and "lane change" are excluded.

Figure 46A:
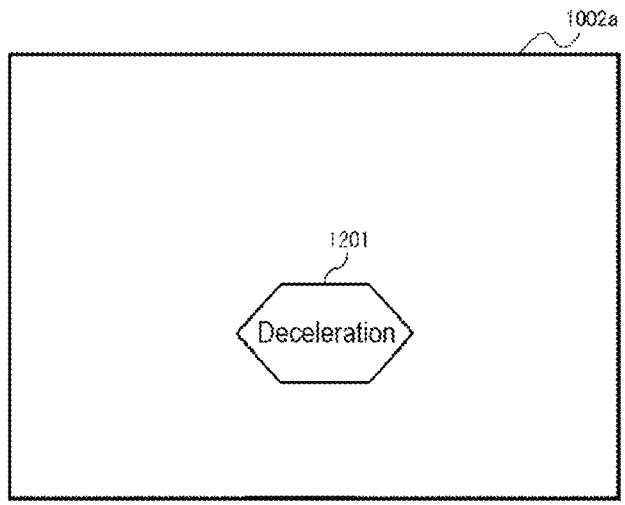
FIG. 46A is a view for describing another example of a process for determining an action candidate and a recommended action according to the fifth exemplary embodiment.
Figure 46B:
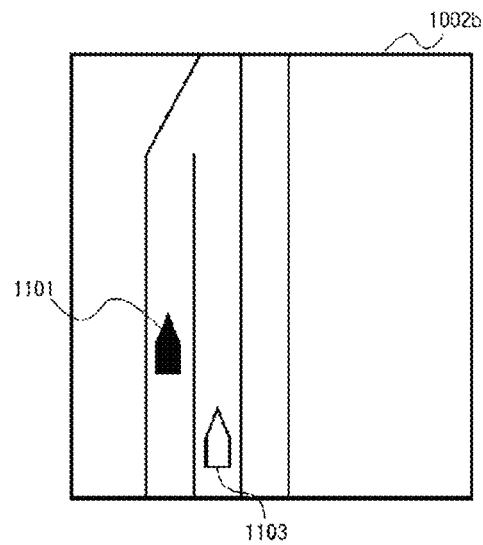
FIG. 46B is a view for describing another example of a process for determining an action candidate and a recommended action according to the fifth exemplary embodiment.

FIGS. 46A and 46B are views for describing another example of the process for determining an action candidate and a recommended action according to the fifth exemplary embodiment. FIG. 46A illustrates an action selection image, and FIG. 46B illustrates an overhead image. The overhead image illustrated in FIG. 46B is the same as the overhead image illustrated in FIG. 44. FIG. 46A illustrates an example in which action candidate determination unit 1041c determines "deceleration" as an action candidate and as a recommended action. Image generator 1041b generates an action selection image including "deceleration" 1201 which is the action candidate determined by action candidate determination unit 1041c. Image output unit 1051 outputs the generated action selection image to notification device 1002 (for example, HUD 1002a).

Figure 47:
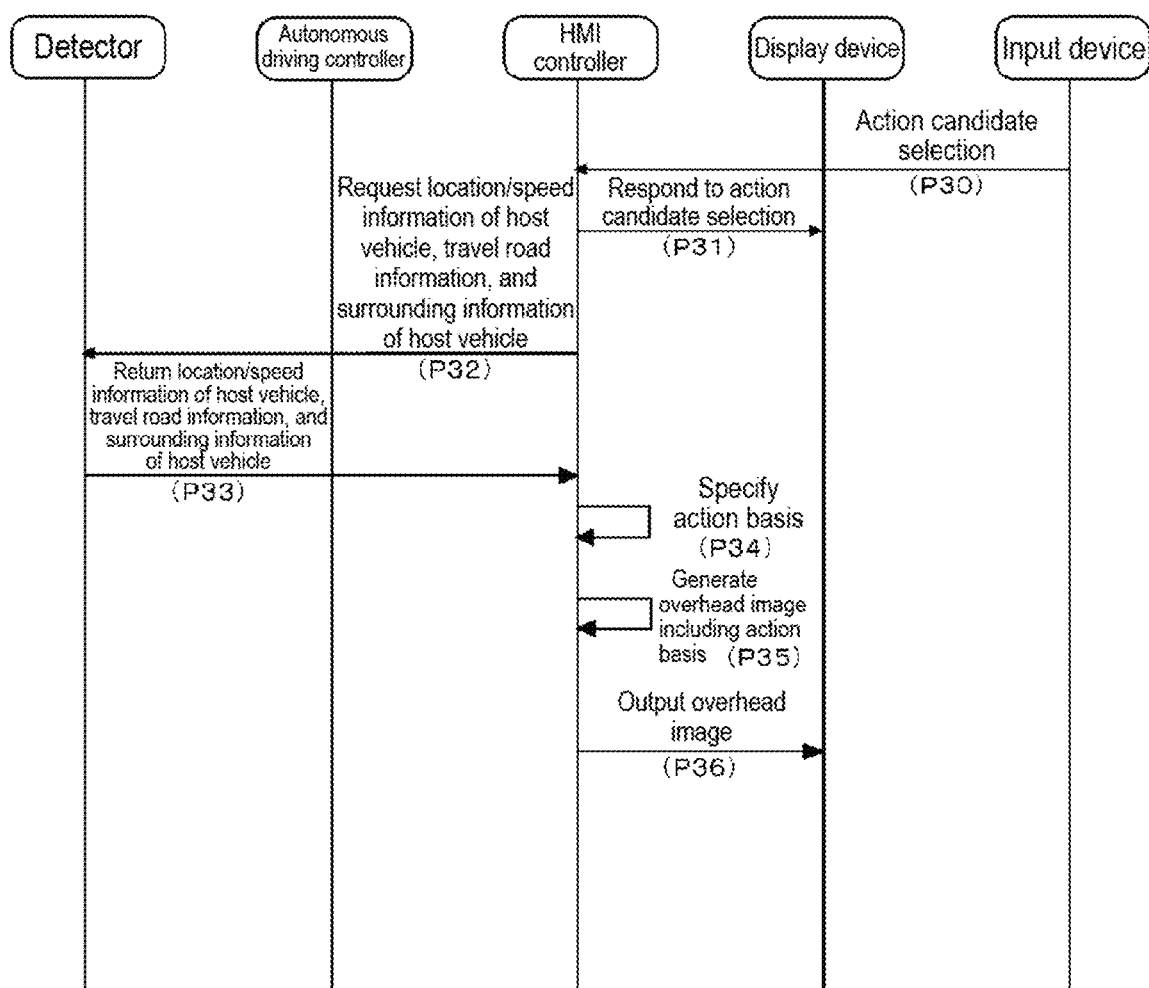
FIG. 47 is a sequence diagram illustrating an example of a process pertaining to displaying an action basis according to the fifth exemplary embodiment.

FIG. 47 is a sequence diagram illustrating an example of the process for displaying an action basis according to the fifth exemplary embodiment. The occupant selects any one of action candidates in the action selection image displayed on notification device 1002 (HUD 1002a) by operating input device 1004 (for example, first operating unit 1004a). Notification device 1002 outputs the selected action candidate to the HMI controller (driving assistance device 1040) (P30). Operation input unit 1050 in the HMI controller receives the action candidate selected by the occupant.

Image generator 1041b in the HMI controller generates an action selection image indicating that the action candidate selected by the occupant is now being selected. For example, image generator 1041b updates the action selection image so that the frame of the panel key of the action candidate selected by the occupant is displayed in boldface. It is to be noted that image generator 1041b may indicate that the selected action candidate is now being selected by changing the color, pattern, or brightness of the panel key of the selected action candidate. Image output unit 1051 outputs the updated action selection image to notification device 1002 (P31). The occupant can confirm that the action candidate selecting operation is recognized by the HMI controller from the updated action selection image.

A detection information requesting unit (not illustrated) in the HMI controller outputs a request of acquiring the detection information to detector 1020 (P32). When receiving this request, detector 1020 detects the location/speed information of the host vehicle, information of the road on which the host vehicle is traveling, and the surrounding information of the host vehicle, and responds to the HMI controller (P33).

The action basis determination unit 1041d in the HMI controller specifies the basis that the action candidate selected by the occupant should be executed, based on the detection information input from detector 1020 (P34). Image generator 1041b generates an overhead image including the specified basis (P35). Image output unit 1051 outputs the generated overhead image to notification device 1002 (for example, center display 1002b) (P36). The sequence mentioned above is executed every time an action candidate is selected by the occupant.

FIGS. 48A to 48B are diagrams for describing one example of the process for determining an action basis according to the fifth exemplary embodiment. FIG. 48A illustrates an action selection image, and FIG. 48B illustrates an overhead image. FIGS. 48A and 48B illustrate the state where the occupant selects "deceleration" 1201 in the action selection image under the situation illustrated in FIGS. 41A and 41B.

FIG. 48C is a diagram illustrating values of environmental parameters based on the current detection information detected by detector 1020. The level of speed Va of host vehicle 1101 is 4. The level of relative speed Vba of leading vehicle 1102 relative to host vehicle 1101 is 1, the level of distance DRba between both vehicles is 1, and the level of rate of change RSb of the size of leading vehicle 1102 is 4. There are lanes present.

FIG. 48D is a parameter aggregate table created by action candidate determination unit 1041c. Action basis determination unit 1041d selects columns corresponding to the current values (levels) of the environmental parameters in the parameter aggregate table based on the current detection information. The selected columns are enclosed by a thick line in FIG. 48D. Action basis determination unit 1041d selects the row corresponding to the action candidate selected by the occupant in the parameter aggregate table. In the example in FIG. 48D, action basis determination unit 1041d selects the row of "deceleration".

Action basis determination unit 1041d specifies the maximum value (number of selected times) from among the values (number of selected times) at the intersections of the selected columns with the selected one row in the parameter aggregate table. In the example in FIG. 48D, action basis determination unit 1041d specifies "6" which is the value (number of selected times) at the intersection of the columns for the level 1 of distance DRba between host vehicle 1101 and leading vehicle 1102 with the row of "deceleration". Action basis determination unit 1041d selects the environmental parameter at the specified intersection as the travel-environmental basis that the selected action candidate should be executed. The environmental parameter at the specified intersection is the parameter most contributing to the previous selection of this action. This shows that the biggest factor for selecting "deceleration" is distance DRba between host vehicle 1101 and leading vehicle 1102 being short.

In the above-mentioned example, action basis determination unit 1041d selects the largest value (number of selected times) from among the values (number of selected times) at a plurality of intersections in the parameter aggregate table. Regarding this point, action basis determination unit 1041d may select all values (number of selected times) exceeding a threshold at the intersections from among the values (number of selected times) at a plurality of intersections. Further, action basis determination unit 1041d may select a predetermined number of values in descending order from among the values (number of selected times) at a plurality of intersections. In these cases, a plurality of action bases is selected.

Figure 49A:
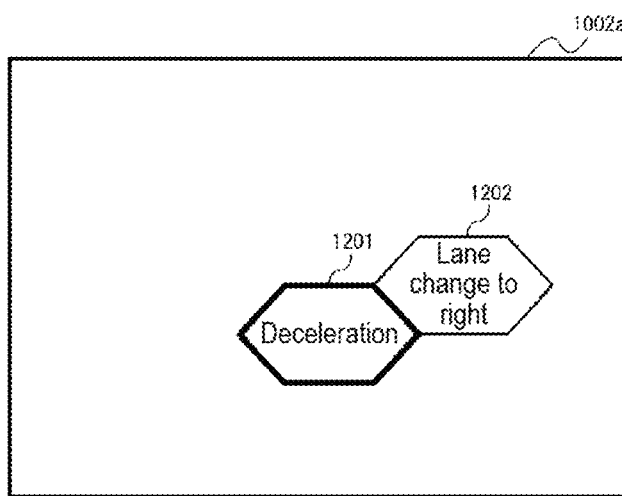
FIG. 49A is a view for describing one example of a process for determining an action basis according to the fifth exemplary embodiment.
Figure 49B:
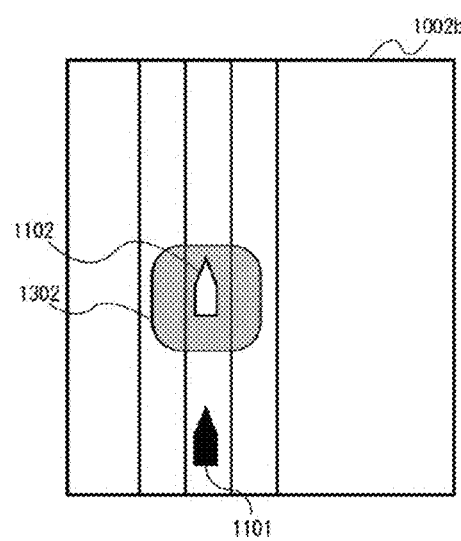
FIG. 49B is a view for describing one example of a process for determining an action basis according to the fifth exemplary embodiment.

FIGS. 49A and 49B are views for describing one example of the process for determining an action basis according to the fifth exemplary embodiment. FIG. 49A illustrates an action selection image, and FIG. 49B illustrates an overhead image. The action selection image illustrated in FIG. 49A is the same as the action selection image illustrated in FIG. 48A. In the overhead image illustrated in FIG. 49B, shaded image 1302 highlighting leading vehicle 1102 as the basis for "deceleration" is displayed. Thus, the occupant can understand that the basis for "deceleration" is the relation with leading vehicle 1102. Note that the display method for showing the basis is not limited to using shaded image 1302, and other display methods may be used, such as flickering leading vehicle 1102 which is the subject providing the action basis, or casting shadow on leading vehicle 1102 which is the subject providing the action basis.

Figure 50:
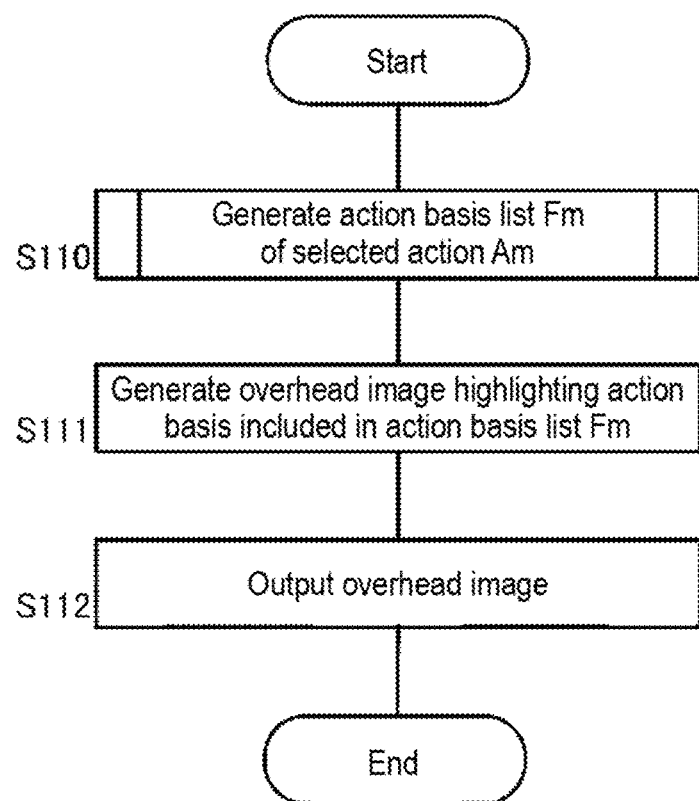
FIG. 50 is a flowchart illustrating a flow of a process up to displaying an action basis based on an action candidate selected by an occupant according to the fifth exemplary embodiment.

FIG. 50 is a flowchart illustrating the flow of the process up to displaying the action basis based on the action candidate selected by the occupant according to the fifth exemplary embodiment. Action basis determination unit 1041*d* generates action basis list Fm based on the parameter aggregate table, the values (levels) of the environmental parameters currently detected, and action Am selected by the occupant (S110). Image generator 1041*b* generates an overhead image in which the action basis included in action basis list Fm is highlighted (S111). Image output unit 1051 outputs the generated overhead image to notification device 1002 (S112).

Figure 51:
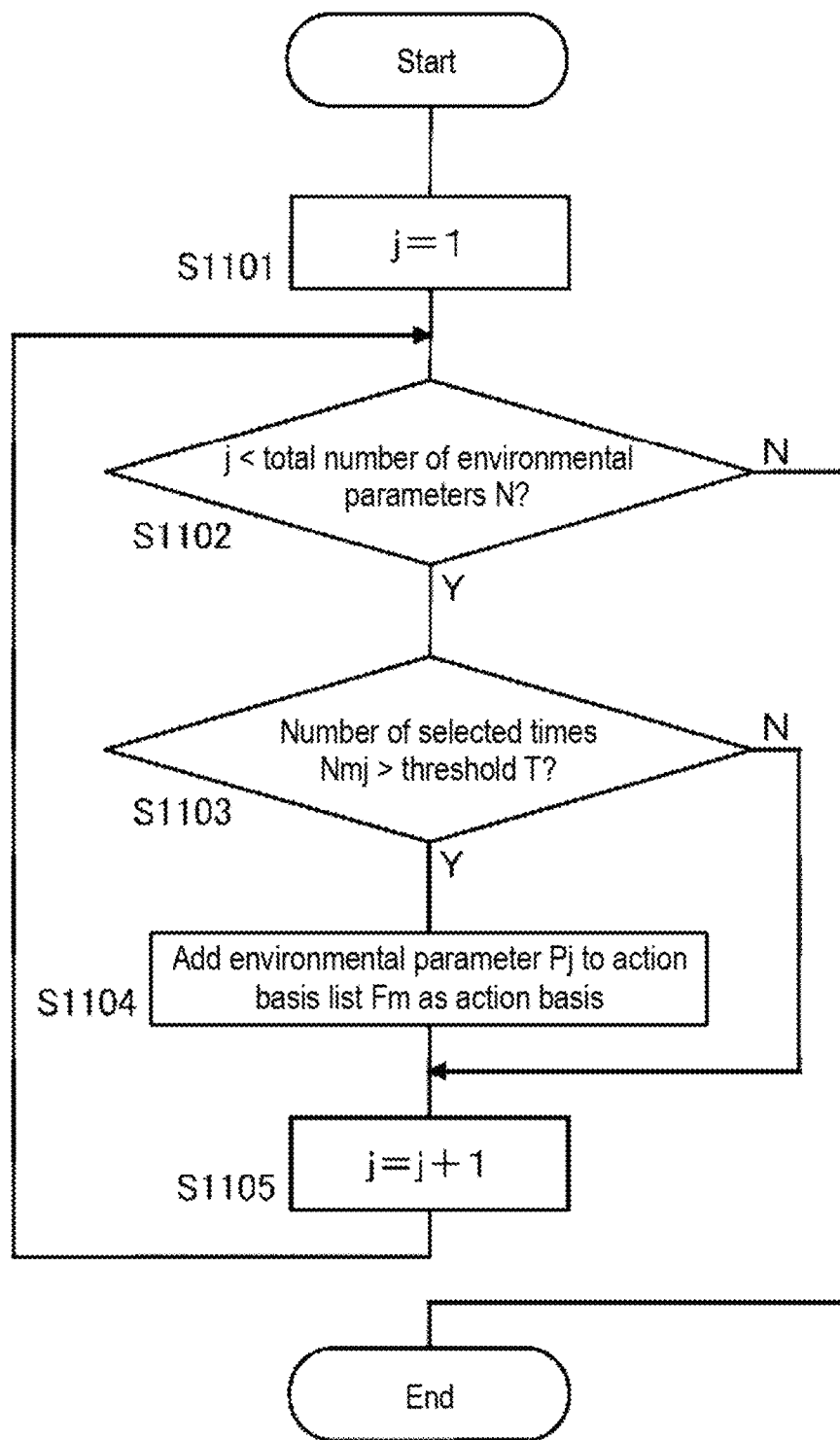
FIG. 51 is a flowchart illustrating a subroutine of the process in step S110 in FIG. 50.

FIG. 51 is a flowchart illustrating the subroutine of the process in step S110 in FIG. 50. Action basis determination unit 1041*d* sets 1, as an initial value, to variable j which is the parameter representing a kind of an environmental parameter (S1101). Action basis determination unit 1041*d* compares variable j with total number of environmental parameters N (S1102). If variable j is less than total number of environmental parameters N (Y in S1102), the process proceeds to step S1103, and if variable j is equal to or larger than total number of environmental parameters N (N in S1102), the process of this subroutine ends.

If variable j is less than total number of environmental parameters N (Y in S1102), action basis determination unit 1041*d* specifies number of times Nmj action Am has been selected in a previous situation having a value same as the value of detected environmental parameter Pj, and compares number of selected times Nmj with threshold T (S1103). When number of selected times Nmj exceeds threshold T (Y in S1103), action basis determination unit 1041*d* adds environmental parameter Pj to action basis list Fm as an action basis (S1104). When number of times Nmj is equal to or less than threshold T (N in S1103), the process in step S1104 is skipped. Action basis determination unit 1041*d* increments variable j (S1105). The process returns to step S1102.

With the process described above, as a basis that the action selected by the occupant should be executed, at least one environmental parameter which has a rate of contribution exceeding threshold T can be selected from among a plurality of environmental parameters associated with the action included in the travel history. Threshold T mentioned above can be set by a designer based on an experiment, simulation, or the like. If threshold T is set to be lower, more action bases can be selected, and if threshold T is set to be higher, the number of action bases can be narrowed down. Notably, it may be possible to use a method for selecting a predetermined number of environmental parameters as action candidates in descending order of the value of number of times Nmj, not through the comparison with threshold T.

Figure 52A:
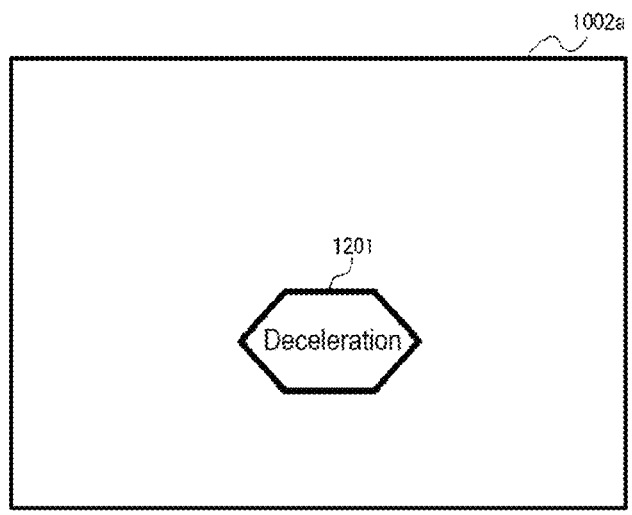
FIG. 52A is a view for describing another example of a process for determining an action basis according to the fifth exemplary embodiment.
Figure 52B:
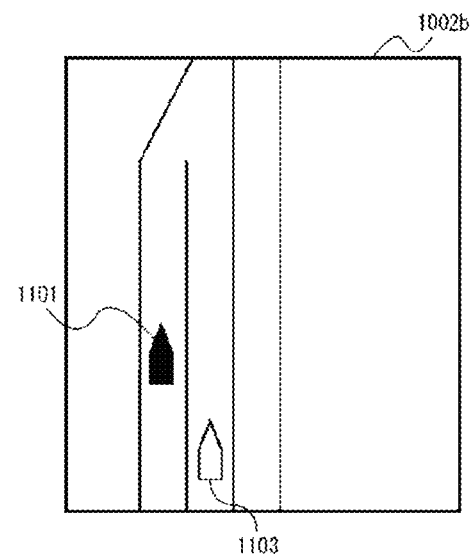
FIG. 52B is a view for describing another example of a process for determining an action basis according to the fifth exemplary embodiment.

FIGS. 52A and 52B are views for describing another example of the process for determining an action basis according to the fifth exemplary embodiment. FIG. 52A illustrates an action selection image, and FIG. 52B illustrates an overhead image. FIGS. 52A and 2B illustrate the state where the occupant selects "deceleration" 1201 in the action selection image under the situation illustrated in FIGS. 46A and 46B.

FIGS. 53A and 53B are diagrams for describing another example of the process for determining an action basis according to the fifth exemplary embodiment. FIG. 53A is a diagram illustrating values of the respective environmental parameters based on the current detection information detected by detector 1020 in this example. The values of the environmental parameters are the same as the values of the environmental parameters illustrated in FIG. 45A.

FIG. 53B is a parameter aggregate table created by action candidate determination unit 1041*c* in this example. Action basis determination unit 1041*d* selects columns corresponding to the current values (levels) of the environmental parameters in the parameter aggregate table based on the current detection information. The selected columns are enclosed by a thick line in FIG. 53B. Action basis determination unit 1041*d* selects the row corresponding to the action candidate selected by the occupant in the parameter aggregate table. In the example in FIG. 53B, action basis determination unit 1041*d* selects the row of "deceleration".

Action basis determination unit 1041*d* selects values (number of selected times) larger than a threshold, from among the values (number of selected times) at the intersections of the selected columns with the selected one row in the parameter aggregate table. In the example illustrated in FIG. 53B, the threshold is set to be 3. "5" which is the value at the intersection (number of selected times) of the column for the level 4 of speed Va of host vehicle 1101 with the row of "deceleration" and "4" which is the value at the intersection (number of selected times) of the column for the level 2 of distance Rga to the merging point with the row of "deceleration" are larger than the threshold.

Action basis determination unit 1041*d* selects speed Va of host vehicle 1101 and distance Rga to the merging point, which are the environmental parameters at the specified two intersections, as the travel-environmental bases that the selected action candidate should be executed. This shows that the factor for selecting "deceleration" by the vehicle traveling in the merging lane is speed Va being relatively high and the distance to the merging point being relatively short.

Figure 54A:
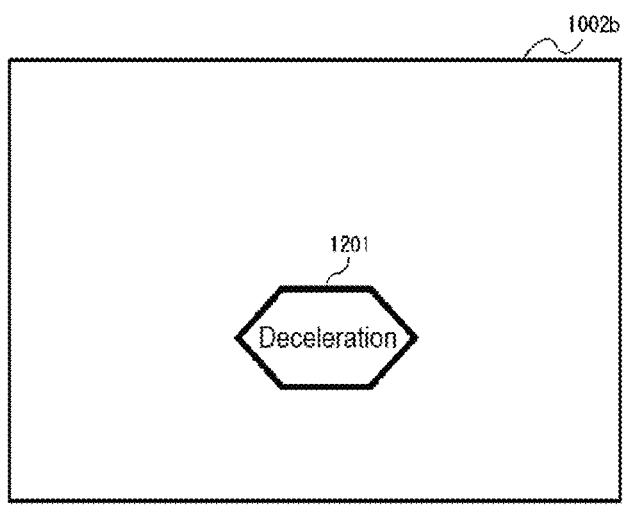
FIG. 54A is a view for describing another example of a process for determining an action basis according to the fifth exemplary embodiment.
Figure 54B:
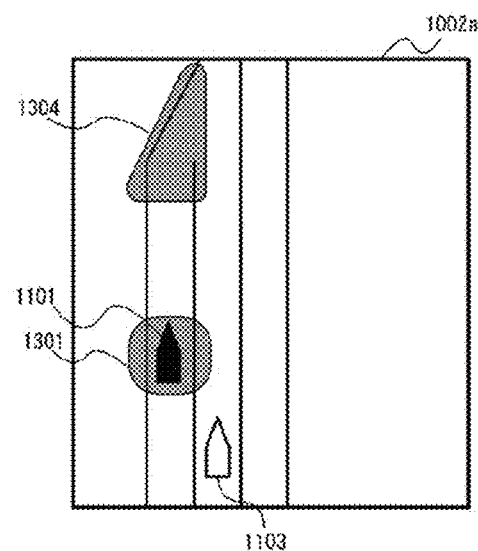
FIG. 54B is a view for describing another example of a process for determining an action basis according to the fifth exemplary embodiment.

FIGS. 54A and 54B are views for describing another example of the process for determining an action basis according to the fifth exemplary embodiment. FIG. 54A illustrates an action selection image, and FIG. 54B illustrates an overhead image. The action selection image illustrated in FIG. 54A is the same as the action selection image illustrated in FIG. 52A. In the overhead image illustrated in FIG. 54B, shaded image 1301 highlighting host vehicle 1101 and shaded image 1304 highlighting the merging point are displayed as the bases for "deceleration". Thus, the occupant can understand that the bases for "deceleration" are the speed of host vehicle 1101 and approaching to the merging point. It is to be noted that, when a plurality of bases is displayed, the basis having the highest rate of contribution may be displayed in such a manner as to make this basis more visible than the other bases. In the overhead image illustrated in FIG. 54B, the color of shaded image 1301 highlighting host vehicle 1101 may be made darker than the color of shaded image 1304 highlighting the merging point.

FIGS. 55A to 55D are views for describing still another example of the process for determining an action basis according to the fifth exemplary embodiment. FIG. 55A illustrates an action selection image, and FIG. 55B illustrates an overhead image. FIGS. 55A and 55B illustrate the state where the occupant selects "lane change to right" 1202 in the action selection image under the situation illustrated in FIGS. 41A and 41B.

FIG. 55C is a diagram illustrating values of the respective environmental parameters based on the current detection information detected by detector 1020 in this example. The values of the environmental parameters are the same as the values of the environmental parameters illustrated in FIG. 48C.

FIG. 55D is a parameter aggregate table created by action candidate determination unit 1041c in this example. Action basis determination unit 1041d selects columns corresponding to the current values (levels) of the environmental parameters in the parameter aggregate table based on the current detection information. The selected columns are enclosed by a thick line in FIG. 55D. Action basis determination unit 1041d selects the row corresponding to the action candidate selected by the occupant in the parameter aggregate table. In the example in FIG. 55D, action basis determination unit 1041d selects the row of "lane change".

Regarding a certain action in the parameter aggregate table, there may be an environmental parameter in which the value (number of selected times) for one level is equal to or larger than a predetermined value, and the values (number of selected times) for all of the other levels are zero. In the example in FIG. 55D, presence or absence of lanes for "lane change" corresponds to this case. When the action is selected by the occupant, and the current value (level) of the environmental parameter based on the current detection information is equal to or larger than the predetermined value, action basis determination unit 1041d unconditionally selects this environmental parameter as the action basis. In the example illustrated in FIG. 55D, action basis determination unit 1041d unconditionally selects the presence or absence of lanes as the action basis. It can be predicted that there is a deep connection between the environmental parameter (presence or absence of lanes) having a value (1) not less than the predetermined value and the action (lane change), and it can also be predicted that the environmental parameter (lane change) having the value (1) becomes the basis for the action (lane change).

Action basis determination unit 1041d specifies the largest value (number of selected times) from among the values (number of selected times) at the intersections of the selected columns excluding the above-mentioned environmental parameter (presence or absence of lanes) with the selected one row. In the example illustrated in FIG. 55D, action basis determination unit 1041d specifies "6" which is the value (number of selected times) at the intersection of the column for the level 1 of relative speed Vba of leading vehicle 1102 relative to host vehicle 1101 with the row of "lane change". Action basis determination unit 1041d selects, as the action bases, relative speed Vba of leading vehicle 1102 relative to host vehicle 1101, which is the environmental parameter at the specified intersection, and unconditionally selected presence or absence of lanes. This shows that the factor for selecting "lane change" is relative speed Vba of leading vehicle 1102 relative to host vehicle 1101 being low and the presence of a fast lane.

FIGS. 56A and 56B are views for describing still another example of the process for determining an action basis according to the fifth exemplary embodiment. FIG. 56A illustrates an action selection image, and FIG. 56B illustrates an overhead image. The action selection image illustrated in FIG. 56A is the same as the action selection image illustrated in FIG. 55A. In the overhead image illustrated in FIG. 56B, shaded image 1302 highlighting host vehicle 1101 and shaded image 1305 highlighting the fast lane are displayed as the bases for "lane change to right". Thus, the occupant can understand that the bases for "lane change to right" are the speed of host vehicle 1101 and the presence of the fast lane.

Figure 57:
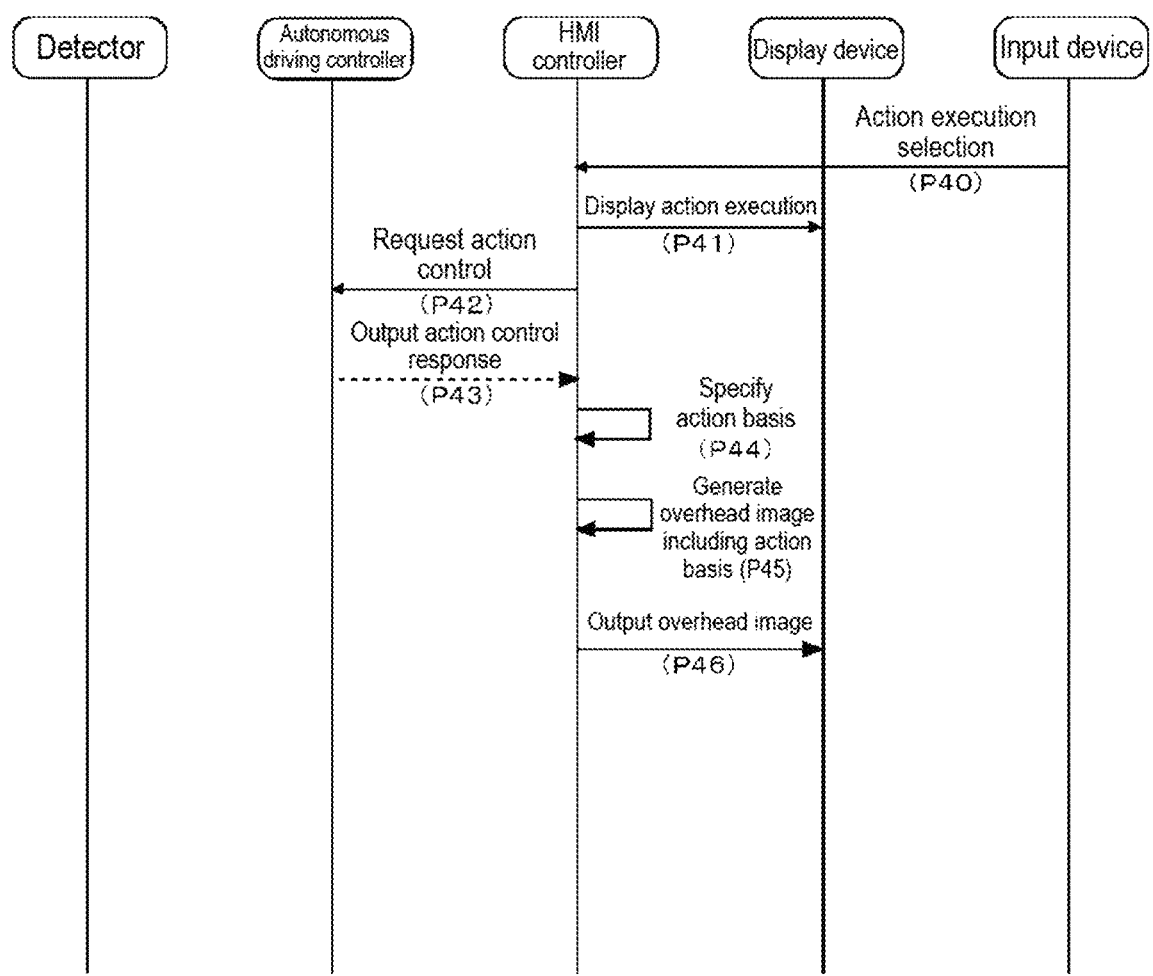
FIG. 57 is a sequence diagram illustrating an example of a process pertaining to execution of a selected action according to the fifth exemplary embodiment.

FIG. 57 is a sequence diagram illustrating an example of a process pertaining to executing the selected action according to the fifth exemplary embodiment. When the occupant presses an enter button of input device 1004 while selecting any one of action candidates in the action selection image, input device 1004 outputs an execution request of the action candidate to the HMI controller (driving assistance device 1040) (P40). Operation input unit 1050 in the HMI controller receives the execution request of the action.

Image generator 1041b in the HMI controller generates an image indicating that the execution request is received. For example, image generator 1041b generates an image including a message of "running . . . ". Image output unit 1051 outputs the generated image to notification device 1002 (P41).

Command generator 1041e in the HMI controller generates a control command for causing vehicle 1000 to execute the action with the execution request having been received, and command output unit 1055 outputs the control command to autonomous driving controller (autonomous driving control device 1030) (P42). When the control command is input from the HMI controller, controller 1031 in the autonomous driving controller causes vehicle 1000 to execute the action involved with the control command. Besides, controller 1031 outputs a response command indicating that the control command is now being executed to the HMI controller (P43).

When the response command is input to action basis determination unit 1041d in the HMI controller from the autonomous driving controller, action basis determination unit 1041d specifies the basis for the action which is now being executed by the autonomous driving controller (P44). Image generator 1041b generates an overhead image including the specified basis (P45). Image output unit 1051 outputs the generated overhead image to notification device 1002 (for example, center display 1002b) (P46). The sequence mentioned above is executed every time the occupant performs an operation input for an execution request of the action.

According to the fifth exemplary embodiment described above, the basis for the action selected from the action candidates displayed in the action selection image is displayed in the overhead view screen, whereby the occupant can visually understand at once the main basis for the action. The occupant can determine whether or not the selected action is to be executed by referring to the basis.

In addition, the action candidates to be displayed in the action selection screen are narrowed down based on the current detection information and the previous travel history, whereby the display content of the action selection screen can be simplified. Further, the recommended action candidate in the action candidates displayed in the action selection screen is displayed in a highlighted manner. Accordingly, a user interface having high operability can be implemented.

Sixth Exemplary Embodiment

Firstly, the sixth exemplary embodiment is summarized. In the sixth exemplary embodiment, an overhead image indicating the host vehicle and the surrounding situation thereof and an action selection image indicating action candidates of the vehicle are separately displayed, as in the fifth exemplary embodiment. In the sixth exemplary embodiment, all action candidates including inexecutable actions are displayed in the action selection image. When any one of the action candidates displayed in the action selection image is selected by an occupant, the travel-environmental basis that the selected action candidate should be executed is displayed in the overhead image. When an inexecutable action is selected, the travel-environmental basis that this action should not be executed or is not to be executed is displayed. In the description below, the description common to the fifth exemplary embodiment will be omitted as appropriate.

FIGS. 58A to 58C are diagrams for describing one example of a process for determining an action candidate and a recommended action according to the sixth exemplary embodiment. FIG. 58A illustrates an overhead image indicating the location of host vehicle 1101 and the location of leading vehicle 1102 on a road, and this overhead image is the same as the overhead image illustrated in FIG. 40A.

FIG. 58B is a diagram illustrating values of the respective environmental parameters based on the current detection information detected by detector 1020. The level of speed Va of host vehicle 1101 is 4. The level of relative speed Vba of leading vehicle 1102 relative to host vehicle 1101 is 1, the level of distance DRba between both vehicles is 1, and the level of rate of change RSb of the size of leading vehicle 1102 is 4. There are lanes present.

FIG. 58C is a parameter aggregate table generated by action candidate determination unit 1041c. Action candidate determination unit 1041c selects columns corresponding to the current values (levels) of the environmental parameters in the parameter aggregate table based on the current detection information. The selected columns are enclosed by a thick line in FIG. 58C.

Action candidate determination unit 1041c sums the values (number of selected times) of the selected columns for each action (for each row). In the example illustrated in FIG. 58C, action candidate determination unit 1041c calculates 1+1+0+ . . . for "acceleration", 5+4+6+ . . . for "deceleration", and 2+6+4+ . . . for "lane change". Action candidate determination unit 1041c determines, as a recommended action, the action in which the total of the number of selected times is the maximum.

In the sixth exemplary embodiment, action candidate determination unit 1041c selects, as an inexecutable action, the action in which the values (number of selected times) of the selected columns include zero. In the example illustrated in FIG. 58C, "acceleration" is selected as the inexecutable action.

Figure 59A:
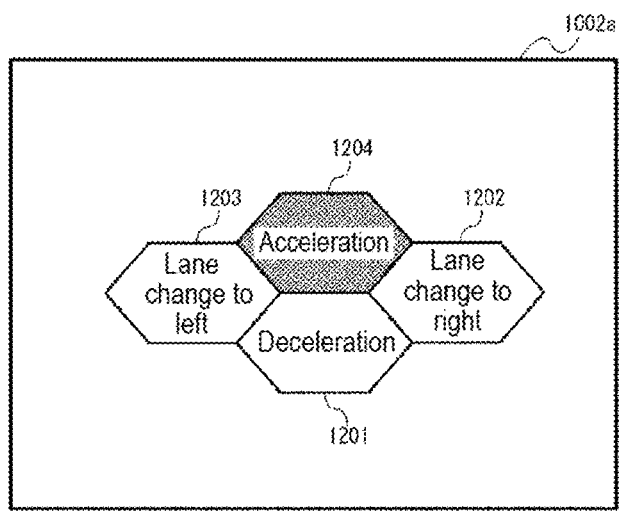
FIG. 59A is a view for describing one example of a process for determining an action candidate and a recommended action according to the sixth exemplary embodiment.
Figure 59B:
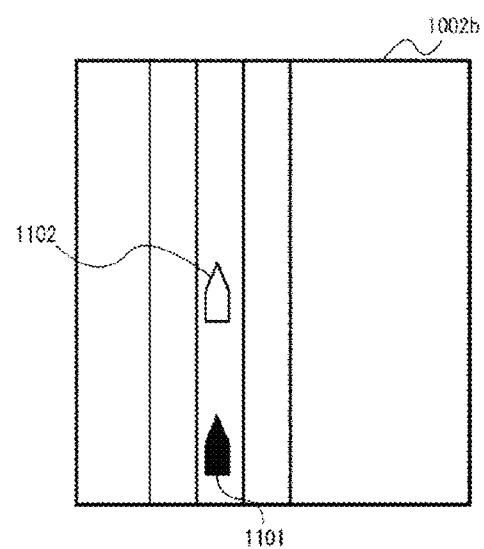
FIG. 59B is a view for describing one example of a process for determining an action candidate and a recommended action according to the sixth exemplary embodiment.

FIGS. 59A and 59B are views for describing one example of the process for determining an action candidate and a recommended action according to the sixth exemplary embodiment. FIG. 59A illustrates an action selection image, and FIG. 59B illustrates an overhead image. The overhead image illustrated in FIG. 59B is the same as the overhead image illustrated in FIG. 58A. In the sixth exemplary embodiment, image generator 1041b generates an action selection image including all actions specified by the HMI controller. The action selection image illustrated in FIG. 59A includes "deceleration" 1201, "lane change to right" 1202, "lane change to left" 1203, and "acceleration" 1204. "Deceleration" 1201 is set as the recommended action, and "acceleration" 1204 is set as the inexecutable action. The inexecutable action ("acceleration" 1204) is displayed in a display manner, different from the display manner of the other executable actions, where the panel key is grayed out or the luminance of the panel key is reduced, for example. Thus, the occupant can recognize that "acceleration" 1204 is an action candidate which cannot be executed.

Figure 60:
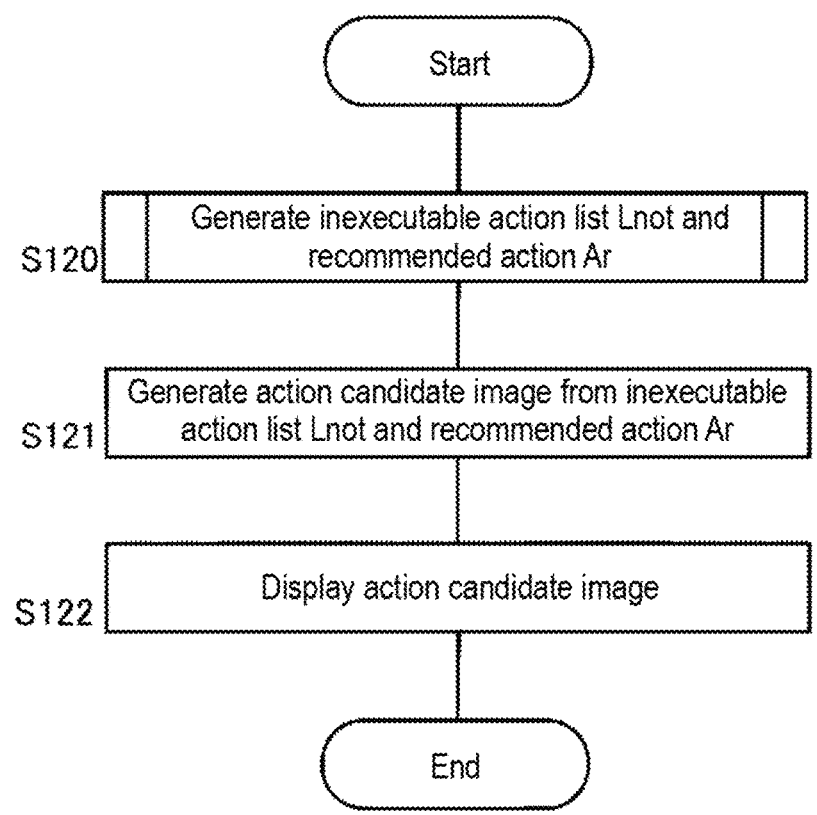
FIG. 60 is a flowchart illustrating a flow of a process up to displaying an action selection image based on current detection information according to the sixth exemplary embodiment.

FIG. 60 is a flowchart illustrating the flow of the process up to displaying the action selection image based on the current detection information according to the sixth exemplary embodiment. Action candidate determination unit 1041c generates inexecutable action list Lnot and recommended action Ar based on the parameter aggregate table and the currently detected values (levels) of the environmental parameters (S120). Image generator 1041b generates the action selection image based on inexecutable action list Lnot and recommended action Ar (S121). Image output unit 1051 outputs the generated action selection image to notification device 1002 (S122).

Figure 61:
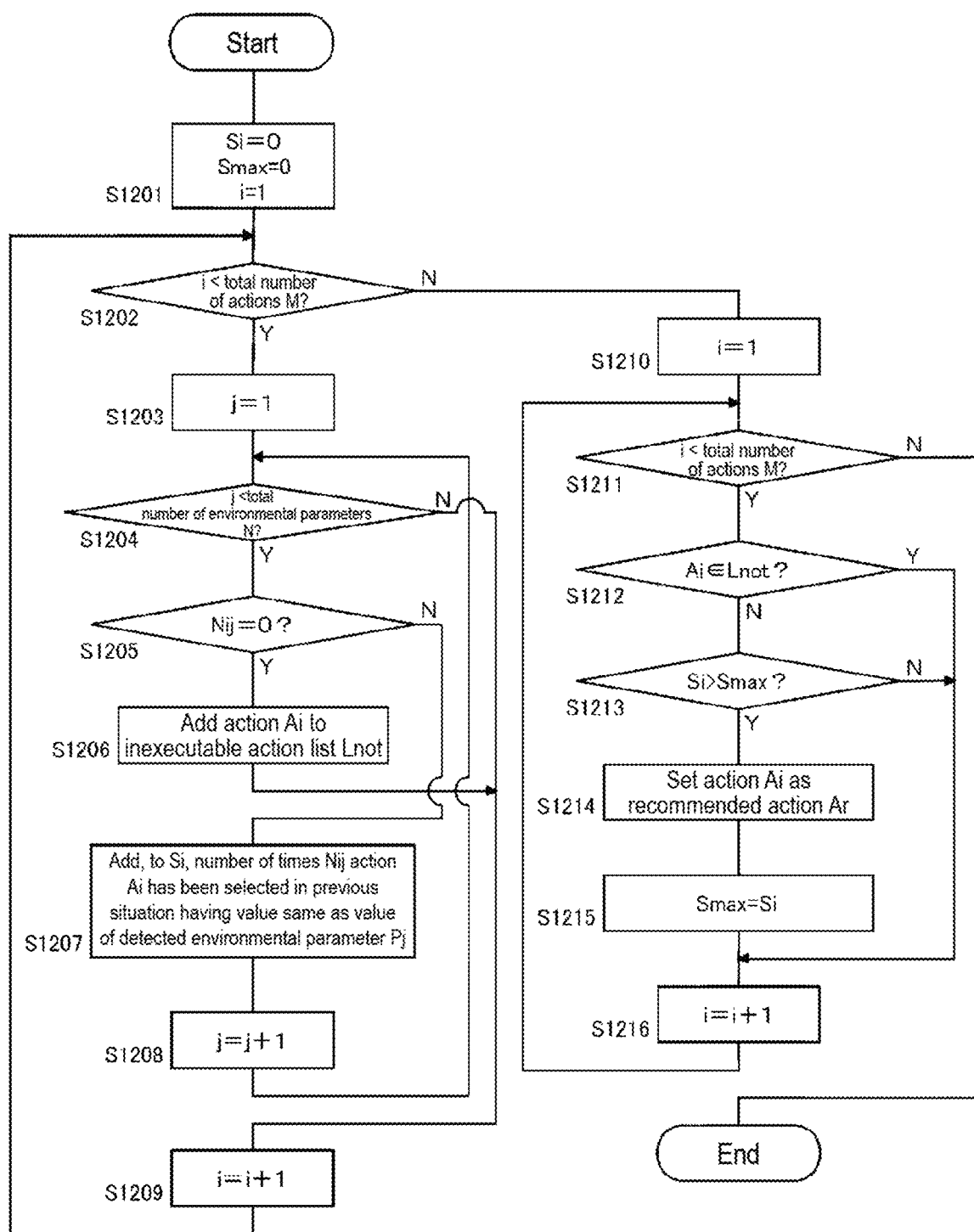
FIG. 61 is a flowchart illustrating a subroutine of the process in step S120 in FIG. 60.

FIG. 61 is a flowchart illustrating a subroutine of the process in step S120 in FIG. 60. Action candidate determination unit 1041c sets 0, as an initial value, to variable Si which is a parameter for obtaining the total of the number of times for each of a plurality of environmental parameter values corresponding to the detection information. Action candidate determination unit 1041c also sets 0, as an initial value, to variable Smax which is a parameter for obtaining the largest number of the total of the number of times. Action candidate determination unit 1041c also sets 1, as an initial value, to variable i which is a parameter representing a kind of an action (S1201).

Action candidate determination unit 1041c compares variable i with total number of actions M (S1202). If variable i is less than total number of actions M (Y in S1202), the process proceeds to step S1203, and if variable i is equal to or larger than total number of actions M (N in S1202), the process proceeds to step S1210.

If variable i is less than total number of actions M (Y in S1202), action candidate determination unit 1041c sets 1, as an initial value, to variable j which is a parameter representing a kind of an environmental parameter (S1203). Action candidate determination unit 1041c compares variable j with total number of environmental parameters N (S1204). If variable j is less than total number of environmental parameters N (Y in S1204), the process proceeds to step S1205, and if variable j is equal to or larger than total number of environmental parameters N (N in S1204), the process proceeds to step S1209.

Action candidate determination unit 1041c determines whether or not the value (number of selected times Nij) at the intersection of action i with environmental parameter Pj in the parameter aggregate table is zero (S1205). When number of selected times Nij is zero (Y in S1205), action candidate determination unit 1041c adds action Ai to inexecutable action list Lnot (S1206). The process proceeds to step S1209. Note that number of selected times Nij is not limited to be compared to zero, and may be compared to other low thresholds.

When the value of number of selected times Nij is not zero in step S1205 (N in S1205), action candidate determination unit 1041c adds number of times Nij action Ai has been selected in a previous situation having a value same as the value of detected environmental parameter Pj to variable Si (S1207). Action candidate determination unit 1041c increments variable j (S1208). The process returns to step S1204.

If variable j is equal to or larger than total number of environmental parameters N in step S1204 (N in S1204), or after the process in step S1206 is executed, action candidate determination unit 1041c increments variable i (S1209). The process returns to step S1202.

After the processes from step S1202 to step S1209 pertaining to the total number of actions are finished, action candidate determination unit 1041c resets variable i to 1 as an initial value (S1210). Action candidate determination unit 1041c compares variable i with total number of actions M (S1211). If variable i is less than total number of actions M (Y in S1211), the process proceeds to step S1212, and if variable i is equal to or larger than total number of actions M (N in S1211), the process of this subroutine ends.

When variable i is less than total number of actions M (Y in S1211), action candidate determination unit 1041c determines whether or not action Ai is included in inexecutable action list Lnot (S1212). When action Ai is included (Y in S1212), the process proceeds to step S1216, and when action Ai is not included (N in S1212), the process proceeds to step S1213.

Action candidate determination unit 1041c compares variable Si with variable Smax in step S1213 (S1213). If variable Si is larger than variable Smax (Y in S1213), the process proceeds to step S1214, and if variable Si is equal to or less than variable Smax (N in S1213), the process proceeds to step S1216.

In step S1214, action candidate determination unit 1041c sets action Ai as recommended action Ar (S1214). Action candidate determination unit 1041c substitutes the value of variable Si into variable Smax (S1215).

In step S1216, action candidate determination unit 1041c increments variable i (S1216). The process returns to step S1211. With the process mentioned above, the recommended action and the inexecutable action can be specified from a plurality of prescribed actions.

FIGS. 62A and 62B are views for describing one example of a process for determining an action basis according to the sixth exemplary embodiment. FIG. 62A illustrates an action selection image, and FIG. 62B illustrates an overhead image. FIGS. 62A and 62B illustrate the state where the occupant selects "deceleration" 1201 in the action selection image under the situation illustrated in FIGS. 59A and 59B.

FIG. 62C is a diagram illustrating values of the respective environmental parameters based on the current detection information detected by detector 1020. The values of the environmental parameters are the same as the values of the environmental parameters illustrated in FIG. 48C.

FIG. 62D is a parameter aggregate table created by action candidate determination unit 1041c. Action basis determination unit 1041d selects columns corresponding to the current values (levels) of the environmental parameters in the parameter aggregate table based on the current detection information. The selected columns are enclosed by a thick line in FIG. 62D. Action basis determination unit 1041d selects the row corresponding to the action candidate selected by the occupant in the parameter aggregate table. In the example in FIG. 48D, action basis determination unit 1041d selects the row of "deceleration".

Action basis determination unit 1041d specifies the maximum value (number of selected times) from among the values (number of selected times) at the intersections of the selected columns with the selected one row in the parameter aggregate table. In the example in FIG. 62D, action basis determination unit 1041d specifies "6" which is the value (number of selected times) at the intersection of the columns for the level 1 of distance DRba between host vehicle 1101 and leading vehicle 1102 with the row of "deceleration". Action basis determination unit 1041d selects the environmental parameter at the specified intersection as the travel-environmental basis that the selected action candidate should be executed.

Figure 63A:
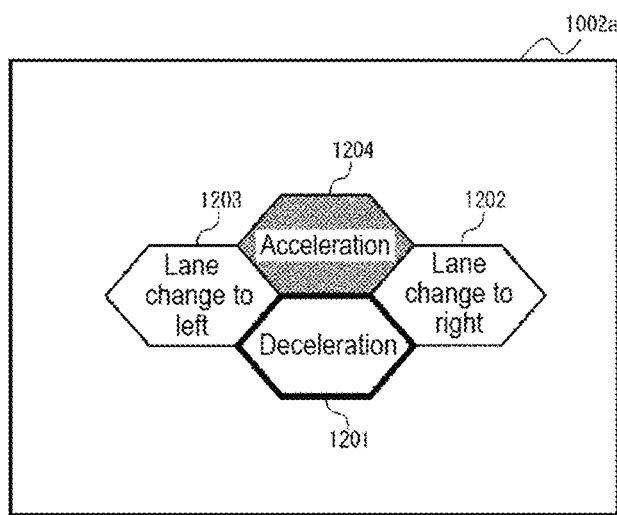
FIG. 63A is a view for describing one example of a process for determining an action basis according to the sixth exemplary embodiment.
Figure 63B:
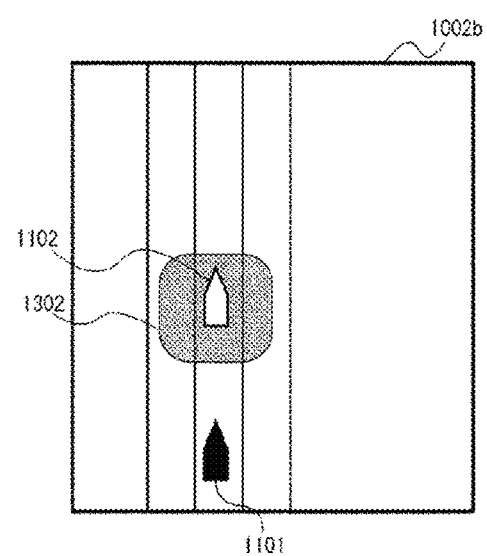
FIG. 63B is a view for describing one example of a process for determining an action basis according to the sixth exemplary embodiment.

FIGS. 63A and 63B are views for describing one example of the process for determining an action basis according to the sixth exemplary embodiment. FIG. 63A illustrates an action selection image, and FIG. 63B illustrates an overhead image. The action selection image illustrated in FIG. 63A is the same as the action selection image illustrated in FIG. 62A. In the overhead image illustrated in FIG. 63B, shaded image 1302 highlighting leading vehicle 1102 is displayed as the basis for "deceleration". Thus, the occupant can understand that the basis for "deceleration" is the relation with leading vehicle 1102.

FIGS. 64A to 64D are diagrams for describing another example of the process for determining an action basis according to the sixth exemplary embodiment. FIG. 64A illustrates an action selection image, and FIG. 64B illustrates an overhead image. FIGS. 64A and 64B illustrate the state where the occupant selects "acceleration" 1204 in the action selection image under the situation illustrated in FIGS. 59A and 59B.

FIG. 64C is a diagram illustrating values of the respective environmental parameters based on the current detection information detected by detector 1020. The values of the environmental parameters are the same as the values of the environmental parameters illustrated in FIG. 62C.

FIG. 64D is a parameter aggregate table created by action candidate determination unit 1041c. Action basis determination unit 1041d selects columns corresponding to the current values (levels) of the environmental parameters in the parameter aggregate table based on the current detection information. Action basis determination unit 1041d also selects the row corresponding to "acceleration" selected by the occupant.

Action basis determination unit 1041d specifies an intersection where the value (number of selected times) is zero from among the intersections of the selected columns and the selected one row in the parameter aggregate table. In the example illustrated in FIG. 64D, action basis determination unit 1041d specifies the intersection (number of selected times=0) of the column for the level 1 of distance DRba between leading vehicle 1102 and host vehicle 1101 with the row of "acceleration". Action basis determination unit 1041d selects the environmental parameter at the specified intersection as the travel-environmental basis that the selected action should not be executed. It is to be noted that, when there is a plurality of intersections where the number of selected times is zero, action basis determination unit 1041d selects the corresponding environmental parameters as bases that the selected action should not be executed. Action basis determination unit 1041d may select the environmental parameter corresponding to the intersection where the number of selected times is not zero but less than a predetermined value, as a basis that the selected action should not be executed.

Figure 65A:
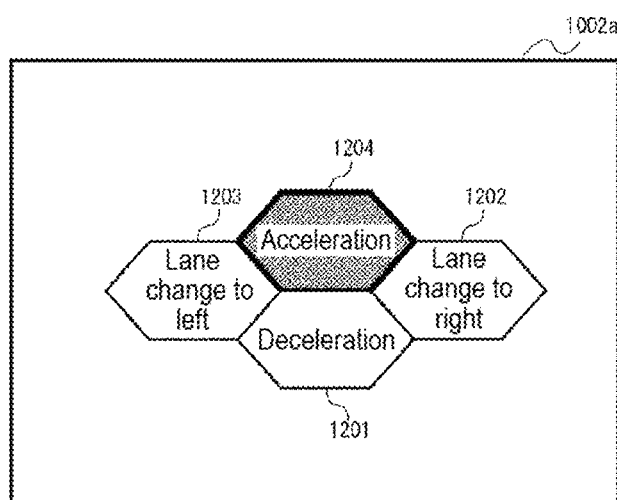
FIG. 65A is a view for describing another example of a process for determining an action basis according to the sixth exemplary embodiment.
Figure 65B:
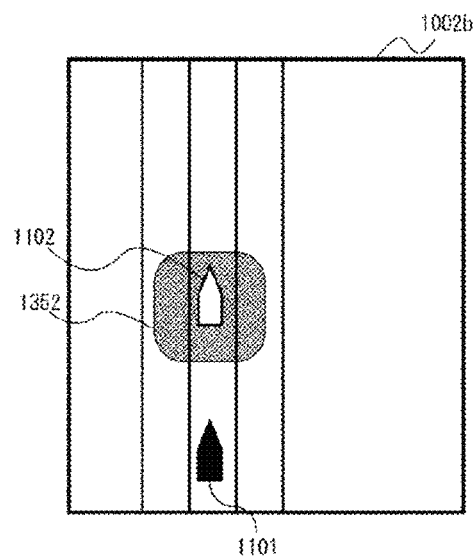
FIG. 65B is a view for describing another example of a process for determining an action basis according to the sixth exemplary embodiment.

FIGS. 65A and 65B are views for describing another example of the process for determining an action basis according to the sixth exemplary embodiment. FIG. 65A illustrates an action selection image, and FIG. 65B illustrates an overhead image. The action selection image illustrated in FIG. 65A is the same as the action selection image illustrated in FIG. 64A. In the overhead image illustrated in FIG. 65B, shaded image 1352 highlighting leading vehicle 1102 is displayed as the basis that "acceleration" should not be executed.

While shaded image 1302 included in the overhead image illustrated in FIG. 63B indicates a positive basis that the action (deceleration) should be executed, shaded image 1352 included in the overhead image illustrated in FIG. 65B indicates a negative basis that the action (acceleration) should not be executed. Image generator 1041b changes the display manner between both overhead images in generating the overhead images. For example, image generator 1041b displays shaded image 1302 indicating the positive basis in blue and displays shaded image 1352 indicating the negative basis in red.

Figure 66:
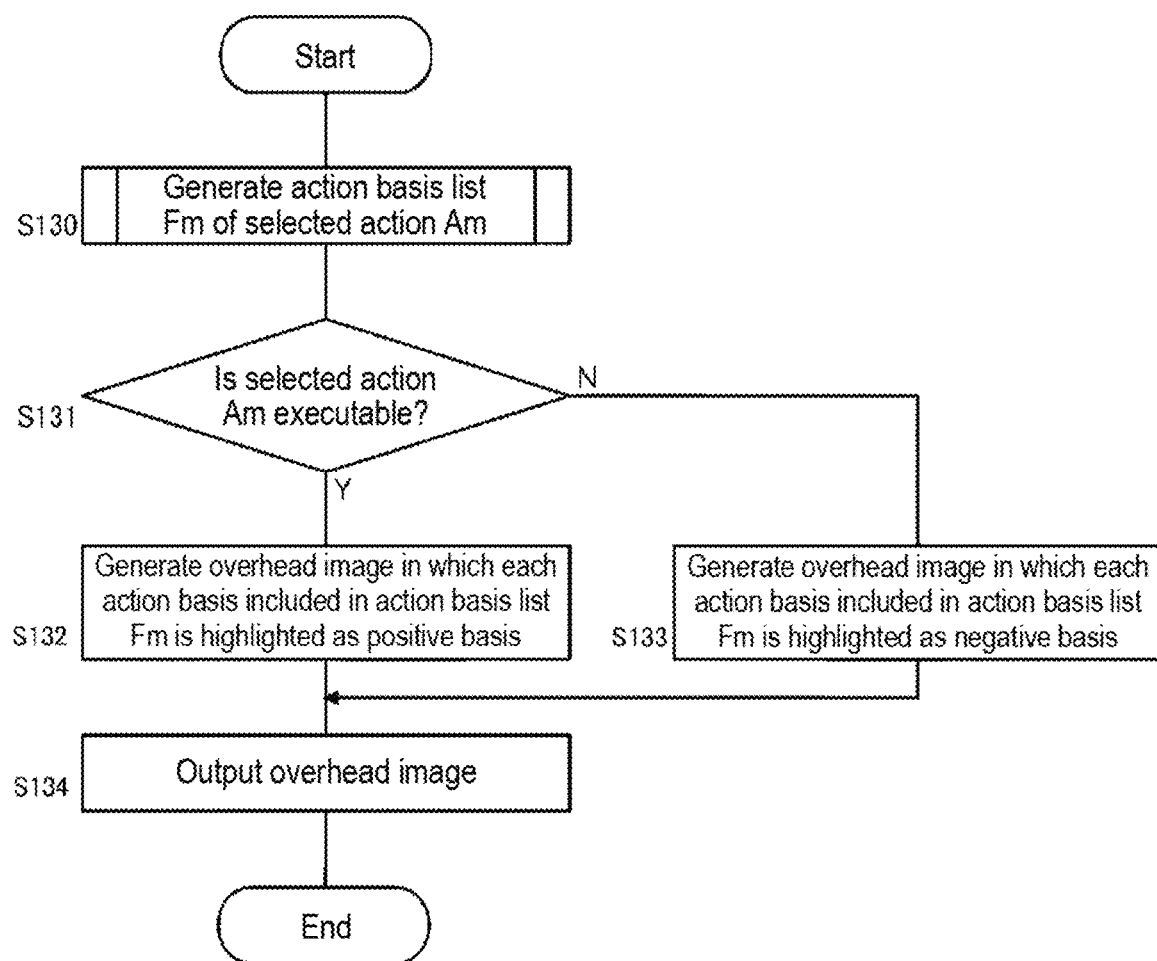
FIG. 66 is a flowchart illustrating a flow of a process up to displaying an action basis based on an action candidate selected by an occupant according to the sixth exemplary embodiment.

FIG. 66 is a flowchart illustrating the flow of the process up to displaying the action basis based on the action candidate selected by the occupant according to the sixth exemplary embodiment. Action basis determination unit 1041d generates action basis list Fm based on the parameter aggregate table, the values (levels) of the environmental parameters currently detected, and action Am selected by the occupant (S130).

Action basis determination unit 1041d determines whether or not selected action Am is an executable action (S131). If selected action Am is an executable action (Y in S131), image generator 1041b generates an overhead image in which the action basis included in action basis list Fm is highlighted as a positive basis (S132). If selected action is an inexecutable action (N in S131), image generator 1041b generates an overhead image in which the action basis included in action basis list Fm is highlighted as a negative basis (S133). Image output unit 1051 outputs the generated overhead image to notification device 1002 (S134).

Figure 67:
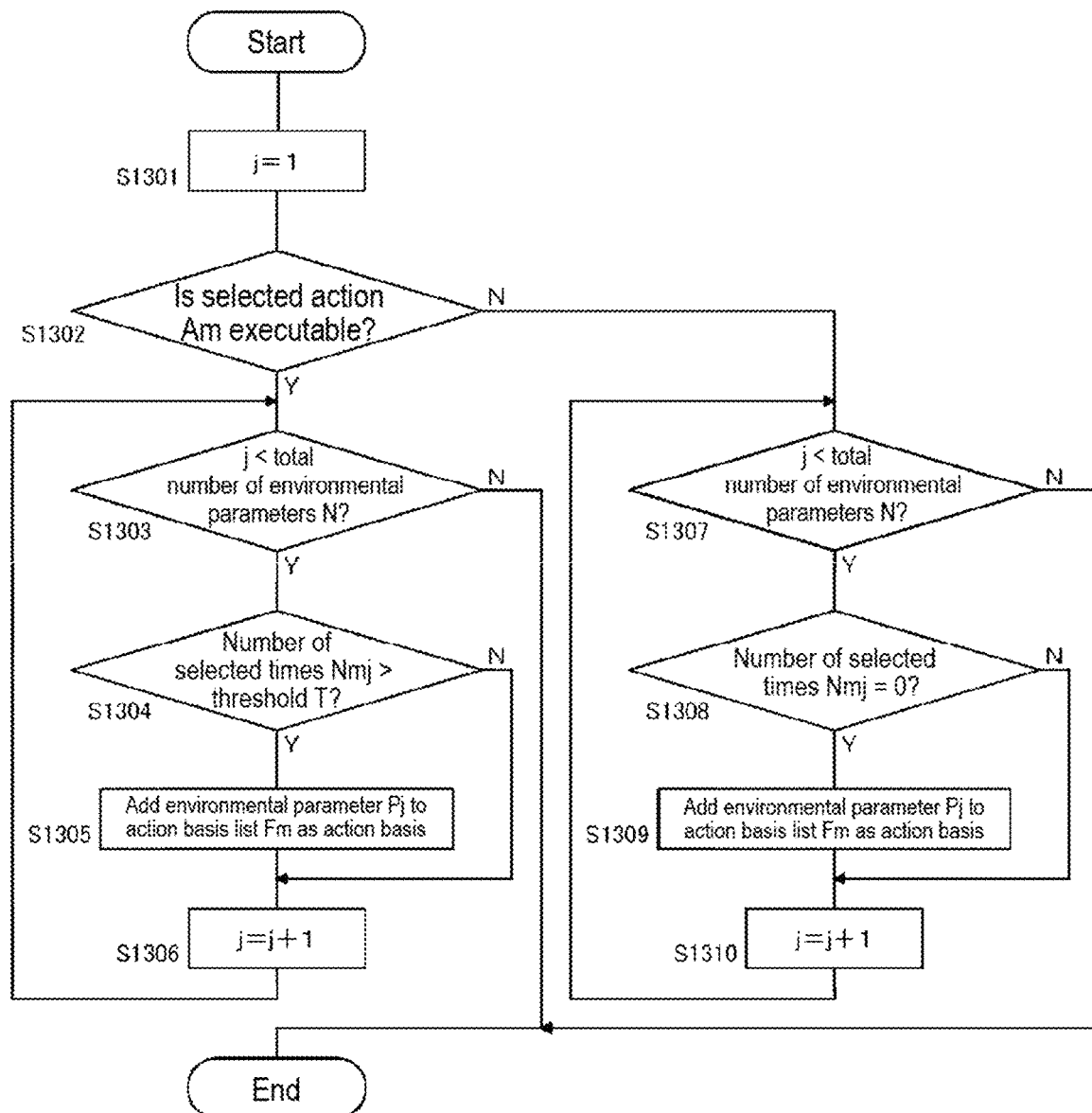

FIG. 67 is a flowchart illustrating the subroutine of the process in step S130 in FIG. 66. Action basis determination unit 1041d sets 1, as an initial value, to variable j which is the parameter representing a kind of an environmental parameter (S1301). Action basis determination unit 1041d determines whether or not selected action Am is an executable action (S1302). If selected action Am is an executable action (Y in S1302), the process proceeds to step S1303, and if it is an inexecutable action (N in S1302), the process proceeds to step S1307.

In step S1303, action candidate determination unit 1041c compares variable j with total number of environmental parameters N (S1303). If variable j is less than total number of environmental parameters N (Y in S1303), the process proceeds to step S1304, and if variable j is equal to or larger than total number of environmental parameters N (N in S1303), the process of this subroutine ends.

In step S1304, action basis determination unit 1041d specifies number of times Nmj action Am has been selected in the previous situation having a value same as the value of detected environmental parameter Pj, and compares number of selected times Nmj with threshold T (S1304). When number of selected times Nmj exceeds threshold T (Y in S1304), action basis determination unit 1041d adds environmental parameter Pj to action basis list Fm as an action basis (S1305). When number of times Nmj is equal to or less than threshold T (N in S1304), the process in step S1305 is skipped. Action basis determination unit 1041d increments variable j (S1306). The process returns to step S1303.

In step S1307, action candidate determination unit 1041c compares variable j with total number of environmental parameters N (S1307). If variable j is less than total number of environmental parameters N (Y in S1307), the process proceeds to step S1308, and if variable j is equal to or larger than total number of environmental parameters N (N in S1307), the process of this subroutine ends.

In step S1308, action basis determination unit 1041d specifies number of times Nmj action Am has been selected in the previous situation having a value same as the value of detected environmental parameter Pj, and determines whether or not number of selected times Nmj is zero (S1308). If it is zero (Y in S1308), action basis determination unit 1041d adds environmental parameter Pj to action basis list Fm as an action basis (S1309). If it is not zero (N in S1308), the process in step S1309 is skipped. Action basis determination unit 1041d increments variable j (S1310). The process returns to step S1307. Note that number of selected times Nmj is not limited to be compared to zero, and may be compared to other low thresholds.

As described above, according to the sixth exemplary embodiment, all actions supported by the HMI controller are displayed in the action selection image. Therefore, the situation where the action desired by the occupant is excluded from the action candidates and not displayed in the action selection image can be avoided. In addition, when an action which should not be executed is selected from all actions, this action is not executed, and the main basis that this action should be regarded as being inexecutable is displayed in the overhead view screen. According to this configuration, the occupant can confirm the reason why this action cannot be executed.

Modification of Fifth and Sixth Exemplary Embodiments

The fifth and sixth exemplary embodiments have described the example where the action selection image and the overhead image are displayed in different screens. This modification describes an example where both images are displayed in one screen.

Figure 68:
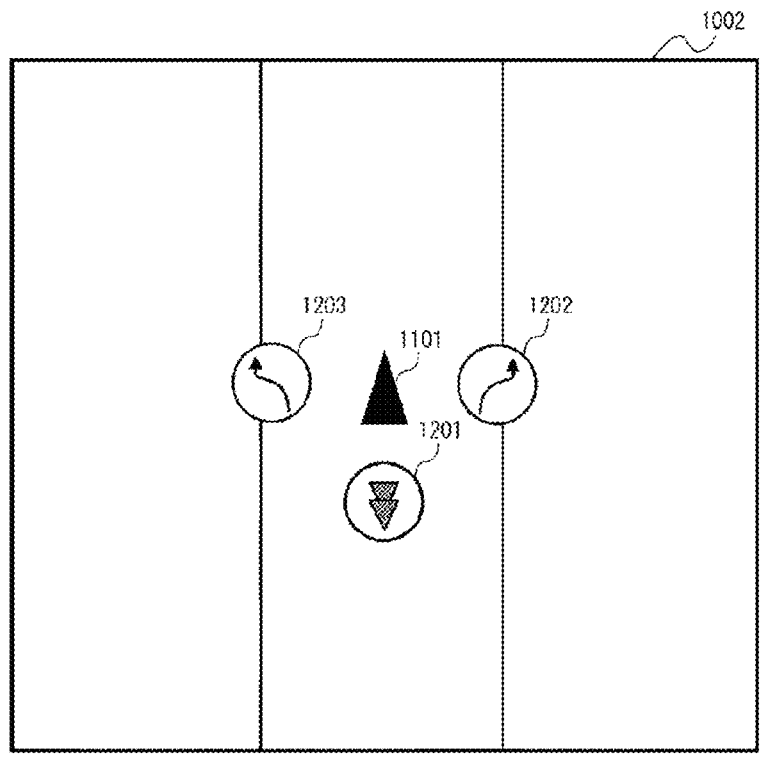

FIG. 68 is a view illustrating one example of an image display according to a first modification of the fifth exemplary embodiment. In the image illustrated in FIG. 68, a triangular icon representing host vehicle 1101 is displayed on the center of a three-lane road. Icons representing action candidates are displayed around the triangular icon. Specifically, an icon representing "lane change to right" 1202 is displayed on the right of the icon representing host vehicle 1101, an icon representing "deceleration" 1201 is displayed below the host-vehicle icon, and an icon representing "lane change to left" 1203 is displayed on the left of the host-vehicle icon.

Among three action candidates, "deceleration" 1201 is set as a recommended action. Image generator 1041b generates an image in which the icon for "deceleration" 1201 set as the recommended action is highlighted. For example, the icon for "deceleration" 1201 is displayed in red or flickered.

Figure 69:
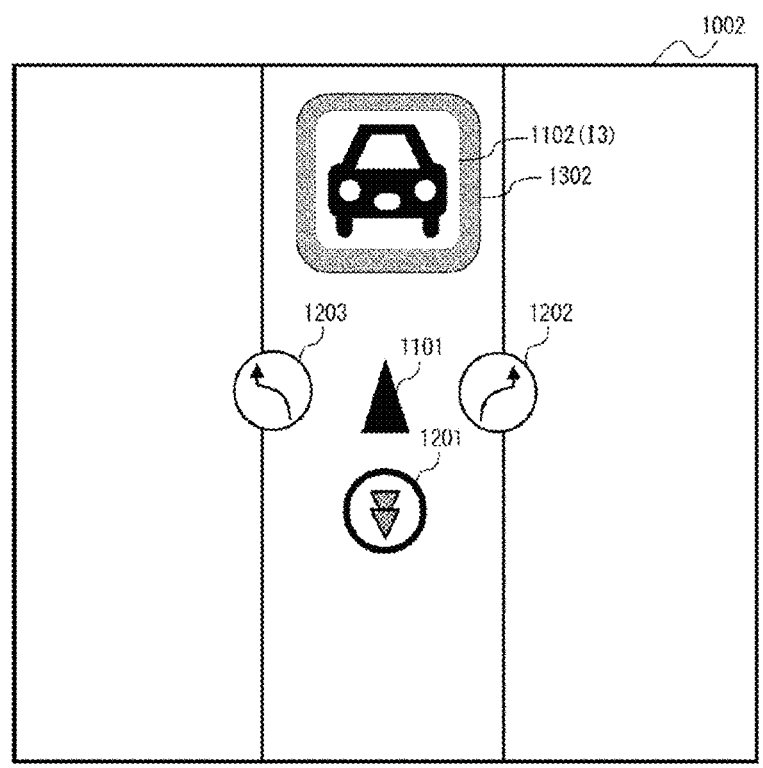

FIG. 69 is a view illustrating one example of an image display according to the first modification of the fifth exemplary embodiment. The image illustrated in FIG. 69 illustrates that the occupant selects "deceleration" 1201 in the image illustrated in FIG. 68. When the information indicating that the occupant selects "deceleration" 1201 is input from operation input unit 1050, image generator 1041b updates the frame of the icon for selected "deceleration" 1201 in boldface, and adds the action basis that "deceleration" should be executed in this image.

In the example illustrated in FIG. 69, the action basis that "deceleration" should be executed is distance DRba between host vehicle 1101 and leading vehicle 1102 being short. Image generator 1041*b* generates an image in which icon I3 representing leading vehicle 1102 is displayed in front of the icon representing host vehicle 1101 and icon I3 is enclosed by shaded image 1302. Enclosing icon I3 representing leading vehicle 1102 by shaded image 1302 indicates that the relation with leading vehicle 1102 is a positive basis that "deceleration" should be executed. According to the display method mentioned above, the information which is indicated in two screens, that is, the overhead image and the action selection image, can be integrally displayed in one screen.

Figure 70A:
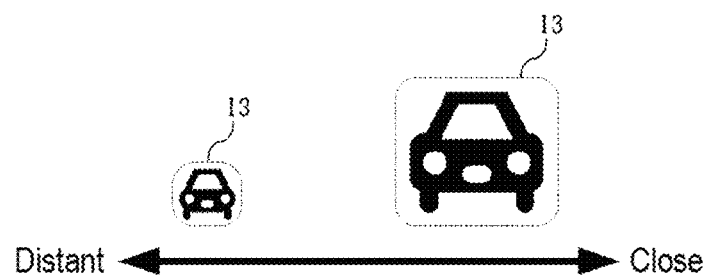
Figure 70B:
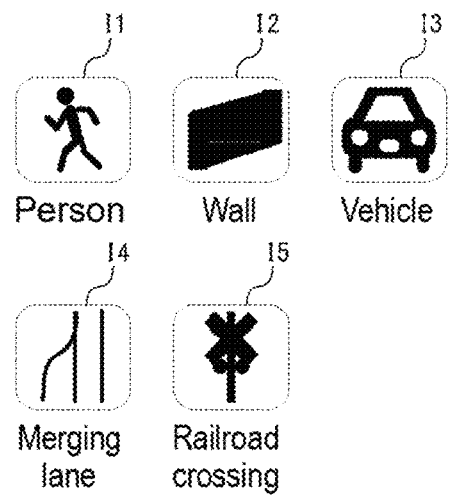

FIGS. 70A and 70B are views illustrating examples of icons used in an integrated display screen. FIG. 70A illustrates a display method for indicating the distance between the host vehicle and a nearby vehicle represented by icon I3 by changing the size of icon I3 representing the vehicle. Icon I3 having a larger size indicates that the nearby vehicle is close to the host vehicle, and icon I3 having a smaller size indicates that the nearby vehicle is distant from the host vehicle.

FIG. 70B is a view illustrating examples of kinds of icons. FIG. 70B illustrates icon I1 representing a person, icon I2 representing a wall, icon I3 representing a vehicle, icon I4 representing a merging lane, and icon I5 representing a railroad crossing. Icon I1 representing a person, icon I2 representing a wall, and icon I3 representing a vehicle are examples of icons representing obstacles, and icon I4 representing a merging lane and icon I5 representing a railroad crossing are examples of icons representing a road environment.

Figure 71:
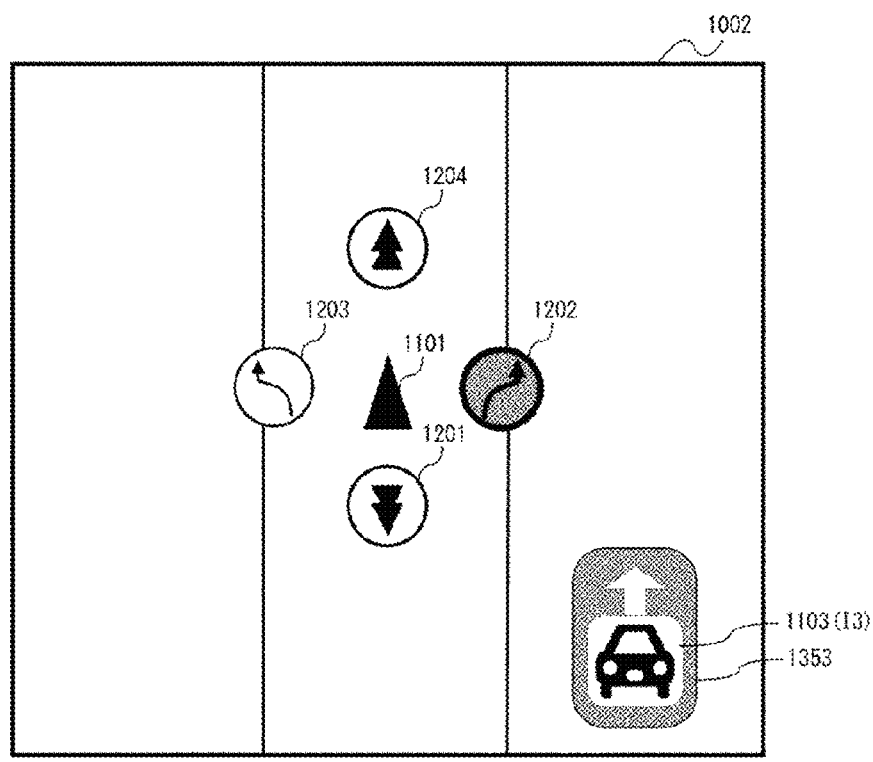

FIG. 71 is a view illustrating one example of an image display according to a first modification of the sixth exemplary embodiment. In the image illustrated in FIG. 71, a triangular icon representing host vehicle 1101 is displayed on the center of a three-lane road. Icons representing all of the prescribed action candidates are displayed around the triangular icon. Specifically, an icon representing "lane change to right" 1202 is displayed on the right of the icon representing host vehicle 1101, an icon representing "deceleration" 1201 is displayed below the host-vehicle icon, an icon representing "lane change to left" 1203 is displayed on the left of the host-vehicle icon, and an icon representing "acceleration" 1204 is displayed above the host-vehicle icon.

Among the four action candidates, "lane change to right" 1202 is set as an inexecutable action, and "deceleration" 1201 is set as a recommended action. Image generator 1041*b* generates an image in which the inexecutable action ("lane change to right" 1202) is displayed in a display manner, different from the display manner of the other executable actions, where the icon indicating the inexecutable action is grayed out or the luminance of the icon is reduced, for example. In addition, image generator 1041*b* generates an image in which the icon for "deceleration" 1201 set as the recommended action is highlighted.

The image illustrated in FIG. 71 indicates that the occupant selects "lane change to right" 1202 which cannot be executed by the occupant. When the information indicating that "lane change to right" 1202 is selected by the occupant is input from operation input unit 1050, image generator 1041*b* updates the frame of the icon for selected "lane change to right" 1202 in boldface, and adds a negative action basis that "lane change to right" 1202 cannot be executed in this image.

In the example in FIG. 71, the action basis that "lane change to right" should not be executed is approaching adjacent following vehicle 1103 in the right lane. Image generator 1041*b* generates an image in which an icon representing adjacent following vehicle 1103 is displayed in the right lane and this icon is enclosed by shaded image 1353. Enclosing the icon representing adjacent following vehicle 1103 by shaded image 1353 indicates that the approaching of adjacent following vehicle 1103 is a negative basis that "lane change to right" should not be executed.

Note that the arrow in the icon representing adjacent following vehicle 1103 indicates the relative speed of adjacent following vehicle 1103 relative to host vehicle 1101. The direction of the arrow indicates the travel direction of adjacent following vehicle 1103, and the thickness of the arrow indicates an absolute value of the relative speed. The thicker arrow indicates that the relative speed is high.

While shaded image 1302 included in the image illustrated in FIG. 69 indicates a positive basis that "deceleration" should be executed, shaded image 1353 included in the image illustrated in FIG. 71 indicates a negative basis that "lane change to right" should not be executed. Image generator 1041*b* changes the display manner between both images in generating these images. For example, image generator 1041*b* displays shaded image 1302 indicating the positive basis in blue and displays shaded image 1353 indicating the negative basis in red. According to the display method mentioned above, the information which is indicated in two screens, that is, the overhead image and the action selection image, can be integrally displayed in one screen.

Figure 72:
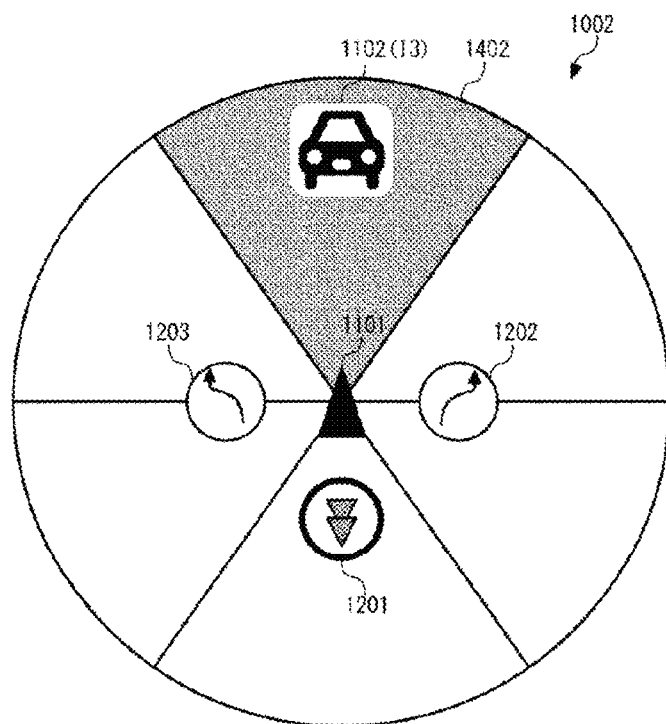

FIG. 72 is a view illustrating one example of an image display according to a second modification of the fifth exemplary embodiment. In the image illustrated in FIG. 72, the information indicated in two screens, i.e., the overhead image and the action selection image, is indicated in a circular image around an icon representing host vehicle 1101 without displaying lanes. In the example illustrated in FIG. 72, the circular image segmented into a plurality of (six) sectorial regions is displayed. An icon representing "lane change to right" 1202 is displayed on the right of the icon representing host vehicle 1101, an icon representing "deceleration" 1201 is displayed below the host-vehicle icon, and an icon representing "lane change to left" 1203 is displayed on the left of the host-vehicle icon.

The image illustrated in FIG. 72 illustrates that the occupant selects "deceleration" 1201. When the information indicating that the occupant selects "deceleration" 1201 is input from operation input unit 1050, image generator 1041*b* updates the frame of the icon for selected "deceleration" 1201 in boldface, and adds the action basis that "deceleration" should be executed in this image.

In the example illustrated in FIG. 72, the action basis that "deceleration" should be executed is distance DRba between host vehicle 1101 and leading vehicle 1102 being short. Image generator 1041*b* displays icon I3 representing leading vehicle 1102 in front of the icon representing host vehicle 1101, and paints sectorial region 1402 including icon I3 and spreading upward from the center. Painting the sectorial region in the direction toward leading vehicle 1102 indicates that the relation with leading vehicle 1102 is a positive basis that "deceleration" should be executed. The content of the information indicated by the image in FIG. 72 is the same as the content of the information indicated by the image in FIG. 69 except for the lane information, and the manner for indicating the information is different between both images.

Figure 73:
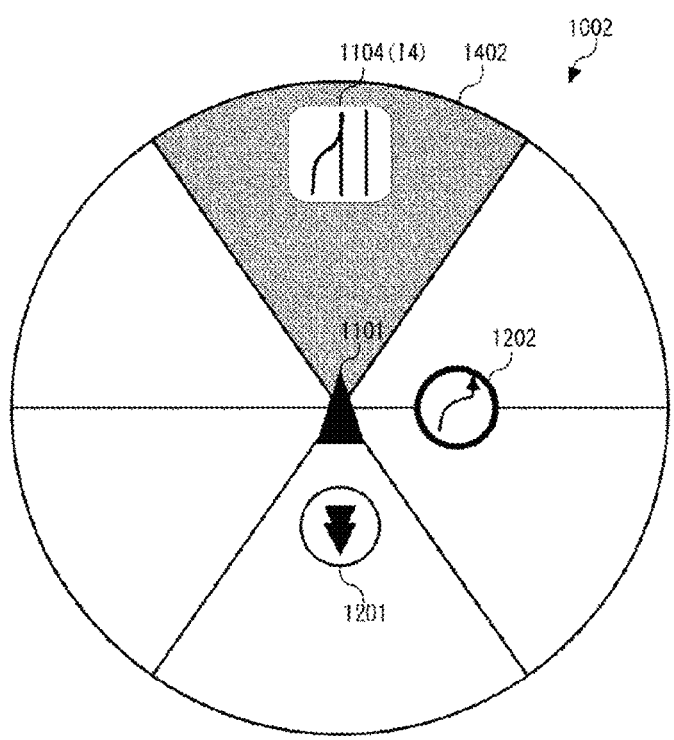

FIG. 73 is a view illustrating another example of an image display according to the second modification of the fifth exemplary embodiment. The image illustrated in FIG. 73 is also an example of displaying a circular image around an icon representing host vehicle 1101 without displaying lanes as in the image illustrated in FIG. 72. In the image illustrated in FIG. 73, an icon representing "lane change to right" 1202 is displayed on the right of the icon representing host vehicle 1101, and an icon representing "deceleration" 1201 is displayed below the host-vehicle icon.

The image illustrated in FIG. 73 illustrates that the occupant selects "lane change to right" 1202. When the information indicating that the occupant selects "lane change to right" 1202 is input from operation input unit 1050, image generator 1041b updates the frame of the icon for selected "lane change to right" 1202 in boldface, and adds the action basis that "lane change to right" should be executed in this image.

In the example illustrated in FIG. 73, the action basis that "lane change to right" should be executed is the presence of the merging point ahead of host vehicle 1101. Image generator 1041b displays icon I4 representing merging lane 1104 in front of the icon representing host vehicle 1101, and paints sectorial region 1402 including icon I4. Painting the sectorial region in the direction where the merging point is present indicates that the presence of the merging point is a positive basis that "lane change to right" should be executed.

According to the representation method in the second modification described above, the travel environment is represented by a circular image around host vehicle 1101, and the action basis is represented by highlighting the sectorial region where the subject providing the action basis is present. Thus, the occupant can recognize at once the region where the subject providing the action basis is present.

The present invention has been described above based on the exemplary embodiments. The above-mentioned exemplary embodiments have been described for exemplary purpose only, and it can be readily conceived by those skilled in the art that various modifications may be made by making various combinations of the aforementioned components or processes, which are also encompassed in the technical scope of the present invention.

The above-mentioned fifth and sixth exemplary embodiments have described the example where, when the occupant selects any one of the action candidates, a highlighted object indicating the basis for the selected action is added in the screen. Note that the trigger for adding the highlighted display indicating the action basis in the screen is not limited to the timing at which the occupant performs the action selection operation.

For example, regardless of whether or not the occupant selects any one of the action candidates, a highlighted object indicating the basis of the action currently executed by vehicle 1000 may be displayed in the overhead image or in the integrated image. In addition, regardless of whether or not the occupant selects any one of the action candidates, a highlighted object indicating the basis for the action which is to be executed next by vehicle 1000 may be displayed in the overhead image or in the integrated image. Notably, the action which is to be executed next is not limited to an action positively selected by the occupant, and may be an action determined by the HMI controller. For example, under the setting where a recommended action is autonomously selected when the occupant does not perform a positive operation, a highlighted object indicating the basis for the recommended action may be displayed in the overhead image or in the integrated image.

In the case where, even when the autonomous driving controller determines an action which is to be executed next, the HMI controller can acquire the basis for this action from the autonomous driving controller, a highlighted object indicating the basis for this action can be displayed in the overhead image or in the integrated image. Further, even when a plurality of action candidates and the bases for these action candidates can be acquired from the autonomous driving controller, a highlighted object indicating the basis for the action selected by the occupant can be displayed in the overhead image or in the integrated image.

The above-mentioned fifth and sixth exemplary embodiments have described the example where the occupant selects an action candidate by operating first operating unit 1004a or second operating unit 1004b. Regarding this point, the occupant can also select an action candidate by a voice/sound input. In this case, input device 1004 includes a microphone (not illustrated), and this microphone collects the voice from the occupant and outputs the collected voice to the HMI controller. For example, when the occupant utters "deceleration", a voice/sound recognizer (not illustrated) in the HMI controller analyzes an audio signal input from the microphone, and detects a voice operation for instructing "deceleration".

While the exemplary embodiments according to the present invention have been described above with reference to the drawings, the functions of the above-mentioned devices and processing units can be implemented by a computer program.

A computer achieving the above-mentioned functions through execution of a program is provided with an input device such as a keyboard, a mouse, or a touch pad, and an output device such as a display or a speaker. The computer is also provided with a central processing unit (CPU), a storage device such as a read only memory (ROM), a random access memory (RAM), a hard disk drive, and a solid state drive (SSD), a reading device for reading information from a recording medium such as a digital versatile disk read only memory (DVD-ROM) and a universal serial bus (USB) memory, a network card that performs communication through a network, for example. The respective components are interconnected with a bus.

The reading device reads the program from the recording medium having the program recorded thereon, and the storage device stores the program. Alternatively, the network card performs communication with a server device connected to a network, and a program, downloaded from the server device, for achieving the functions of the respective devices is stored in the storage device.

Then, the CPU copies the program stored in the storage device on the RAM, sequentially reads commands included in the program from the RAM, and executes the read commands, whereby the functions of the respective devices are achieved.

It is to be noted that the exemplary embodiments may be specified by items described below.

[Item 1]

Driving assistance device (1040) including image generator (1041b) that generates first image (1201) representing an action a vehicle is capable of executing depending on a travel environment during autonomous driving and second image (1302) representing a basis of the action; and image output unit (1051) that outputs first image (1201) and second image (1302) generated by image generator (1041b) to notification device (1002) in vehicle (1000) in association with each other.

According to this configuration, an occupant can confirm the basis that the vehicle is capable of executing a specific action.

[Item 2]

Driving assistance device (1040) including image generator (1041b) that generates first image (1201) representing an action a vehicle does not execute depending on a travel environment during autonomous driving and second image (1302) representing a basis of the action; and image output unit (1051) that outputs first image (1201) and second image (1302) generated by image generator (1041b) to notification device (1002) in vehicle (1000) in association with each other.

According to this configuration, an occupant can confirm the basis that the vehicle does not execute a specific action.

[Item 3]

In driving assistance device (1040) according to item 1 or 2, image generator (1041b) generates at least one first image (1201) representing at least one action candidate of vehicle (1000) which is selectable by an occupant, and image output unit (1051) outputs at least one first image (1201) that has been generated to notification device (1002). Driving assistance device (1040) further includes operation input unit (1050) that receives an action of vehicle (1000) selected by the occupant from among the at least one action candidate of vehicle (1000). Image generator (1041b) generates second image (1302) representing a basis of the action of vehicle (1000) that has been received, and image output unit (1051) outputs second image (1302) that has been generated to notification device (1002).

According to this configuration, the occupant can confirm the basis of the action selected by the occupant.

[Item 4]

Driving assistance device (1040) according to item 3 further includes detection information input unit (1052) that acquires detection information indicating a detection result from detector (1020) configured to detect a state of vehicle (1000) and a surrounding situation of vehicle (1000). Driving assistance device (1040) according to item 3 further includes travel history generator (1041a) that generates a travel history obtained by associating an action executed by vehicle (1000) with values of a plurality of environmental parameters specifying a travel environment when vehicle (1000) executes the action based on the detection information. Driving assistance device (1040) according to item 3 further includes action candidate determination unit (1041c) that determines an action candidate of vehicle (1000) based on the travel history and the detection information acquired from detection information input unit (1052).

According to this configuration, a suitable action candidate can be presented to the occupant.

[Item 5]

Driving assistance device (1040) according to item 4, wherein action candidate determination unit (1041c) selects, as an action candidate of vehicle (1000), an action having an actual value exceeding a first threshold (threshold T in FIG. 43 (see S1010)) from among actions executed by vehicle (1000) under a previous similar travel environment, based on the travel history and values of a plurality of environmental parameters based on detection information currently acquired from detection information input unit (1052).

According to this configuration, an action candidate which is highly likely to be selected in terms of a previous statistics under the travel environment similar to the current travel environment can be presented.

[Item 6]

Driving assistance device (1040) according to item 5, wherein action candidate determination unit (1041c) designates, as a recommended action recommended to the occupant, an action having a highest actual value from among actions executed by vehicle (1000) under a previous similar travel environment.

According to this configuration, an action candidate which is most likely to be selected in terms of a previous statistics under the travel environment similar to the current travel environment can be presented as a recommended action.

[Item 7]

Driving assistance device (1040), according to any one of items 4 to 6, further including an action basis determination unit (1041d) that selects, as a travel-environmental basis that an action candidate selected by the occupant and received by operation input unit (1050) is executable, an environmental parameter having a highest rate of contribution or at least one environmental parameter which has a rate of contribution exceeding a second threshold (threshold T in FIG. 51 (see S1103)) from among a plurality of environmental parameters included in the travel history and associated with the action.

According to this configuration, a main basis that the selected action should be executed can be visually presented to the occupant.

[Item 8]

Driving assistance device (1040) according to any one of items 3 to 7, wherein image generator (1041b) generates an image including, in one screen (1002) object (1101) representing vehicle (1000); at least one object (1201) representing the action candidate disposed around object (1101) representing vehicle (1000); at least one object (1102) representing a subject that provides a travel-environmental basis of a selected action candidate; and at least one object (1302) for highlighting at least one object (1102) representing the subject providing the basis, and image output unit (1051) outputs the image that has been generated.

According to this configuration, the travel environment including the host vehicle, the action candidate, and the action basis can be displayed in one screen.

[Item 9]

Driving assistance device (1040) according to item 8, wherein image generator (1041b) changes a display size of object (1102) which represents the subject providing the basis according to a distance between vehicle (1000) and the subject providing the basis.

According to this configuration, the occupant can intuitively recognize the distance between the host vehicle and the subject providing the basis.

[Item 10] In driving assistance device (1040) according to item 8 or 9, the image has a circular region around object (1101) representing vehicle (1000). The circular region is segmented into a plurality of sectorial regions, a position where object (1102) representing the subject providing the basis is disposed in the circular region is determined according to a positional relation between vehicle (1000) and the subject providing the basis, and sectorial region (1402) including the position is displayed in a highlighted manner.

According to this configuration, the occupant can recognize at once the region where the subject providing the basis is present.

[Item 11]

Driving assistance device (1040) according to any one of items 3 to 7, wherein image generator (1041b) generates, as images in different screens (1002a, 1002b), an action selection image including at least one object (1201) representing the action candidate and an overhead image including object (1101) representing vehicle (1000); at least one object (1102) representing a subject that provides a travel-environmental basis of a selected action candidate; and at least one object (1302) for highlighting at least one object (1102) representing the subject providing the basis, and image output unit (1051) outputs the action selection image and the overhead image which have been generated.

According to this configuration, the overhead image displaying the travel environment including the host vehicle and the action selection image for presenting action candidates are displayed in different screens, whereby a state where the occupant is easy to understand the travel environment can always be maintained.

[Item 12]

Driving assistance device according to any one of items 8 to 11, wherein image generator (1041*b*) highlights object (1201) of a recommended action candidate in at least one object (1201, 1202) representing the action candidate.

According to this configuration, an action candidate which is highly likely to be selected in terms of a previous statistics under the travel environment similar to the current travel environment can be presented to the occupant in an easily recognizable state.

[Item 13]

In driving assistance device (1040) according to item 4, action candidate determination unit (1041*c*) selects, as an inexecutable action, an action having an actual value equal to or less than a third threshold (zero (0), see S1205 in FIG. 61) from among actions executed by vehicle (1000) under a previous similar travel environment, based on the travel history and values of a plurality of environmental parameters based on detection information currently acquired from detection information input unit (1052). Image generator (1041*b*) generates a plurality of first images (1201 to 1204) representing prescribed actions of vehicle (1000), and generates first image (1204) of an action selected as being inexecutable by action candidate determination unit (1041*c*) from among the prescribed actions in a display manner indicating that the action is inexecutable. Then, image output unit (1051) outputs, to display (1002), first images (1201 to 1204) that have been generated.

According to this configuration, all action candidates can be presented to the occupant, and an action which cannot be executed can be distinguishable.

[Item 14]

Driving assistance device (1040) according to item 13, further including action basis determination unit (1041*d*) that, when the occupant selects the inexecutable action, selects, as a basis that the vehicle does not execute the inexecutable action, an environmental parameter (Pj in FIG. 67 (see S1305 and S1309)) having the highest rate of contribution to the determination that the vehicle does not execute the inexecutable action, or at least one environmental parameter in which a rate of contribution to the determination that the vehicle does not execute the inexecutable action exceeds a fourth threshold (T in FIG. 67 (see S1304)) or is zero (0, see S1308)), from among a plurality of environmental parameters included in the travel history and associated with the action.

According to this configuration, a main basis that the vehicle does not execute the inexecutable action can be visually presented to the occupant.

[Item 15]

Driving assistance device (1040) according to item 13 or 14, wherein image generator (1041*b*) generates an image including, in one screen (1002) object (1101) representing vehicle (1000); a plurality of objects (1201 to 1204) representing the prescribed actions disposed around object (1101) representing vehicle (1000); at least one object (1102) representing a subject that provides a travel-environmental basis of a selected action; and at least one object (1302) for highlighting at least one object (1102) representing the subject providing the basis, and image output unit (1051) outputs the image that has been generated.

According to this configuration, the travel environment including the host vehicle, the action candidate, and the action basis can be displayed in one screen.

[Item 16]

Driving assistance device (1040) according to item 13 or 14, wherein image generator (1041*b*) generates, as images in different screens (1002*a*, 1002*b*), an action selection image including a plurality of objects (1201 to 1204) representing the prescribed actions and an overhead image including object (1101) representing vehicle (1000); at least one object (1102) representing a subject that provides a travel-environmental basis of a selected action; and at least one object (1302) for highlighting at least one object (1102) representing the subject providing the basis, and image output unit (1051) outputs the action selection image and the overhead image which have been generated.

According to this configuration, the overhead image displaying the travel environment including the host vehicle and the action selection image for presenting action candidates are displayed in different screens, whereby a state where the occupant is easy to understand the travel environment can always be maintained.

[Item 17]

Driving control device (1030, 1040) including an autonomous driving controller (1030) that controls an action of vehicle (1000) during autonomous driving of vehicle (1000); and image generator (1041*b*) that generates first image (1201) representing an action the vehicle is capable of executing depending on a travel environment during autonomous driving, and second image (1302) representing a basis of the action. Driving control device (1030, 1040) also includes image output unit (1051) that outputs first image (1201) and second image (1302) generated by image generator (1041*b*) to notification device (1002) in vehicle (1000) in association with each other.

According to this configuration, an occupant can confirm the basis that the vehicle is capable of executing a specific action.

[Item 18]

Driving control device (1030, 1040) including an autonomous driving controller (1030) that controls an action of vehicle (1000) during autonomous driving of vehicle (1000); and image generator (1041*b*) that generates first image (1201) representing an action the vehicle does not execute depending on a travel environment during autonomous driving, and second image (1302) representing a basis of the action. Driving control device (1030, 1040) also includes image output unit (1051) that outputs first image (1201) and second image (1302) generated by image generator (1041*b*) to notification device (1002) in vehicle (1000) in association with each other.

According to this configuration, an occupant can confirm the basis that the vehicle does not execute a specific action.

[Item 19]

Vehicle (1000) provided with driving assistance device (1040), driving assistance device (1040) including image generator (1041*b*) that generates first image (1201) representing an action the vehicle is capable of executing depending on a travel environment during autonomous driving, and second image (1302) representing a basis of the action. Driving assistance device (1040) also includes image output unit (1051) that outputs first image (1201) and second image (1302) generated by image generator (1041b) to notification device (1002) in vehicle (1000) in association with each other.

According to this configuration, an occupant can confirm the basis that the vehicle is capable of executing a specific action.

[Item 20]

Vehicle (1000) provided with driving assistance device (1040), driving assistance device (1040) including image generator (1041b) that generates first image (1201) representing an action the vehicle does not execute depending on a travel environment during autonomous driving, and second image (1302) representing a basis of the action. Driving assistance device (1040) also includes image output unit (1051) that outputs first image (1201) and second image (1302) generated by image generator (1041b) to notification device (1002) in vehicle (1000) in association with each other.

According to this configuration, an occupant can confirm the basis that the vehicle does not execute a specific action.

[Item 21]

A driving assistance method comprising generating first image (1201) representing an action a vehicle is capable of executing depending on a travel environment during autonomous driving, and second image (1302) representing a basis of the action; and outputting first image (1201) and second image (1302) which have been generated to notification device (1002) in vehicle (1000) in association with each other.

According to this configuration, an occupant can confirm the basis that the vehicle is capable of executing a specific action.

[Item 22]

A driving assistance method comprising generating first image (1201) representing an action a vehicle does not execute depending on a travel environment during autonomous driving, and second image (1302) representing a basis of the action; and outputting first image (1201) and second image (1302) which have been generated to notification device (1002) in vehicle (1000) in association with each other.

According to this configuration, an occupant can confirm the basis that the vehicle does not execute a specific action.

[Item 23]

A driving assistance program that causes a computer to execute generating first image (1201) representing an action a vehicle is capable of executing depending on a travel environment during autonomous driving, and second image (1302) representing a basis of the action; and outputting first image (1201) and second image (1302) which have been generated to notification device (1002) in vehicle (1000) in association with each other.

According to this configuration, an occupant can confirm the basis that the vehicle is capable of executing a specific action.

[Item 24]

A driving assistance program that causes a computer to execute generating first image (1201) representing an action a vehicle does not execute depending on a travel environment during autonomous driving, and second image (1302) representing a basis of the action; and outputting first image (1201) and second image (1302) which have been generated to notification device (1002) in vehicle (1000) in association with each other.

According to this configuration, an occupant can confirm the basis that the vehicle does not execute a specific action.

INDUSTRIAL APPLICABILITY

The driving assistance method according to the present invention, and the driving assistance device, driving control device, vehicle, and program using such a driving assistance method are suitable for transmitting information to a driver.

REFERENCE MARKS IN THE DRAWINGS 1, 1000 vehicle
1002 notification device
1002a HUD
1002b center display
1004 input device
1004a first operating unit
1004b second operating unit
1006 speaker
1008 wireless device
1010 driving operating unit
1011 steering
2, 1012 brake pedal
3, 1013 accelerator pedal
1014 indicator switch
6, 1020 detector
61, 1021 location information acquisition unit
62, 1022 sensor
63, 1023 speed information acquisition unit
64, 1024 map information acquisition unit
1030 driving control device
1031 controller
8, 1032 storage unit
1033 I/O unit
1040 driving assistance device
1041 controller
1041a travel history generator
1041b image generator
1041c action candidate determination unit
1041d action basis determination unit
1041e command generator
1042 storage unit
1042a travel history retaining unit
1043 I/O unit
1050 operation input unit
1051 image output unit
1052 detection information input unit
1053 command IF
1054 action information input unit
1055 command output unit
1056 communication IF

The invention claimed is:

1. A driving assistance device comprising:
a processor; and
a memory coupled to the processor, the memory storing a program that, when executed by the processor, causes the driving assistance device to:
generate a first image representing an action a vehicle is capable of executing depending on a travel environment during autonomous driving, and a second image representing a reason, based on the travel environment, why the action should be executed or should not be executed; and
output the first image and the second image to a notification device in the vehicle in association with each other.

2. The driving assistance device according to claim 1, wherein the program, when executed by the processor, causes the driving assistance device to:
  generate at least one third image representing at least one action candidate of the vehicle which is selectable by an occupant-,
  output the at least one third image that has been generated to the notification device;
  receive an action of the vehicle selected by the occupant from among the at least one action candidate of the vehicle;
  generate a fourth image representing a reason for the action of the vehicle that has been received, and
  output the fourth image that has been generated to the notification device.

3. The driving assistance device according to claim 2, wherein the program, when executed by the processor, causes the driving assistance device to:
  acquire detection information indicating a detection result from a detector configured to detect a state of the vehicle and a surrounding situation of the vehicle;
  generate a travel history obtained by associating an action executed by the vehicle with values of a plurality of environmental parameters specifying a travel environment when the vehicle executes the action based on the detection information; and
  determines an action candidate of the vehicle based on the travel history and the detection information acquired.

4. The driving assistance device according to claim 3, wherein the program, when executed by the processor, causes the driving assistance device to:
  select, as the action candidate of the vehicle, an action having an actual value exceeding a first threshold from among actions executed by the vehicle under a previous similar travel environment, based on the travel history and values of a plurality of environmental parameters based on detection information currently acquired.

5. The driving assistance device according to claim 4, wherein the program, when executed by the processor, causes the driving assistance device to:
  designate, as a recommended action recommended to the occupant, an action having a highest actual value from among actions executed by the vehicle under a previous similar travel environment.

6. The driving assistance device according to claim 3, wherein the program, when executed by the processor, causes the driving assistance device to:
  select, as a travel-environmental reason why an action candidate selected by the occupant and received is executable, an environmental parameter having a highest rate of contribution or at least one environmental parameter which has a rate of contribution exceeding a first threshold, from among a plurality of environmental parameters included in the travel history and associated with the action.

7. The driving assistance device according to claim 2, wherein the program when executed by the processor, causes the driving assistance device to:
  generate an image including, in one screen, an object representing the vehicle, at least one object representing the action candidate disposed around the object representing the vehicle, at least one object representing a subject that provides a travel-environmental reason for a selected action candidate, and at least one object for highlighting the at least one object representing the subject providing the reason; and
  output the image that has been generated.

8. The driving assistance device according to claim 7, wherein the program, when executed by the processor, causes the driving assistance device to:
  change a display size of the object which represents the subject providing the reason according to a distance between the vehicle and the subject providing the reason.

9. The driving assistance device according to claim 7, wherein
  the image has a circular region around the object representing the vehicle,
  the circular region is segmented into a plurality of sectorial regions,
  a position where the object representing the subject providing the reason is disposed in the circular region is determined according to a positional relation between the vehicle and the subject providing the reason, and
  a sectorial region including the position is displayed in a highlighted manner.

10. The driving assistance device according to claim 7, wherein the program, when executed by the processor, causes the driving assistance device to:
  highlight an object of a recommended action candidate in the at least one object representing the action candidate.

11. The driving assistance device according to claim 2, wherein the program, when executed by the processor, causes the driving assistance device to:
  generate as images in different screens, an action selection image including at least one object representing the action candidate and an overhead image including an object representing the vehicle, at least one object representing a subject that provides a travel-environmental reason for a selected action candidate, and at least one object for highlighting the at least one object representing the subject providing the reason; and
  output the action selection image and the overhead image which have been generated.

12. An autonomous driving control device comprising
  a processor; and
  a memory coupled to the processor, the memory storing a program that, when executed by the processor, causes the autonomous driving control device to:
  control an action of a vehicle during autonomous driving of the vehicle;
  generate a first image representing an action the vehicle is capable of executing depending on a travel environment during autonomous driving, and a second image representing a reason, based on the travel environment, why the action should be executed or should not be executed; and
  output the first image and the second image generated to a notification device in the vehicle in association with each other.

13. A driving assistance method comprising:
  generating a first image representing an action a vehicle is capable of executing depending on a travel environment during autonomous driving, and a second image representing a reason, based on the travel environment, why the action should be executed or should not be executed; and
  outputting the first image and the second image to a notification device in the vehicle in association with each other.

* * * * *